(12) United States Patent
Oxford

(10) Patent No.: US 7,720,232 B2
(45) Date of Patent: May 18, 2010

(54) SPEAKERPHONE

(75) Inventor: William V. Oxford, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1251 days.

(21) Appl. No.: 11/251,084

(22) Filed: Oct. 14, 2005

(65) Prior Publication Data

US 2006/0093128 A1    May 4, 2006

Related U.S. Application Data

(60) Provisional application No. 60/619,303, filed on Oct. 15, 2004, provisional application No. 60/634,315, filed on Dec. 8, 2004.

(51) Int. Cl.
*H04B 3/20* (2006.01)
*H04B 15/00* (2006.01)
*H04M 9/08* (2006.01)

(52) U.S. Cl. ............... 381/66; 381/83; 381/93; 381/94.1; 381/318; 379/406.01

(58) Field of Classification Search ............ 381/66, 381/83, 93; 379/406.01–406.16
See application file for complete search history.

(56) References Cited

U.S. PATENT DOCUMENTS 3,963,868 A     6/1976  Randmere et al.
4,480,333 A *  10/1984  Ross ..................... 381/71.8
4,636,586 A     1/1987  Schiff (Continued)

FOREIGN PATENT DOCUMENTS

JP          62203432        9/1987

(Continued)

OTHER PUBLICATIONS

Joe Duran and Charlie Sauer; "Mainstream Videoconferencing—A Developer's Guide to Distance Multimedia"; Jan. 1997; pp. 179-186; Addison Wesley Longman, Inc.

(Continued)

*Primary Examiner*—Vivian Chin
*Assistant Examiner*—Paul Kim
(74) *Attorney, Agent, or Firm*—Meyertons Hood Kivlin Kowert & Goetzel, P.C.; Jeffrey C. Hood; Mark K. Brightwell

(57) ABSTRACT

A processor operates on samples of a digital output signal to determine samples of a digital correction signal. The output signal samples are directed to an output channel for transmission from a speaker. The digital correction signal samples are supplied to a first digital-to-analog converter for conversion into an analog correction signal. The subtraction circuit generates a difference between a first analog signal provided by a microphone and the analog correction signal. The analog correction signal is an estimate of a contribution to the first analog signal due to a direct path transmission between the speaker and the microphone. The processor also receives a digital input signal derived from the difference signal, and, performs acoustic echo cancellation on the digital input signal to obtain a resultant signal. The acoustic echo cancellation is configured to remove contributions to the digital input signal due to reflected path transmissions.

20 Claims, 38 Drawing Sheets

U.S. PATENT DOCUMENTS

| | | | |
|---|---|---|---|
| 4,903,247 | A | 2/1990 | Van Gerwen et al. |
| 5,029,162 | A | 7/1991 | Epps |
| 5,034,947 | A | 7/1991 | Epps |
| 5,051,799 | A | 9/1991 | Paul et al. |
| 5,054,021 | A | 10/1991 | Epps |
| 5,121,426 | A | 6/1992 | Baumhauer, Jr. et al. |
| 5,168,525 | A | 12/1992 | Muller |
| 5,263,019 | A | 11/1993 | Chu |
| 5,305,307 | A | 4/1994 | Chu |
| 5,365,583 | A | 11/1994 | Huang et al. |
| 5,390,244 | A | 2/1995 | Hinman et al. |
| 5,396,554 | A | 3/1995 | Hirano et al. |
| 5,550,924 | A | 8/1996 | Helf et al. |
| 5,566,167 | A | 10/1996 | Duttweiler |
| 5,581,620 | A | 12/1996 | Brandstein et al. |
| 5,606,642 | A | 2/1997 | Stautner et al. |
| 5,617,539 | A | 4/1997 | Ludwig et al. |
| 5,649,055 | A | 7/1997 | Gupta et al. |
| 5,657,393 | A | 8/1997 | Crow |
| 5,664,021 | A | 9/1997 | Chu et al. |
| 5,689,641 | A | 11/1997 | Ludwig et al. |
| 5,715,319 | A | 2/1998 | Chu |
| 5,737,431 | A | 4/1998 | Brandstein et al. |
| 5,751,338 | A | 5/1998 | Ludwig, Jr. |
| 5,778,082 | A | 7/1998 | Chu et al. |
| 5,787,183 | A | 7/1998 | Chu et al. |
| 5,844,994 | A | 12/1998 | Graumann |
| 5,896,461 | A | 4/1999 | Faraci et al. |
| 5,924,064 | A | 7/1999 | Helf |
| 5,983,192 | A | 11/1999 | Botzko et al. |
| 6,072,522 | A | 6/2000 | Ippolito et al. |
| 6,130,949 | A | 10/2000 | Aoki et al. |
| 6,141,597 | A | 10/2000 | Botzko et al. |
| 6,173,059 | B1 | 1/2001 | Huang et al. |
| 6,243,129 | B1 | 6/2001 | Deierling |
| 6,246,345 | B1 | 6/2001 | Davidson et al. |
| 6,351,238 | B1 | 2/2002 | Kishigami et al. |
| 6,351,731 | B1 | 2/2002 | Anderson et al. |
| 6,363,338 | B1 | 3/2002 | Ubale et al. |
| 6,389,440 | B1 | 5/2002 | Lewis et al. |
| 6,453,285 | B1 | 9/2002 | Anderson et al. |
| 6,459,942 | B1 | 10/2002 | Markow et al. |
| 6,535,604 | B1 | 3/2003 | Provencal et al. |
| 6,535,610 | B1 | 3/2003 | Stewart |
| 6,549,627 | B1 | 4/2003 | Rasmusson et al. |
| 6,566,960 | B1 | 5/2003 | Carver |
| 6,587,823 | B1 | 7/2003 | Kang et al. |
| 6,590,604 | B1 | 7/2003 | Tucker et al. |
| 6,593,956 | B1 | 7/2003 | Potts et al. |
| 6,594,688 | B2 | 7/2003 | Ludwig et al. |
| 6,615,236 | B2 | 9/2003 | Donovan et al. |
| 6,625,271 | B1 | 9/2003 | O'Malley et al. |
| 6,646,997 | B1 | 11/2003 | Baxley et al. |
| 6,657,975 | B1 | 12/2003 | Baxley et al. |
| 6,697,476 | B1 | 2/2004 | O'Malley et al. |
| 6,721,411 | B2 | 4/2004 | O'Malley et al. |
| 6,731,334 | B1 | 5/2004 | Maeng et al. |
| 6,744,887 | B1 | 6/2004 | Berstein et al. |
| 6,760,415 | B2 | 7/2004 | Beecroft |
| 6,778,671 | B1* | 8/2004 | Graumann .................. 381/66 |
| 6,784,814 | B1* | 8/2004 | Nair et al. .................. 341/118 |
| 6,816,904 | B1 | 11/2004 | Ludwig et al. |
| 6,822,507 | B2 | 11/2004 | Buchele |
| 6,831,675 | B2 | 12/2004 | Shachar et al. |
| 6,850,265 | B1 | 2/2005 | Strubbe et al. |
| 6,856,689 | B2 | 2/2005 | Sudo et al. |
| 6,912,178 | B2 | 6/2005 | Chu et al. |
| 6,980,485 | B2 | 12/2005 | McCaskill |
| 7,012,630 | B2 | 3/2006 | Curry et al. |
| 7,130,428 | B2 | 10/2006 | Hirai et al. |
| 7,133,062 | B2 | 11/2006 | Castles et al. |
| 7,339,605 | B2 | 3/2008 | Rodman et al. |
| 2002/0080285 | A1* | 6/2002 | Oshima ..................... 348/724 |
| 2002/0123895 | A1 | 9/2002 | Potekhin et al. |
| 2003/0105799 | A1* | 6/2003 | Khan et al. ................. 709/201 |
| 2003/0197316 | A1 | 10/2003 | Baumhauer, Jr. et al. |
| 2004/0001137 | A1 | 1/2004 | Cutler et al. |
| 2004/0010549 | A1 | 1/2004 | Matus et al. |
| 2004/0032487 | A1 | 2/2004 | Chu et al. |
| 2004/0032796 | A1 | 2/2004 | Chu et al. |
| 2004/0183897 | A1 | 9/2004 | Kenoyer et al. |
| 2005/0157866 | A1 | 7/2005 | Marton et al. |
| 2005/0169459 | A1 | 8/2005 | Marton et al. |
| 2005/0212908 | A1 | 9/2005 | Rodman et al. |
| 2005/0262201 | A1 | 11/2005 | Rudolph et al. |
| 2006/0013416 | A1 | 1/2006 | Truong et al. |
| 2006/0034469 | A1 | 2/2006 | Tamiya et al. |
| 2006/0109998 | A1 | 5/2006 | Michel |
| 2006/0165242 | A1 | 7/2006 | Miki et al. |

FOREIGN PATENT DOCUMENTS

| | | |
|---|---|---|
| JP | 07264102 | 3/1994 |
| JP | 07135478 | 5/1995 |
| JP | 07240722 | 9/1995 |
| JP | 09307651 | 11/1997 |
| JP | 10190848 | 7/1998 |
| WO | PCT/US97/17770 | 10/1997 |
| WO | WO 9922460 | 5/1999 |
| WO | WO 2005064908 | 7/2005 |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"Polycom Executive Collection"; Jun. 2003; 4 pages; Polycom, Inc.; Pleasanton, CA.

"MacSpeech Certifies Voice Tracker™ Array Microphone"; Apr. 20, 2005; 2 pages; MacSpeech Press.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

M. Berger and F. Grenez; "Performance Comparison of Adaptive Algorithms for Acoustic Echo Cancellation"; European Signal Processing Conference, Signal Processing V: Theories and Applications, 1990; pp. 2003-2006.

C.L. Dolph; "A current distribution for broadside arrays which optimizes the relationship between beam width and side-lobe level". Proceedings of the I.R.E. and Wave and Electrons; Jun. 1946; pp. 335-348; vol. 34.

M. Mohan Sondhi, Dennis R. Morgan and Joseph L. Hall; "Stereophonic Acoustic Echo Cancellation—An Overview of the Fundamental Problem"; IEEE Signal Processing Letters; Aug. 1995; pp. 148-151; vol. 2, No. 8.

Rudi Frenzel and Marcus E. Hennecke; "Using Prewhitening and Stepsize Control to Improve the Performance of the LMS Algorithm for Acoustic Echo Compensation"; IEEE International Symposium on Circuits and Systems; 1992; pp. 1930-1932.

Steven L. Gay and Richard J. Mammone; "Fast converging subband acoustic echo cancellation using RAP on the WE DSP16A"; International Conference on Acoustics, Speech, and Signal Processing; Apr. 1990; pp. 1141-1144.

Andre Gilloire and Martin Vetterli; "Adaptive Filtering in Subbands with Critical Sampling: Analysis, Experiments, and Application to Acoustic Echo Cancellation"; IEEE Transactions on Signal Processing, Aug. 1992; pp. 1862-1875; vol. 40, No. 8.

Andre Gilloire; "Experiments with Sub-band Acoustic Echo Cancellers for Teleconferencing"; IEEE International Conference on Acoustics, Speech, and Signal Processing; Apr. 1987; pp. 2141-2144; vol. 12.

Henry Cox, Robert M. Zeskind and Theo Kooij; "Practical Supergain", IEEE Transactions on Acoustics, Speech, and Signal Processing; Jun. 1986; pp. 393-398.

Walter Kellermann; "Analysis and design of multirate systems for cancellation of acoustical echoes"; International Conference on Acoustics, Speech, and Signal Processing, 1988 pp. 2570-2573; vol. 5.

Lloyd Griffiths and Charles W. Jim; "An Alternative Approach to Linearly Constrained Adaptive Beamforming"; IEEE Transactions on Antennas and Propagation; Jan. 1982; pp. 27-34; vol. AP-30, No. 1.

B. K. Lau and Y. H. Leung; "A Dolph-Chebyshev Approach to the Synthesis of Array Patterns for Uniform Circular Arrays" International Symposium on Circuits and Systems; May 2000; 124-127; vol. 1.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, http://research.microsoft.com/users/ivantash/Documents/MicArraysInMSR.pdf; Jun. 2004; 49 pages.

Hiroshi Yasukawa, Isao Furukawa and Yasuzou Ishiyama; "Acoustic Echo Control for High Quality Audio Teleconferencing"; International Conference on Acoustics, Speech, and Signal Processing; May 1989; pp. 2041-2044; vol. 3.

Hiroshi Yasukawa and Shoji Shimada; "An Acoustic Echo Canceller Using Subband Sampling and Decorrelation Methods"; IEEE Transactions On Signal Processing; Feb. 1993; pp. 926-930; vol. 41, Issue 2.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

Man Mohan Sondhi and Dennis R. Morgan; "Acoustic Echo Cancellation for Stereophonic Teleconferencing"; May 9, 1991; 2 pages; AT&T Bell Laboratories, Murray Hill, NJ.

Herbordt, et al., "Joint Optimization of LCMV Beamforming and Acoustic Echo Cancellation for Automatic Speech Recognition", IEEE International Conference on Acoustics, Speech, and Signal Processing 2005, Philadelphia, PA, 4 pages.

Gay, Steven Leslie; "Fast projection algorithms with application to voice echo cancellation"; Doctoral Dissertation, Rutgers University; Oct. 1994; 131 pages.

* cited by examiner

Diaphragm
Plastic Layer
Metal Layer

Sensitivity Pattern for Super-directive Microphone 530

SPEAKERPHONE

PRIORITY CLAIMS

This application claims priority to U.S. Provisional Application No. 60/619,303 titled "Speakerphone", which was filed Oct. 15, 2004, whose inventors are William V. Oxford, Michael L. Kenoyer and Simon Dudley which is hereby incorporated by reference in its entirety as though fully and completely set forth herein.

This application claims priority to U.S. Provisional Application No. 60/634,315 titled "Speakerphone", which was filed Dec. 8, 2004, whose inventors are William V. Oxford, Michael L. Kenoyer and Simon Dudley which is hereby incorporated by reference in its entirety as though fully and completely set forth herein.

BACKGROUND OF THE INVENTION

1. Field of the Invention

The present invention relates generally to the field of communication devices and, more specifically, to speakerphones.

2. Description of the Related Art

Speakerphones are used in many types of telephone calls, and particularly are used in conference calls where multiple people are located in a single room. Speakerphones may have more than one microphone to pick up voices of in-room participants, and at least one speaker to audibly present voices from offsite participants. While speakerphones may allow several people to participate in a conference call on each end of the conference call, speakerphones may have several disadvantages.

For example, sound from the speaker on the speakerphone may be detected by the microphones on the speakerphone. This feedback path may result in uncontrolled oscillation problems. Some speakerphones may incorporate an acoustic echo cancellation (AEC) algorithm to reduce the closed loop gain of the combined microphone/speaker system to something less than one, and thus, reduce the likelihood of uncontrolled oscillation. For example, acoustic echo cancellation may include filters such as a Generalized Sidelobe Canceller (GSC) structure. Such a filter may model the fixed composite frequency response of a speaker including a direct coupling path between the speaker and a microphone. Other AEC filter implementations may model time-varying characteristics of an indirect coupling path between the speaker and microphone. These and other filters may be used to cancel acoustic echo and prevent uncontrolled oscillation.

These methods may require a minimum amount of settling time. This may be a problem, especially if sound (e.g., from people and microphones) moves around relative to the system. The finite settling time may also be a problem in multi-channel audio output systems where a signal for each channel is allowed to pan between multiple loudspeakers.

In addition, these AEC algorithms operate with non-zero buffer sizes, which imply a time delay between when the signal is acquired by the microphone and when a correction signal may be applied to the speaker output. If an AEC algorithm is operating at least partially in the frequency domain, an amount of frequency resolution attainable may be inversely proportional to the amount of data in the input buffer (and thus, inversely proportional to the time delay). If the time delay is sufficiently long, it may be impossible to control the acoustic echo because the acoustic delay may be shorter than the overall loop delay in the AEC (e.g., a control system group delay). If the buffer size is too small, the frequency resolution may be too coarse to permit the AEC to operate effectively. While the system's sampling rate may be increased in order to increase the number of audio samples available per second, this approach may significantly increase computational overhead.

Certain AEC algorithms may require a minimum physical spacing between the speaker and the microphone system in a full-duplex speakerphone system. The minimum distance may be dependent on the available computational resources, but may also be influenced by factors such as open-loop gain in the signal path between the speaker and the microphone system. The open loop gain may be affected by the acoustic characteristics of the system. These characteristics may include frequency response and directional pattern of the microphones and speakers. For example, transducers (e.g., microphones and speakers) may not have a completely frequency independent directional pattern. For example, a cardioid microphone is a unidirectional microphone with a null pointed at the rear of the cardinal direction (i.e., 180 degrees away from the front of the microphone). However, this null may only be effective over a limited frequency range. The direction pattern may degrade to an omnidirectional pattern at frequencies below approximately 200 Hz and above approximately 8 kHz.

Regarding the speaker, the physical structure used to maintain directional response is typically larger than that required to generate the same response pattern for a microphone, due to the amount of air which must be moved in order to generate a sound that is audible from some distance away. In addition, constraining a loudspeaker directional pattern may have an adverse effect on the perceived sound quality for the desired output (i.e., the speaker may sound different depending on the directional angle between the user and the front of the loudspeaker). If the microphone system has a unidirectional response pattern, there may be some angles where the pickup of external sounds will exhibit different frequency response characteristics than others, which may provide a non-uniform coloration to the sound pickup in the so-called "off-axis" directions. From a computational perspective, it is much easier to generate a directional "beam" from an array of microphones which exhibit very little difference in their directional pattern over a wide frequency range than trying to accomplish the same effect with a set of unidirectional microphones which have a non-uniform directional pattern with respect to frequency.

Typically, only those transducers which exhibit purely pressure (omnidirectional) or purely pressure-gradient (so-called "bidirectional" or "figure of eight") response will maintain a uniform response pattern over wide frequency ranges. However, a purely pressure-gradient microphone will exhibit a very different frequency-dependent sensitivity in the near field than it does in the far field (the so-called "proximity effect"), so it can sound quite different in those two cases. Similarly, a purely pressure-gradient speaker system can suffer from a weak low-frequency response, depending on the size of the baffle (the surface which separates the front of the speaker driver from the rear).

Purely pressure (omnidirectional) transducer systems do not suffer these particular disadvantages. Thus, an omnidirectional pattern may thus be the most effective (and natural sounding) for both the microphone and the speaker system, since an omnidirectional pattern may be the closest to frequency-independent operation. Many transducers may be naturally omnidirectional except at frequencies where the size of the radiator is much larger than the wavelength. For microphones this may not present a problem except at the highest frequencies. For speakers, however, it may be more challenging to produce a transducer that is small in size (for wide dispersion) and able to displace enough air in order to generate an acceptable acoustic output. While omnidirectional patterns for speakers and microphones may be desirable, such patterns may be challenging in a speaker/microphone coupling, since this configuration is the one which presents the largest closed-loop gain in an otherwise uncorrected microphone-speaker system.

Another concern with such microphone-speaker systems is in how to best approximate the signal presented at the microphone input by the output of the speaker. In the traditional AEC-corrected system, this microphone-speaker transfer function is approximated internally by the AEC algorithm. However, the non-linearity of the system cannot be completely corrected by a linear model. Thus, the AEC algorithm performance (the amount of closed-loop gain that it can effectively cancel) can suffer if the speaker system produces a highly non-linear output from a given input. Since speaker systems are more linear at lower excursions (volume levels), this can limit the maximum output level that the speaker can produce without incurring unwanted feedback.

Another problem that can be associated with a closely coupled microphone-speaker system is that the speaker is typically much closer to the microphone (in the sense of spatial distance) than the sound sources (conference participants) present in the outside room. This, coupled with the inverse-square radiation law, produces a much more intense sound field at the microphone input due to the speaker than an equally loud sound source located in the surrounding environment. However, it is desirable for the microphone system to be able to respond to a wide range of loudness levels from external sound sources, so in the case where such an external source is quiet, the microphone system sensitivity may be quite high. This typically involves a large gain in the microphone preamplifier stage of the system. However, in that case, the high gain of the system may cause unwanted overloading of the microphone preamplifier stage due to the excessively strong response in this microphone system from the output of the speaker system.

Powering a speakerphone may also present several problems. For example, power cords to the speakerphone may be cumbersome. In addition, batteries may be expensive and short lived which could cause problems in long conference calls.

SUMMARY

In one set of embodiments, a system includes a memory, a processor and a subtraction circuit. The memory is configured to store program instructions. The processor is configured to read and execute the program instructions from the memory. The program instructions are configured to direct the processor to:

operate on samples of a digital output signal to determine samples of a digital correction signal, wherein the output signal samples are directed to an output channel for transmission from a speaker; and supply the digital correction signal samples to a first digital-to-analog converter for conversion into an analog correction signal.

The subtraction circuit is configured to generate a difference signal which is a difference between a first analog signal provided by a microphone and the analog correction signal, wherein the analog correction signal is an estimate of a contribution to the first analog signal due to a direct path transmission between the speaker and the microphone. The program instructions are further configured to direct the processor to:

receive a digital input signal derived from the difference signal; and perform acoustic echo cancellation on the digital input signal to obtain a resultant signal, wherein the acoustic echo cancellation is configured to remove contributions to the digital input signal due to reflected path transmissions between the speaker and the microphone.

The system may also include a preamplifier configured to amplify the difference signal to generate an amplified signal. The digital input signal is derived from the amplified signal.

The system may also include an analog-to-digital converter configured to digitize the amplified signal in order to generate the digital input signal.

In some embodiments, the microphone may be an omnidirectional microphone.

The process of operating on the digital output signal samples to determine the digital correction signal samples includes applying a speaker input-output model to the digital output signal samples in the time domain to determine a digital representation $R_{SP}$ of the speaker output. (The speaker input-output model may be a nonlinear model.) Said process may also include applying a first transfer function, corresponding to the direct path transmission from the speaker to the microphone, to the digital representation $R_{SP}$ to obtain a digital representation $A_{MIC}$ of the microphone's acoustic input. Said process may also include applying a transfer function of the microphone to the digital representation $A_{MIC}$ to determine a digital representation of the analog correction signal.

The program instructions may be configured to direct the processor to perform a calibration procedure in order to estimate the first transfer function. The calibration procedure may include: (a) transmitting a noise burst from the speaker; (b) capturing second samples of the digital input signal in response to the noise burst; and (c) performing a cross correlation between the noise burst and the second samples to determine a time delay of the direct path transmission between the speaker and the microphone.

The calibration procedure may also include: repeating (a), (b) and (c) using different phases of a D/A conversion clock (or an A/D conversion clock) relative to a base conversion clock in order to obtain a refined estimate of the time delay.

In one embodiment, the program instructions are further configured to direct the processor to generate a plurality of correction signals for a plurality of microphones respectively, wherein each of correction signals is an estimate of a direct path contribution to the signal captured by a corresponding one of the microphones.

In some embodiments, a method for canceling speaker signal energy from a microphone signal may involve:

operating on samples of a digital output signal to determine samples of a digital correction signal, wherein the output signal samples are directed to an output channel for transmission from a speaker;

supplying the digital correction signal samples to a first digital-to-analog converter for conversion into an analog correction signal;

generating a difference signal which is a difference between a first analog signal provided by a microphone and the analog correction signal, wherein the analog correction signal is an estimate of a contribution to the first analog signal due to a direct path transmission between the speaker and the microphone;

receiving a digital input signal derived from the difference signal; and performing acoustic echo cancellation on the digital input signal to obtain a resultant signal, wherein the acoustic echo cancellation is configured to remove contributions to the digital input signal due to reflected path transmissions between the speaker and the microphone.

Such a method may be especially useful for speakerphones and videoconferencing system where a speaker and a microphone may be located close to each other, e.g., on the housing of the speakerphone (or videoconferencing system).

Any of the various methods described herein may be implemented in terms of program instructions executable by one or more processors. The program instructions may be stored on a computer-readable memory media of various kinds.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE PREFERRED EMBODIMENTS

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety as though fully and completely set forth herein.

U.S. Provisional Patent Application titled "Video Conference Call System", Ser. No. 60/619,210, which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety as though fully and completely set forth herein.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

U.S. Provisional Patent Application titled "Speakerphone Functionality", Ser. No. 60/676,415, which was filed Apr. 29, 2005, whose inventors are William V. Oxford, Vijay Varadarajan and Ioannis S. Dedes, is hereby incorporated by reference in its entirety as though fully and completely set forth herein.

Figure 1A:
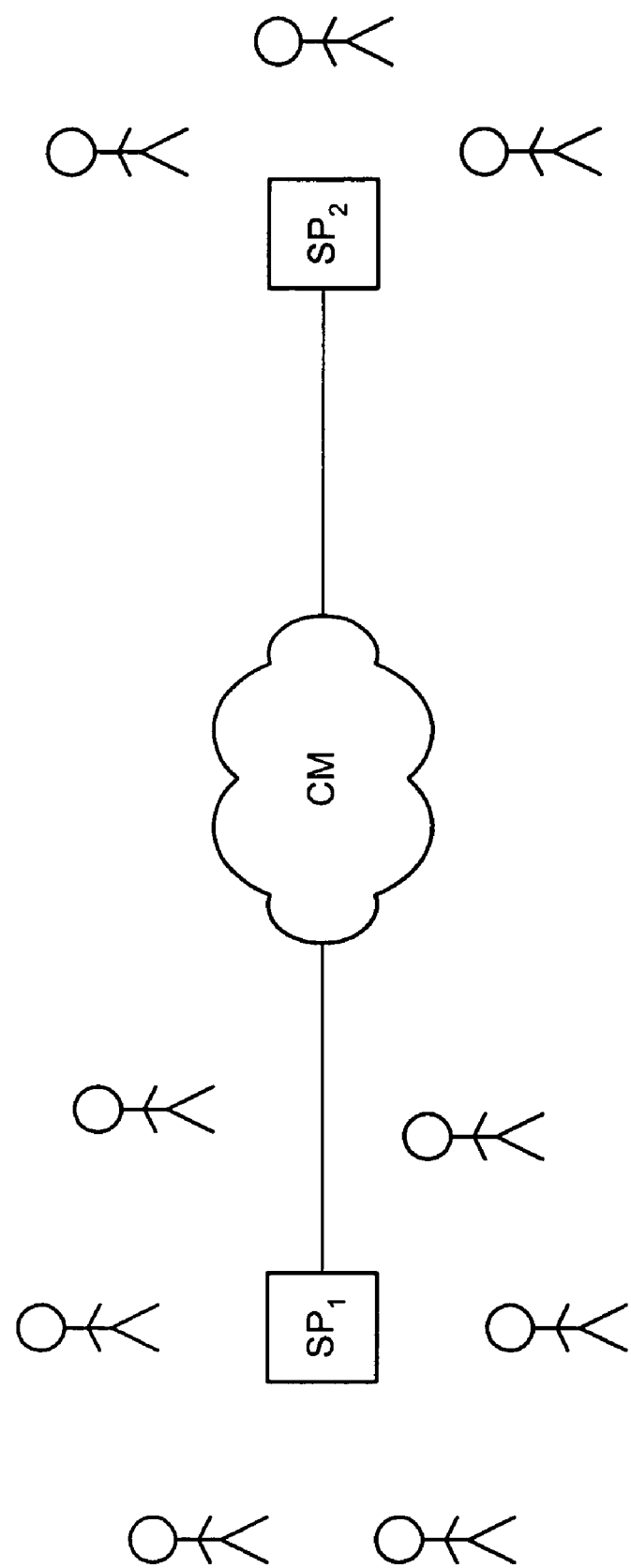
FIG. 1A illustrates communication system including two speakerphones coupled through a communication mechanism.

List of Acronyms Used Herein
DDR SDRAM=Double-Data-Rate Synchronous Dynamic RAM
DRAM=Dynamic RAM
FIFO=First-In First-Out Buffer
FIR=Finite Impulse Response
FFT=Fast Fourier Transform
Hz=Hertz
IIR=Infinite Impulse Response
ISDN=Integrated Services Digital Network
kHz=kiloHertz
PSTN=Public Switched Telephone Network
RAM=Random Access Memory
RDRAM=Rambus Dynamic RAM
ROM=Read Only Memory
SDRAM=Synchronous Dynamic Random Access Memory
SRAM=Static RAM A communication system may be configured to facilitate voice communication between participants (or groups of participants) who are physically separated as suggested by FIG. 1A. The communication system may include a first speakerphone $SP_1$ and a second speakerphone $SP_2$ coupled through a communication mechanism CM. The communication mechanism CM may be realized by any of a wide variety of well known communication mechanisms. For example, communication mechanism CM may be the PSTN (public switched telephone network) or a computer network such as the Internet.

Speakerphone Block Diagram

Figure 1B:
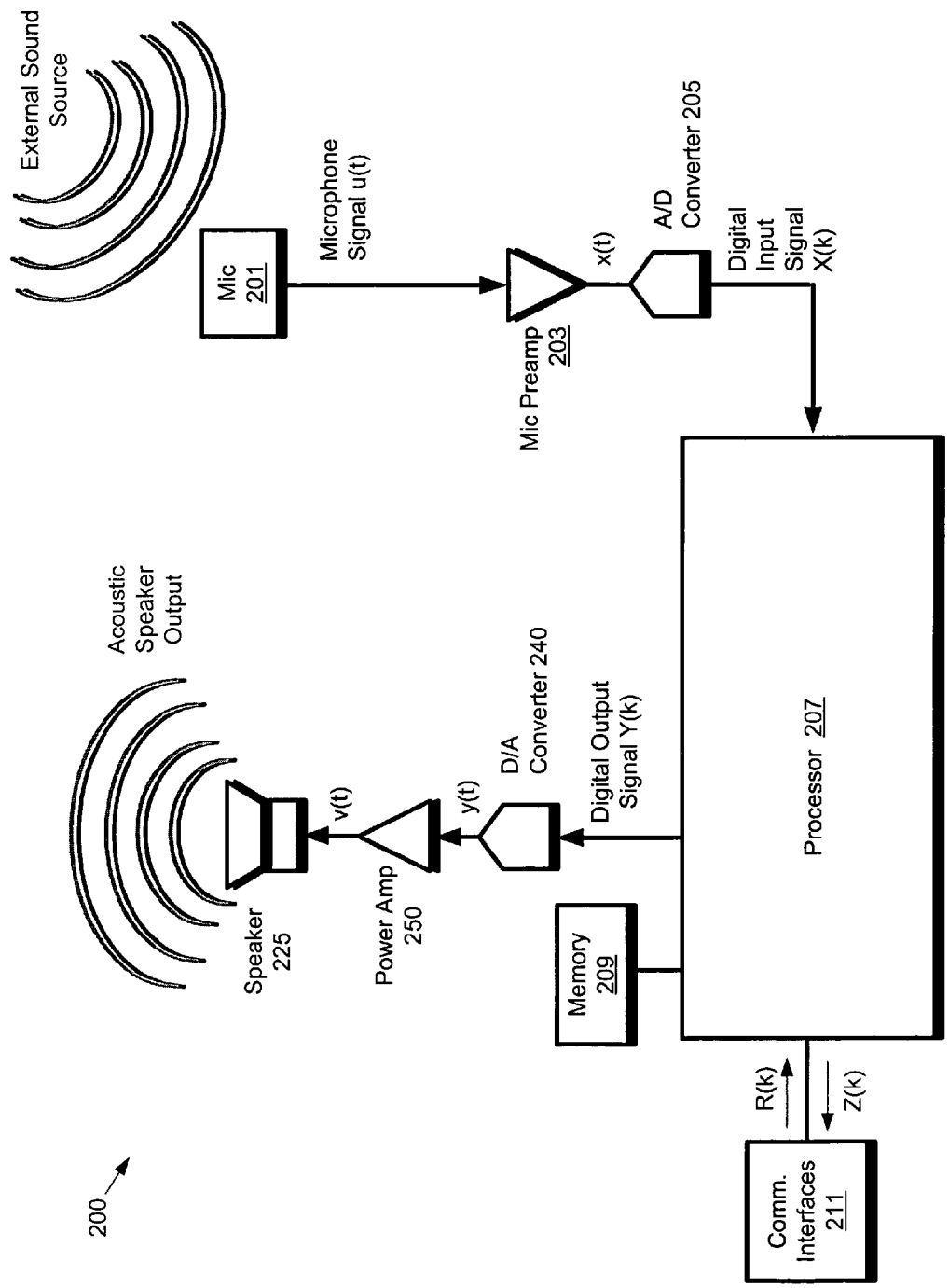
FIG. 1B illustrates one set of embodiments of a speakerphone system 200.

FIG. 1B illustrates a speakerphone 200 according to one set of embodiments. The speakerphone 200 may include a processor 207 (or a set of processors), memory 209, a set 211 of one or more communication interfaces, an input subsystem and an output subsystem.

The processor 207 is configured to read program instructions which have been stored in memory 209 and to execute the program instructions in order to enact any of the various methods described herein.

Memory 209 may include any of various kinds of semiconductor memory or combinations thereof. For example, in one embodiment, memory 209 may include a combination of Flash ROM and DDR SDRAM.

The input subsystem may include a microphone 201 (e.g., an electret microphone), a microphone preamplifier 203 and an analog-to-digital (A/D) converter 205. The microphone 201 receives an acoustic signal A(t) from the environment and converts the acoustic signal into an electrical signal u(t). (The variable t denotes time.) The microphone preamplifier 203 amplifies the electrical signal u(t) to produce an amplified signal x(t). The A/D converter samples the amplified signal x(t) to generate digital input signal X(k). The digital input signal X(k) is provided to processor 207.

In some embodiments, the A/D converter may be configured to sample the amplified signal x(t) at least at the Nyquist rate for speech signals. In other embodiments, the A/D converter may be configured to sample the amplified signal x(t) at least at the Nyquist rate for audio signals.

Processor 207 may operate on the digital input signal X(k) to remove various sources of noise, and thus, generate a corrected microphone signal Z(k). The processor 207 may send the corrected microphone signal Z(k) to one or more remote devices (e.g., a remote speakerphone) through one or more of the set 211 of communication interfaces.

The set 211 of communication interfaces may include a number of interfaces for communicating with other devices (e.g., computers or other speakerphones) through well-known communication media. For example, in various embodiments, the set 211 includes a network interface (e.g., an Ethernet bridge), an ISDN interface, a PSTN interface, or, any combination of these interfaces.

The speakerphone 200 may be configured to communicate with other speakerphones over a network (e.g., an Internet Protocol based network) using the network interface. In one embodiment, the speakerphone 200 is configured so multiple speakerphones, including speakerphone 200, may be coupled together in a daisy chain configuration.

The output subsystem may include a digital-to-analog (D/A) converter 240, a power amplifier 250 and a speaker 225. The processor 207 may provide a digital output signal Y(k) to the D/A converter 240. The D/A converter 240 converts the digital output signal Y(k) to an analog signal y(t). The power amplifier 250 amplifies the analog signal y(t) to generate an amplified signal v(t). The amplified signal v(t) drives the speaker 225. The speaker 225 generates an acoustic output signal in response to the amplified signal v(t).

Processor 207 may receive a remote audio signal R(k) from a remote speakerphone through one of the communication interfaces and mix the remote audio signal R(k) with any locally generated signals (e.g., beeps or tones) in order to generate the digital output signal Y(k). Thus, the acoustic signal radiated by speaker 225 may be a replica of the acoustic signals (e.g., voice signals) produced by remote conference participants situated near the remote speakerphone.

In one alternative embodiment, the speakerphone may include circuitry external to the processor 207 to perform the mixing of the remote audio signal R(k) with any locally generated signals.

In general, the digital input signal X(k) represents a superposition of contributions due to:

acoustic signals (e.g., voice signals) generated by one or more persons (e.g., conference participants) in the environment of the speakerphone 200, and reflections of these acoustic signals off of acoustically reflective surfaces in the environment;

acoustic signals generated by one or more noise sources (such as fans and motors, automobile traffic and fluorescent light fixtures) and reflections of these acoustic signals off of acoustically reflective surfaces in the environment; and the acoustic signal generated by the speaker 225 and the reflections of this acoustic signal off of acoustically reflective surfaces in the environment.

Processor 207 may be configured to execute software including an acoustic echo cancellation (AEC) module. The AEC module attempts to estimate the sum C(k) of the contributions to the digital input signal X(k) due to the acoustic signal generated by the speaker and a number of its reflections, and, to subtract this sum C(k) from the digital input signal X(k) so that the corrected microphone signal Z(k) may be a higher quality representation of the acoustic signals generated by the local conference participants.

In one set of embodiments, the AEC module may be configured to perform many (or all) of its operations in the frequency domain instead of in the time domain. Thus, the AEC module may:

estimate the Fourier spectrum $C(\omega)$ of the signal C(k) instead of the signal C(k) itself, and subtract the spectrum $C(\omega)$ from the spectrum $X(\omega)$ of the input signal X(k) in order to obtain a spectrum $Z(\omega)$.

An inverse Fourier transform may be performed on the spectrum $Z(\omega)$ to obtain the corrected microphone signal Z(k). As used herein, the "spectrum" of a signal is the Fourier transform (e.g., the FFT) of the signal.

In order to estimate the spectrum $C(\omega)$, the acoustic echo cancellation module may utilize:

the spectrum $Y(\omega)$ of a set of samples of the output signal Y(k), and modeling information $I_M$ describing the input-output behavior of the system elements (or combinations of system elements) between the circuit nodes corresponding to signals Y(k) and X(k).

For example, in one set of embodiments, the modeling information $I_M$ may include:

(a) a gain of the D/A converter 240;
(b) a gain of the power amplifier 250;
(c) an input-output model for the speaker 225;
(d) parameters characterizing a transfer function for the direct path and reflected path transmissions between the output of speaker 225 and the input of microphone 201;
(e) a transfer function of the microphone 201;
(f) a gain of the preamplifier 203;
(g) a gain of the A/D converter 205.

Figure 2:
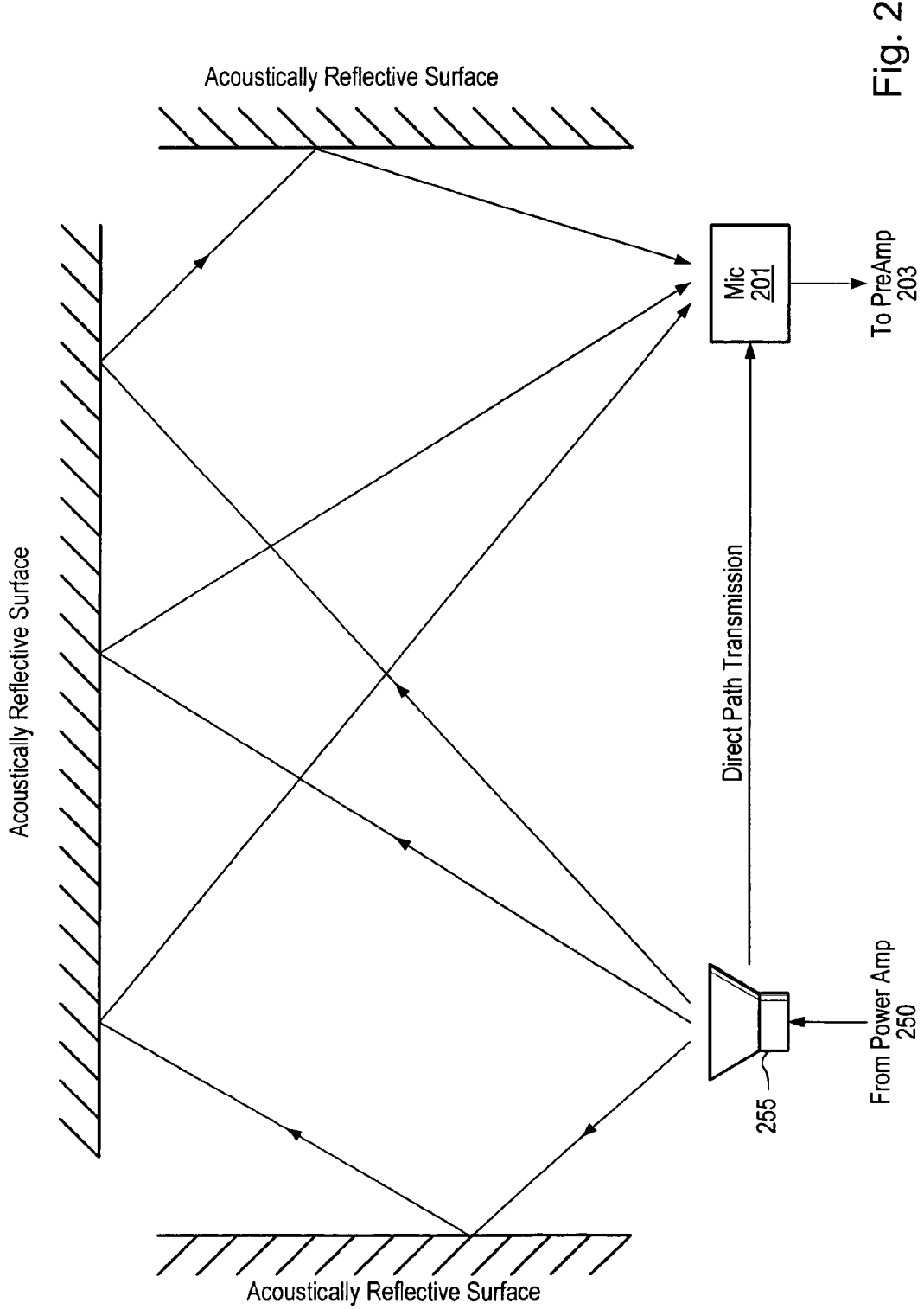
FIG. 2 illustrates a direct path transmission and three examples of reflected path transmissions between the speaker 255 and microphone 201.

The parameters (d) may include attenuation coefficients and propagation delay times for the direct path transmission and a set of the reflected path transmissions between the output of speaker 225 and the input of microphone 201. FIG. 2 illustrates the direct path transmission and three reflected path transmission examples.

In some embodiments, the input-output model for the speaker may be (or may include) a nonlinear Volterra series model, e.g., a Volterra series model of the form:

$$f_S(k) = \sum_{i=0}^{N_a-1} a_i v(k-i) + \sum_{i=0}^{N_b-1} \sum_{j=0}^{M_b-1} b_{ij} v(k-i) \cdot v(k-j), \qquad (1)$$

where v(k) represents a discrete-time version of the speaker's input signal, where $f_S(k)$ represents a discrete-time version of the speaker's acoustic output signal, where $N_a$, $N_b$ and $M_b$ are positive integers. For example, in one embodiment, $N_a=8$, $N_b=3$ and $M_b=2$. Expression (1) has the form of a quadratic polynomial. Other embodiments using higher order polynomials are contemplated.

In alternative embodiments, the input-output model for the speaker is a transfer function (or equivalently, an impulse response).

In one embodiment, the AEC module may compute the compensation spectrum $C(\omega)$ using the output spectrum $Y(\omega)$ and the modeling information $I_M$ (including previously estimated values of the parameters (d)). Furthermore, the AEC module may compute an update for the parameters (d) using the output spectrum $Y(\omega)$, the input spectrum $X(\omega)$, and at least a subset of the modeling information $I_M$ (possibly including the previously estimated values of the parameters (d)).

In another embodiment, the AEC module may update the parameters (d) before computing the compensation spectrum $C(\omega)$.

In those embodiments where the speaker input-output model is a nonlinear model (such as a Volterra series model), the AEC module may be able to converge more quickly and/or achieve greater accuracy in its estimation of the attenuation coefficients and delay times (of the direct path and reflected paths) because it will have access to a more accurate representation of the actual acoustic output of the speaker than in those embodiments where a linear model (e.g., a transfer function) is used to model the speaker.

In some embodiments, the AEC module may employ one or more computational algorithms that are well known in the field of echo cancellation.

The modeling information $I_M$ (or certain portions of the modeling information $I_M$) may be initially determined by measurements performed at a testing facility prior to sale or distribution of the speakerphone 200. Furthermore, certain portions of the modeling information $I_M$ (e.g., those portions that are likely to change over time) may be repeatedly updated based on operations performed during the lifetime of the speakerphone 200.

In one embodiment, an update to the modeling information $I_M$ may be based on samples of the input signal X(k) and samples of the output signal Y(k) captured during periods of time when the speakerphone is not being used to conduct a conversation.

In another embodiment, an update to the modeling information $I_M$ may be based on samples of the input signal X(k) and samples of the output signal Y(k) captured while the speakerphone 200 is being used to conduct a conversation.

In yet another embodiment, both kinds of updates to the modeling information $I_M$ may be performed.

Updating Modeling Information Based on Offline Calibration Experiments

In one set of embodiments, the processor 207 may be programmed to update the modeling information $I_M$ during a period of time when the speakerphone 200 is not being used to conduct a conversation.

The processor 207 may wait for a period of relative silence in the acoustic environment. For example, if the average power in the input signal X(k) stays below a certain threshold for a certain minimum amount of time, the processor 207 may reckon that the acoustic environment is sufficiently silent for a calibration experiment. The calibration experiment may be performed as follows.

The processor 207 may output a known noise signal as the digital output signal Y(k). In some embodiments, the noise signal may be a burst of maximum-length-sequence noise, followed by a period of silence. For example, in one embodiment, the noise signal burst may be approximately 2-2.5 seconds long and the following silence period may be approximately 5 seconds long.

The processor 207 may capture a block $B_X$ of samples of the digital input signal X(k) in response to the noise signal transmission. The block $B_X$ may be sufficiently large to capture the response to the noise signal and a sufficient number of its reflections for a maximum expected room size.

The block $B_X$ of samples may be stored into a temporary buffer, e.g., a buffer which has been allocated in memory 209.

The processor 207 computes a Fast Fourier Transform (FFT) of the captured block $B_X$ of input signal samples X(k) and an FFT of a corresponding block $B_Y$ of samples of the known noise signal Y(k), and computes an overall transfer function H(ω) for the current experiment according to the relation $$H(\omega) = FFT(B_X)/FFT(B_Y), \qquad (2)$$

where ω denotes angular frequency. The processor may make special provisions to avoid division by zero.

The processor 207 may operate on the overall transfer function H(ω) to obtain a midrange sensitivity value $s_1$ as follows.

The midrange sensitivity value $s_1$ may be determined by computing an A-weighted average of the overall transfer function H(ω):

$$s_1 = SUM[H(\omega)A(\omega), \omega \text{ ranging from zero to } \pi]. \qquad (3)$$

In some embodiments, the weighting function A(ω) may be designed so as to have low amplitudes:
- at low frequencies where changes in the overall transfer function due to changes in the properties of the speaker are likely to be expressed, and
- at high frequencies where changes in the overall transfer function due to material accumulation on the microphone diaphragm are likely to be expressed.

Figure 3:
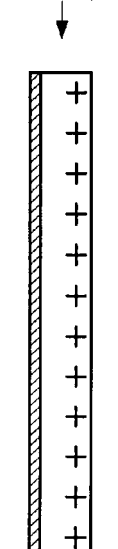
FIG. 3 illustrates a diaphragm of an electret microphone.

The diaphragm of an electret microphone is made of a flexible and electrically non-conductive material such as plastic (e.g., Mylar) as suggested in FIG. 3. Charge (e.g., positive charge) is deposited on one side of the diaphragm at the time of manufacture. A layer of metal may be deposited on the other side of the diaphragm.

Figure 4A:
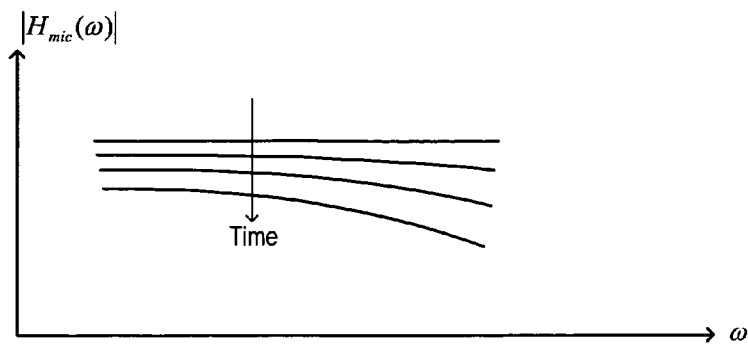
FIG. 4A illustrates the change over time of a microphone transfer function.

As the microphone ages, the deposited charge slowly dissipates, resulting in a gradual loss of sensitivity over all frequencies. Furthermore, as the microphone ages material such as dust and smoke accumulates on the diaphragm, making it gradually less sensitive at high frequencies. The summation of the two effects implies that the amplitude of the microphone transfer function $|H_{mic}(\omega)|$ decreases at all frequencies, but decreases faster at high frequencies as suggested by FIG. 4A. If the speaker were ideal (i.e., did not change its properties over time), the overall transfer function H(ω) would manifest the same kind of changes over time.

Figure 4B:
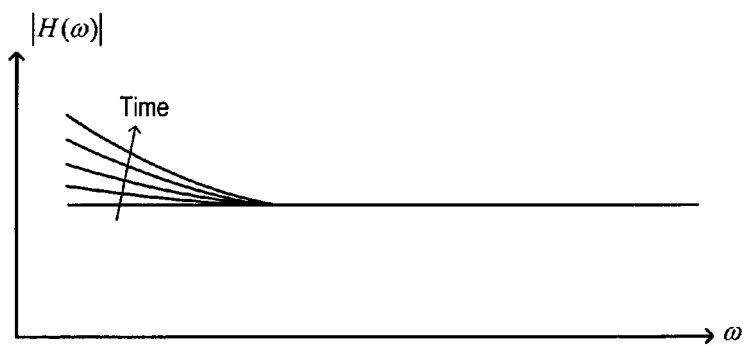
FIG. 4B illustrates the change over time of the overall transfer function due to changes in the properties of the speaker over time under the assumption of an ideal microphone.

The speaker 225 includes a cone and a surround coupling the cone to a frame. The surround is made of a flexible material such as butyl rubber. As the surround ages it becomes more compliant, and thus, the speaker makes larger excursions from its quiescent position in response to the same current stimulus. This effect is more pronounced at lower frequencies and negligible at high frequencies. In addition, the longer excursions at low frequencies implies that the vibrational mechanism of the speaker is driven further into the nonlinear regime. Thus, if the microphone were ideal (i.e., did not change its properties over time), the amplitude of the overall transfer function H(ω) in expression (2) would increase at low frequencies and remain stable at high frequencies, as suggested by FIG. 4B.

The actual change to the overall transfer function H(ω) over time is due to a combination of affects including the speaker aging mechanism and the microphone aging mechanism just described.

In addition to the sensitivity value $s_1$, the processor 207 may compute a lowpass sensitivity value $s_2$ and a speaker related sensitivity $s_3$ as follows. The lowpass sensitivity factor $s_2$ may be determined by computing a lowpass weighted average of the overall transfer function H(ω):

$$s_2 = SUM[H(\omega)L(\omega), \omega \text{ ranging from zero to } \pi]. \qquad (4)$$

Figure 5:
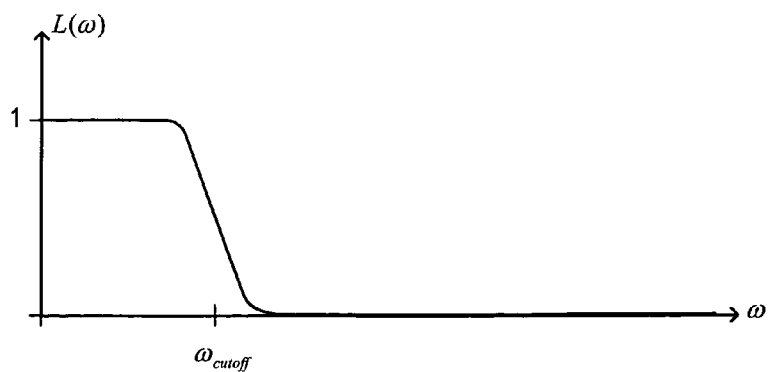
FIG. 5 illustrates a lowpass weighting function $L(\omega)$.

The lowpass weighting function L(ω) equals is equal (or approximately equal) to one at low frequencies and transitions towards zero in the neighborhood of a cutoff frequency. In one embodiment, the lowpass weighting function may smoothly transition to zero as suggested in FIG. 5.

The processor 207 may compute the speaker-related sensitivity value $S_3$ according to the expression:

$$s_3 = s_2 - s_1.$$

The processor 207 may maintain sensitivity averages $S_1$, $S_2$ and $S_3$ corresponding to the sensitivity values $s_1$, $s_2$ and $s_3$ respectively. The average $S_i$, i=1, 2, 3, represents the average of the sensitivity value $s_i$ from past performances of the calibration experiment.

Furthermore, processor 207 may maintain averages $A_i$ and $B_{ij}$ corresponding respectively to the coefficients $a_i$ and $b_{ij}$ in the Volterra series speaker model. After computing sensitivity value $s_3$, the processor may compute current estimates for the coefficients $b_{ij}$ by performing an iterative search. Any of a wide variety of known search algorithms may be used to perform this iterative search.

In each iteration of the search, the processor may select values for the coefficients $b_{ij}$ and then compute an estimated input signal $X_{EST}(k)$ based on:
- the block $B_Y$ of samples of the transmitted noise signal Y(k);
- the gain of the D/A converter 240 and the gain of the power amplifier 250;
- the modified Volterra series expression $$f_S(k) = c \sum_{i=0}^{N_a-1} A_i v(k-i) + \sum_{i=0}^{N_b-1} \sum_{j=0}^{M_b-1} b_{ij} v(k-i) \cdot v(k-j), \qquad (5)$$

where c is given by $c = s_3/S_3$;

the parameters characterizing the transfer function for the direct path and reflected path transmissions between the output of speaker 225 and the input of microphone 201;
the transfer function of the microphone 201;
the gain of the preamplifier 203; and
the gain of the A/D converter 205.

The processor may compute the energy of the difference between the estimated input signal $X_{EST}(k)$ and the block $B_X$ of actually received input samples $X(k)$. If the energy value is sufficiently small, the iterative search may terminate. If the energy value is not sufficiently small, the processor may select a new set of values for the coefficients $b_{ij}$, e.g., using knowledge of the energy values computed in the current iteration and one or more previous iterations.

The scaling of the linear terms in the modified Volterra series expression (5) by factor c serves to increase the probability of successful convergence of the $b_{ij}$.

After having obtained final values for the coefficients $b_{ij}$, the processor 207 may update the average values $B_{ij}$ according to the relations:

$$B_{ij} \leftarrow k_{ij} B_{ij} + (1-k_{ij}) b_{ij}, \quad (6)$$

where the values $k_{ij}$ are positive constants between zero and one.

In one embodiment, the processor 207 may update the averages $A_i$ according to the relations:

$$A_i \leftarrow g_i A_i + (1-g_i)(cA_i), \quad (7)$$

where the values $g_i$ are positive constants between zero and one.

In an alternative embodiment, the processor may compute current estimates for the Volterra series coefficients $a_i$ based on another iterative search, this time using the Volterra expression:

$$f_S(k) = \sum_{i=0}^{N_a-1} a_i v(k-i) + \sum_{i=0}^{N_b-1} \sum_{j=0}^{M_b-1} B_{ij} v(k-i) \cdot v(k-j). \quad (8A)$$

After having obtained final values for the coefficients $a_i$, the processor may update the averages $A_i$ according the relations:

$$A_i \leftarrow g_i A_i + (1-g_i) a_i. \quad (8B)$$

The processor may then compute a current estimate $T_{mic}$ of the microphone transfer function based on an iterative search, this time using the Volterra expression:

$$f_S(k) = \sum_{i=0}^{N_a-1} A_i v(k-i) + \sum_{i=0}^{N_b-1} \sum_{j=0}^{M_b-1} B_{ij} v(k-i) \cdot v(k-j). \quad (9)$$

After having obtained a current estimate $T_{mic}$ for the microphone transfer function, the processor may update an average microphone transfer function $H_{mic}$ based on the relation:

$$H_{mic}(\omega) \leftarrow k_m H_{mic}(\omega) + (1-k_m) T_{mic}(\omega), \quad (10)$$

where $k_m$ is a positive constant between zero and one.

Furthermore, the processor may update the average sensitivity values $S_1$, $S_2$ and $S_3$ based respectively on the currently computed sensitivities $s_1$, $s_2$, $s_3$, according to the relations:

$$S_1 \leftarrow h_1 S_1 + (1-h_1) s_1, \quad (11)$$

$$S_2 \leftarrow h_2 S_2 + (1-h_2) s_2, \quad (12)$$

$$S_3 \leftarrow h_3 S_3 + (1-h_3) s_3, \quad (13)$$

where $h_1$, $h_2$, $h_3$ are positive constants between zero and one.

In the discussion above, the average sensitivity values, the Volterra coefficient averages $A_i$ and $B_{ij}$ and the average microphone transfer function $H_{mic}$ are each updated according to an IIR filtering scheme. However, other filtering schemes are contemplated such as FIR filtering (at the expense of storing more past history data), various kinds of nonlinear filtering, etc.

In one set of embodiments, a system (e.g., a speakerphone or a videoconferencing system) may include a microphone, a speaker, memory and a processor, e.g., as illustrated in FIG. 1B. The memory may be configured to store program instructions and data. The processor is configured to read and execute the program instructions from the memory. The program instructions are executable by the processor to:

(a) output a stimulus signal (e.g., a noise signal) for transmission from the speaker;
(b) receive an input signal from the microphone, corresponding to the stimulus signal and its reverb tail;
(c) compute a midrange sensitivity and a lowpass sensitivity for a spectrum of a transfer function $H(\omega)$ derived from a spectrum of the input signal and a spectrum of the stimulus signal;
(d) subtract the midrange sensitivity from the lowpass sensitivity to obtain a speaker-related sensitivity;
(e) perform an iterative search for current values of parameters of an input-output model for the speaker using the input signal spectrum, the stimulus signal spectrum, the speaker-related sensitivity; and
(f) update averages of the parameters of the speaker input-output model using the current values obtained in (e).

The parameter averages of the speaker input-output model are usable to perform echo cancellation on other input signals.

The input-output model of the speaker may be a nonlinear model, e.g., a Volterra series model.

Furthermore, in some embodiments, the program instructions may be executable by the processor to:
perform an iterative search for a current transfer function of the microphone using the input signal spectrum, the stimulus signal spectrum, and the current values; and
update an average microphone transfer function using the current transfer function.

The average transfer function is also usable to perform said echo cancellation on said other input signals.

Figure 6A:
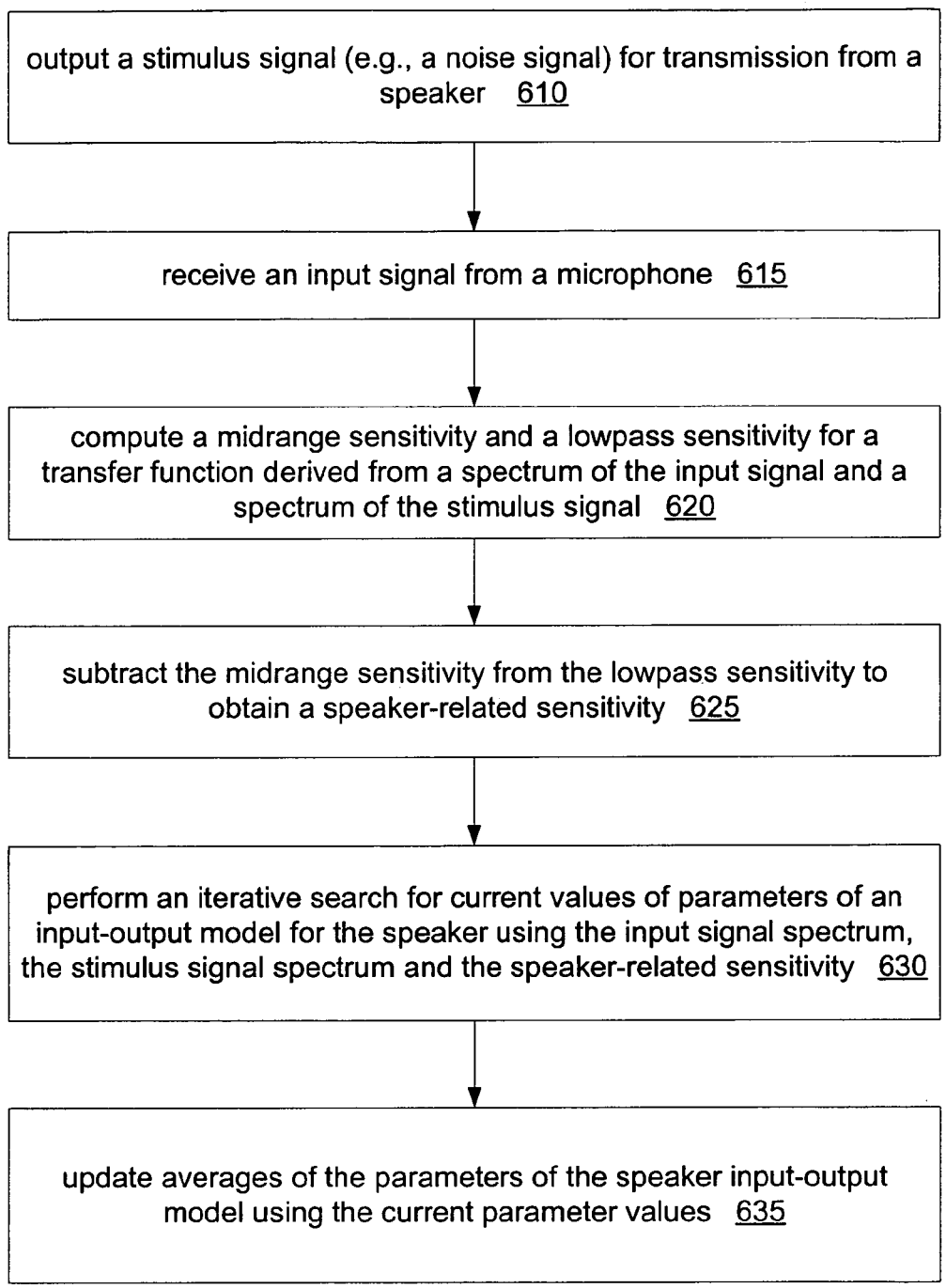
FIG. 6A illustrates one set of embodiments of a method for performing offline self calibration.

In another set of embodiments, as illustrated in FIG. 6A, a method for performing self calibration may involve the following steps:

(a) outputting a stimulus signal (e.g., a noise signal) for transmission from a speaker (as indicated at step 610);
(b) receiving an input signal from a microphone, corresponding to the stimulus signal and its reverb tail (as indicated at step 615);
(c) computing a midrange sensitivity and a lowpass sensitivity for a transfer function $H(\omega)$ derived from a spectrum of the input signal and a spectrum of the stimulus signal (as indicated at step 620);
(d) subtracting the midrange sensitivity from the lowpass sensitivity to obtain a speaker-related sensitivity (as indicated at step 625);
(e) performing an iterative search for current values of parameters of an input-output model for the speaker using the input signal spectrum, the stimulus signal spectrum, the speaker-related sensitivity (as indicated at step 630); and
(f) updating averages of the parameters of the speaker input-output model using the current parameter values (as indicated at step 635).

The parameter averages of the speaker input-output model are usable to perform echo cancellation on other input signals.

The input-output model of the speaker may be a nonlinear model, e.g., a Volterra series model.

Updating Modeling Information Based on Online Data Gathering

In one set of embodiments, the processor 207 may be programmed to update the modeling information $I_M$ during periods of time when the speakerphone 200 is being used to conduct a conversation.

Suppose speakerphone 200 is being used to conduct a conversation between one or more persons situated near the speakerphone 200 and one or more other persons situated near a remote speakerphone (or videoconferencing system). In this case, the processor 207 sends out the remote audio signal R(k), provided by the remote speakerphone, as the digital output signal Y(k). It would probably be offensive to the local persons if the processor 207 interrupted the conversation to inject a noise transmission into the digital output stream Y(k) for the sake of self calibration. Thus, the processor 207 may perform its self calibration based on samples of the output signal Y(k) while it is "live", i.e., carrying the audio information provided by the remote speakerphone. The self-calibration may be performed as follows.

The processor 207 may start storing samples of the output signal Y(k) into an first FIFO and storing samples of the input signal X(k) into a second FIFO, e.g., FIFOs allocated in memory 209. Furthermore, the processor may scan the samples of the output signal Y(k) to determine when the average power of the output signal Y(k) exceeds (or at least reaches) a certain power threshold. The processor 207 may terminate the storage of the output samples Y(k) into the first FIFO in response to this power condition being satisfied. However, the processor may delay the termination of storage of the input samples X(k) into the second FIFO to allow sufficient time for the capture of a full reverb tail corresponding to the output signal Y(k) for a maximum expected room size.

The processor 207 may then operate, as described above, on a block $B_Y$ of output samples stored in the first FIFO and a block $B_X$ of input samples stored in the second FIFO to compute:

(1) current estimates for Volterra coefficients $a_i$ and $b_{ij}$;
(2) a current estimate $T_{mic}$ for the microphone transfer function;
(3) updates for the average Volterra coefficients $A_i$ and $B_{ij}$; and
(4) updates for the average microphone transfer function $H_{mic}$.

Because the block $B_X$ of received input samples is captured while the speakerphone 200 is being used to conduct a live conversation, the block $B_X$ is very likely to contain interference (from the point of view of the self calibration) due to the voices of persons in the environment of the microphone 201. Thus, in updating the average values with the respective current estimates, the processor may strongly weight the past history contribution, i.e., more strongly than in those situations described above where the self-calibration is performed during periods of silence in the external environment.

In some embodiments, a system (e.g., a speakerphone or a videoconferencing system) may include a microphone, a speaker, memory and a processor, e.g., as illustrated in FIG. 1B. The memory may be configured to store program instructions and data. The processor is configured to read and execute the program instructions from the memory. The program instructions are executable by the processor to:

(a) provide an output signal for transmission from the speaker, wherein the output signal carries live signal information from a remote source;
(b) receive an input signal from the microphone, corresponding to the output signal and its reverb tail;
(c) compute a midrange sensitivity and a lowpass sensitivity for a transfer function derived from a spectrum of the input signal and a spectrum of the output signal;
(d) subtract the midrange sensitivity from the lowpass sensitivity to obtain a speaker-related sensitivity;
(e) perform an iterative search for current values of parameters of an input-output model for the speaker using the input signal spectrum, the output signal spectrum, the speaker-related sensitivity; and
(f) update averages of the parameters of the speaker input-output model using the current values obtained in (e).

The parameter averages of the speaker input-output model are usable to perform echo cancellation on other input signals (i.e., other blocks of samples of the digital input signal X(k)).

The input-output model of the speaker is a nonlinear model, e.g., a Volterra series model.

Furthermore, in some embodiments, the program instructions may be executable by the processor to:
perform an iterative search for a current transfer function of the microphone using the input signal spectrum, the output signal spectrum, and the current values; and
update an average microphone transfer function using the current transfer function.

The current transfer function is usable to perform said echo cancellation on said other input signals.

Figure 6B:
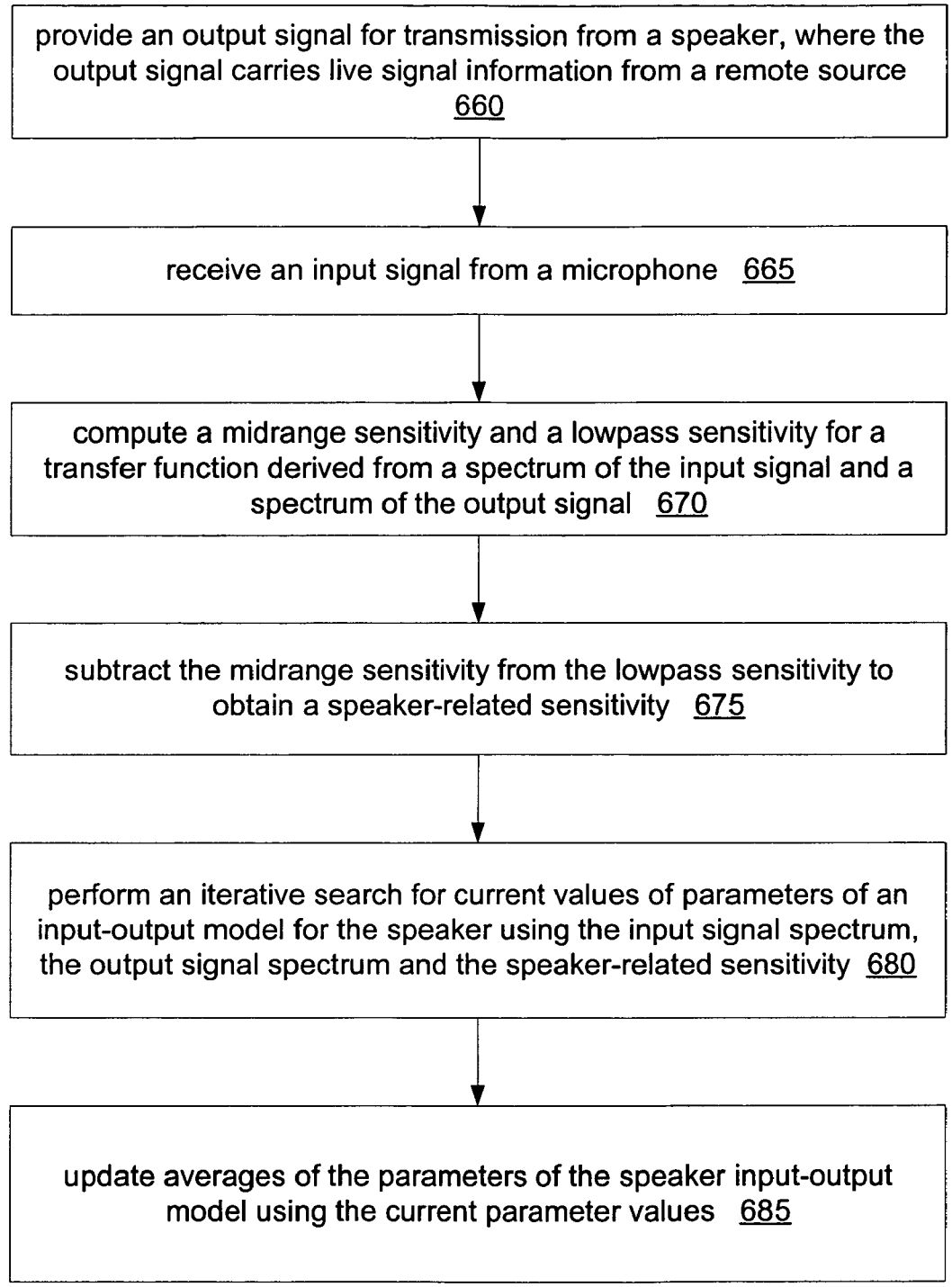
FIG. 6B illustrates one set of embodiments of a method for performing "live" self calibration.

In one set of embodiments, as illustrated in FIG. 6B, a method for performing self calibration may involve:

(a) providing an output signal for transmission from a speaker, wherein the output signal carries live signal information from a remote source (as indicated at step 660);
(b) receiving an input signal from a microphone, corresponding to the output signal and its reverb tail (as indicated at step 665);
(c) computing a midrange sensitivity and a lowpass sensitivity for a transfer function $H(\omega)$, where the transfer function $H(\omega)$ is derived from a spectrum of the input signal and a spectrum of the output signal (as indicated at step 670);
(d) subtracting the midrange sensitivity from the lowpass sensitivity to obtain a speaker-related sensitivity (as indicated at step 675);
(e) performing an iterative search for current values of parameters of an input-output model for the speaker using the input signal spectrum, the output signal spectrum and the speaker-related sensitivity (as indicated at step 680); and
(f) updating averages of the parameters of the speaker input-output model using the current parameter values (as indicated at step 685).

The parameter averages of the speaker input-output model are usable to perform echo cancellation on other input signals.

Furthermore, the method may involve:
performing an iterative search for a current transfer function of the microphone using the input signal spectrum, the spectrum of the output signal, and the current values; and
updating an average microphone transfer function using the current transfer function.

The current transfer function is also usable to perform said echo cancellation on said other input signals.

Plurality of Microphones

In some embodiments, the speakerphone 200 may include $N_M$ input channels, where $N_M$ is two or greater. Each input channel $IC_j$, $j=1, 2, 3, \ldots, N_M$ may include a microphone $M_j$, a preamplifier $PA_j$, and an A/D converter $ADC_j$. The description given herein of various embodiments in the context of one input channel naturally generalizes to $N_M$ input channels.

Microphone $M_j$ generates analog electrical signal $u_j(t)$. Preamplifier $PA_j$ amplifies the analog electrical signal $u_j(t)$ in order to generate amplified signal $x_j(t)$. A/D converter $ADC_j$ samples the amplified signal $x_j(t)$ in order to generate digital signal $X_j(k)$.

Figure 7:
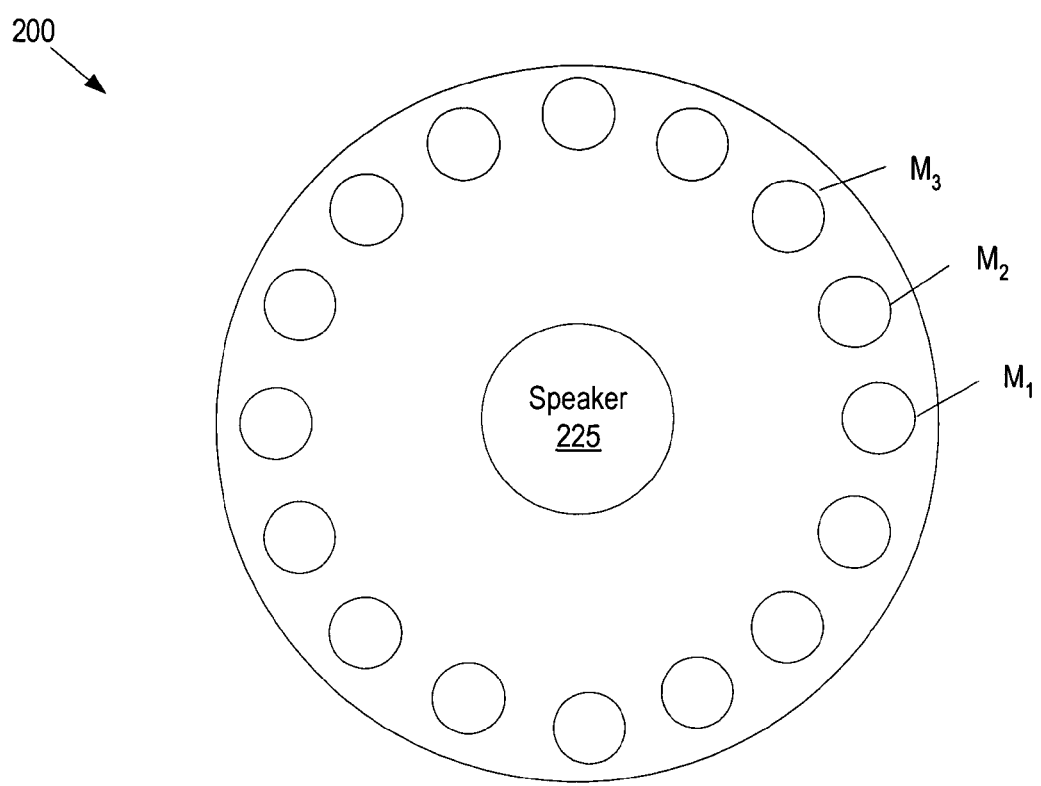
FIG. 7 illustrates one embodiment of speakerphone having a circular array of microphones.

In one group of embodiments, the $N_M$ microphones may be arranged in a circular array with the speaker 225 situated at the center of the circle as suggested by the physical realization (viewed from above) illustrated in FIG. 7. Thus, the delay time $\tau_0$ of the direct path transmission between the speaker and microphone $M_j$ is approximately the same for all microphones. In one embodiment of this group, the microphones may all be omni-directional microphones having approximately the same microphone transfer function.

Processor 207 may receive the digital input signals $X_j(k)$, $j=1, 2, \ldots, N_M$, and perform acoustic echo cancellation on each channel independently based on calibration information derived from each channel separately.

In one embodiment, $N_M$ equals 16. However, a wide variety of other values are contemplated for $N_M$.

Direct Path Signal Cancellation Before AEC

Figure 8:
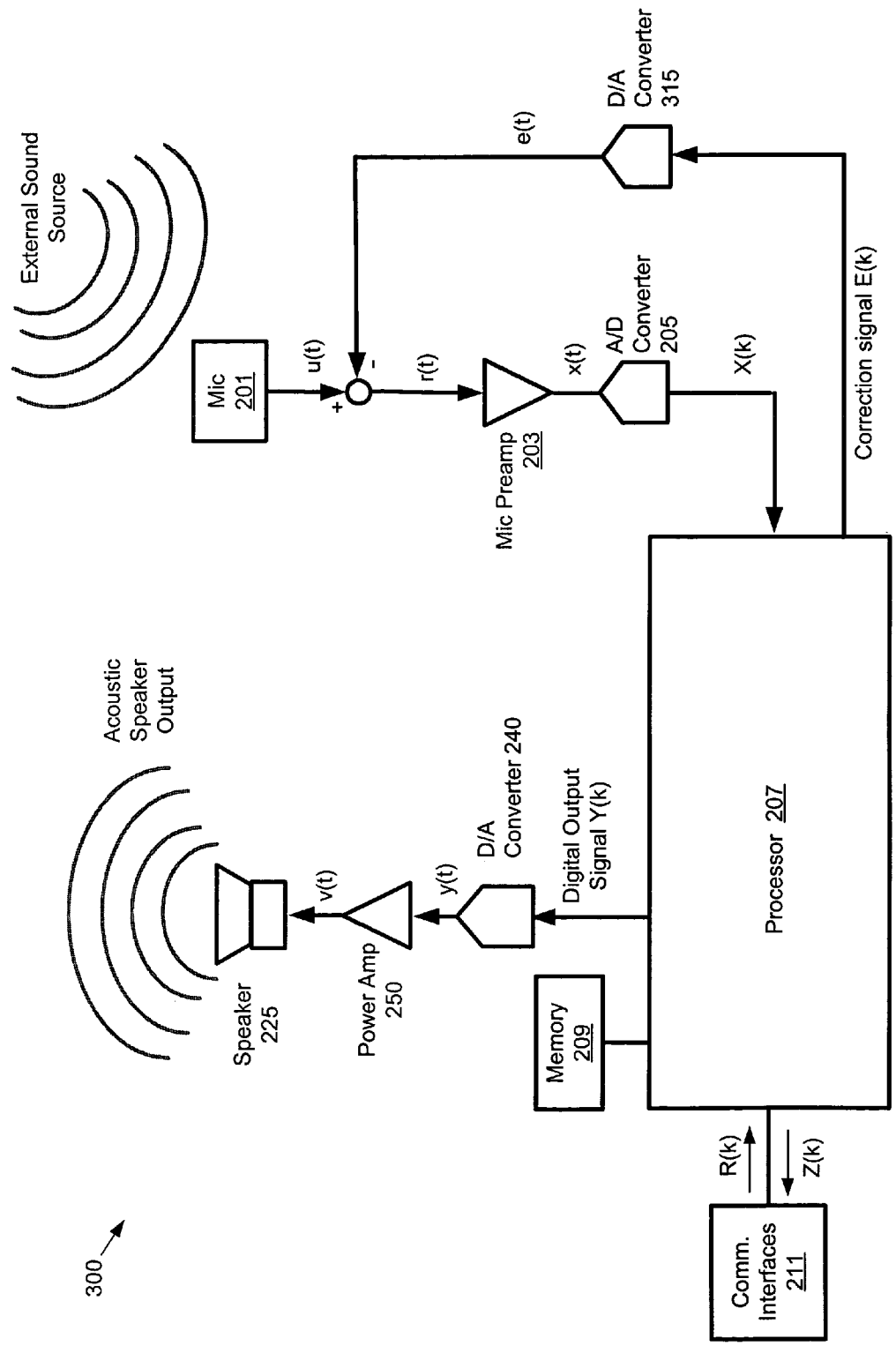
FIG. 8 illustrates one set of embodiments of a speakerphone 300 configured to cancel a direct path signal from to input preamplification.

In some embodiments, a speakerphone 300 may be configured as illustrated in FIG. 8. The reader will observe that speakerphone 300 is similar in many respects to speakerphone 200 (illustrated in FIG. 1B). However, in addition to the components illustrated in FIG. 1B as part of speakerphone 200, speakerphone 300 includes a subtraction circuit 310 and a D/A converter 315. The subtraction circuit 310 is coupled to receive:

the electrical signal u(t) generated by the microphone 201, and the analog signal e(t) generated by the D/A converter 315.

The subtraction circuit 310 generates a difference signal r(t)=u(t)−e(t). The difference signal r(t) is provided to preamplifier circuit 203. Note that digital-to-analog (D/A) converter 315 generates the signal e(t) from digital signal E(k) and that the digital signal E(k) is provided by processor 207.

The preamplifier circuit 203 amplifies the difference signal r(t) to generate an amplified signal x(t). The gain of the preamplifier circuit is adjustable within a specified dynamic range. Analog-to-digital converter 205 converts the amplified signal x(t) into a digital input signal X(k). The digital input signal X(k) is provided to processor 207.

The processor 207 receives a remote audio signal R(k) from another speakerphone (e.g., via one or more of the communication interfaces 211) and mixes the remote audio signal R(k) with any locally generated signals (e.g., beeps or tones) to generate a digital output signal Y(k).

The digital-to-analog converter 240 receives the digital output signal Y(k) and converts this signal into an analog electrical signal y(t). The power amplifier 250 amplifies the analog electrical signal y(t) to generate an amplified signal v(t). The amplified signal v(t) is used to drive a speaker 225. The speaker 225 converts the amplified signal v(t) into an acoustic signal. The acoustic signal generated by the speaker radiates into the ambient space, and thus, local participants are able to hear a replica of the acoustic signals generated by remote participants (situated near a remote speakerphone).

Figure 8B:
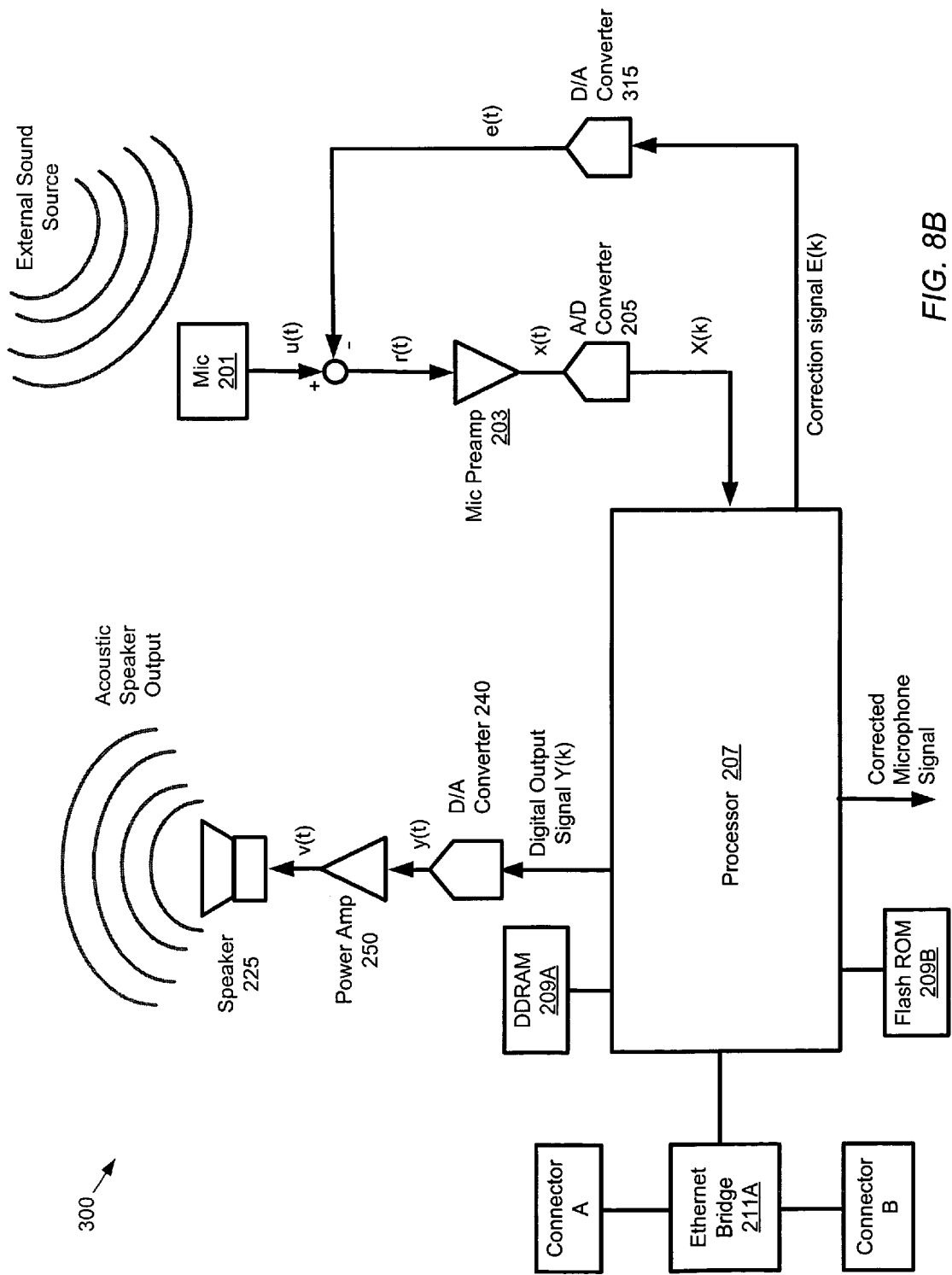
FIG. 8B illustrates one embodiments of the speakerphone 300 having an Ethernet bridge.

FIG. 8B illustrates one embodiment of the speakerphone 300 which includes (among other things) an Ethernet bridge 211A, DDRAM 209A and Flash ROM 209B. The Ethernet bridge may couple to two connectors A and B.

In general, the microphone signal u(t) is a superposition of contributions due to:

acoustic signals (e.g., voice signals) generated by one or more persons (e.g., conference participants) in the environment of the speakerphone 300, and reflections of these acoustic signals off of acoustically reflective surfaces in the environment;

acoustic signals generated by one or more noise sources (such as fans and motors, automobile traffic and fluorescent light fixtures) and reflections of these acoustic signals off of acoustically reflective surfaces in the environment; and the acoustic signal generated by the speaker 225 and the reflections of this acoustic signal off of acoustically reflective surfaces in the environment.

Let $u_{dp}(t)$ denote the contribution to u(t) that corresponds to the direct path transmission between speaker 225 and the microphone 201. (See FIG. 2.)

Figure 9:
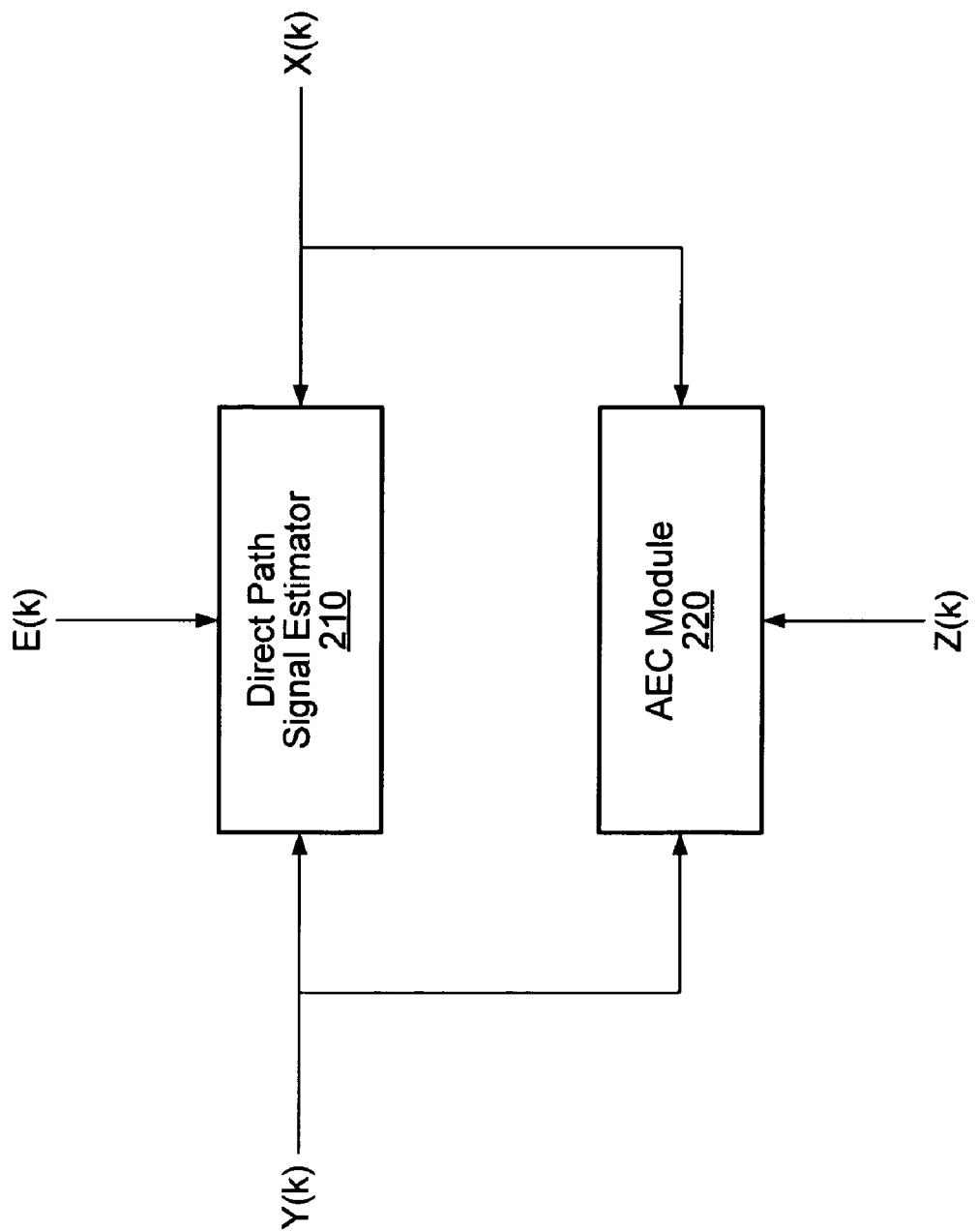
FIG. 9 illustrates one embodiment of a software block diagram that may be executed by processor 207.

Processor 207 may be configured to execute software including a direct path signal estimator 210 (hereinafter referred to as the DPS estimator) and an acoustic echo cancellation (AEC) module 220, e.g., as suggested in FIG. 9. The DPS estimator and AEC module may be stored in memory 209.

The DPS estimator 210 may attempt to generate the digital signal E(k) so that the corresponding analog signal e(t) is a good approximation to the direct path contribution $u_{dp}(t)$. In some embodiments, the DPS estimator may employ a method for generating digital signal E(k) that guarantees (or approximates) the condition:

$$\text{Energy}[e(t)-u_{dp}(t)]/\text{Energy}[u_{dp}(t)] < \text{epsilon},$$

where epsilon is a small positive fraction. The notation Energy[f(t)] represents the energy of the signal f(t) considered over a finite interval in time.

Because e(t) captures a substantial portion of the energy in the direct path contribution $u_{dp}(t)$, the subtraction r(t)=u(t)−e(t) implies that only a small portion of the direct path contribution $u_{dp}(t)$ remains in r(t). The direct path contribution $u_{dp}(t)$ is typically the most dominant contribution to the microphone signal u(t). Thus, the subtraction of e(t) from the microphone signal u(t) prior to the preamplifier 203 implies that the average power in difference signal r(t) is substantially less than the average power in u(t). Therefore, the gain of the preamplifier may be substantially increased to more effectively utilize the dynamic range of the A/D converter 205 when the DPS estimator 210 is turned on. (When the DPS estimator is off, e(t)=0 and r(t)=u(t).)

Note that the digital input signal X(k) is obtained from r(t) by scaling and sampling. Thus, it is apparent that the digital input signal X(k) would have a direct path contribution $X_{dp}(k)$, linearly related to $u_{dp}(t)$, if the DPS estimator 210 were turned off, i.e., if r(t)=u(t). However, only a small portion of the direct path contribution $X_{dp}(k)$ remains in X(k) when the DPS estimator 210 is on, i.e., if r(t)=u(t)−e(t). Any remaining portion of the direct path contribution $X_{dp}(k)$ in digital input signal X(k) may fall below the threshold for consideration by the AEC module 220. (In one embodiment, the AEC module 220 may employ a threshold for deciding which peaks in the power spectrum of X(k) are sufficiently large to warrant analysis.) Thus, the AEC module 220 will concentrate its computational effort on estimating and canceling the reflected path contributions.

Because the AEC module 220 doesn't have to deal with the direct path contribution, the AEC module is able to analyze a larger number of the reflected path contributions than if it did have to deal with the direct path contribution. Furthermore, because the AEC module doesn't have to deal with the direct path contribution, the AEC module is able to set its dynamic range adjustment parameters in a manner that gives more accurate results in its analysis of the reflected path contributions than if the direct path signal estimator 210 were turned off. (If the direct path estimator 210 were turned off, the direct path contribution $X_{dp}(k)$ to the digital input X(k) would greatly dominate the contributions due to the reflected paths.)

From the point-of-view of the AEC module 220, the path with minimum propagation time (between speaker and microphone) is the first reflected path, i.e., the reflected path having the smallest path length, because the direct path is substantially eliminated from the digital input X(k). The propagation time $\tau_1$ of the first reflected path is larger than the propagation time $\tau_0$ of the direct path. Thus, the AEC module 220 may operate on larger blocks of the samples X(k) than if the DPS estimator 210 were turned off. The larger blocks of samples implies greater frequency resolution in the transform domain. Greater frequency resolution implies a high-quality of cancellation of the reflected paths.

In various embodiments, the DPS estimator 210 receives signal Y(k) and operates on the signal Y(k) using at least a subset of the modeling information $I_M$ to generate the signal E(k). In one embodiment, the DPS estimator 210 may operate on the signal Y(k) using:
- the gain of the D/A converter 240;
- the gain of the power amplifier 250;
- the input-output model for the speaker 225;
- the transfer function $H_{dp}$ for the direct path transmission between the output of speaker 225 and the input of microphone 201;
- the transfer function of the microphone 201;
- the gain of the preamplifier 203; and
- the gain of the A/D converter 205.

The DPS estimator 210 also receives the digital input X(k). Using blocks of the samples X(k) and corresponding blocks of the samples Y(k), the DPS estimator 210 may periodically update the transfer function $H_{dp}$. For example, in some embodiments, the DPS estimator 210 may generate a new estimate of the transfer function $H_{dp}$ for each received block of digital input X(k). The transfer function $H_{dp}$ may be characterized by an attenuation coefficient and a time delay for the direct path transmission.

The AEC module 220 receives the digital input X(k) and the digital output Y(k), generates an error signal C(k), and subtracts the error signal C(k) from the digital input X(k) to obtain a corrected signal Z(k). The corrected signal Z(k) may be transmitted to a remote speakerphone through the communication mechanism CM. When the direct path signal estimator 210 is turned on, error signal C(k) generated by the AEC module is an estimate of the portion of X(k) that is due to a number $N_{on}$ of the most dominant reflected path transmissions between the speaker and the microphone. When the direct path signal estimator 210 is turned off, the error signal C(k) generated by the AEC module is an estimate of the portion of X(k) that is due to the direct path and a number $N_{off}$ of the most dominant reflected path transmissions between the speaker and the microphone. As alluded to above, when the DPS estimator 210 is on, the direct path contribution is substantially eliminated from the signal X(k) arriving at the AEC module 220 (by virtue of the subtraction occurring at subtraction circuit 310). Thus, the AEC module 220 does not have to deal with the direct path contribution and is able to devote more of its computational resources to analyzing the reflected path contributions. Thus, $N_{on}$ is generally larger than $N_{off}$.

The AEC module 220 may operate on the digital signal Y(k) using at least a subset of the modeling information $I_M$ in order to generate the error signal C(k). In one embodiment, the AEC module 220 may operate on the digital signal Y(k) using:
- the gain of the D/A converter 240;
- the gain of the power amplifier 250;
- the apparent transfer function $H_{app}$ between the output of speaker 225 and the input of microphone 201;
- the transfer function of the microphone 201;
- the gain of the preamplifier 203;
- the gain of the A/D converter 205.

Note that the apparent transfer function $H_{app}$ models only reflect paths between the speaker and microphone when the direct path signal estimator 210 is turned on.

Figure 9B:
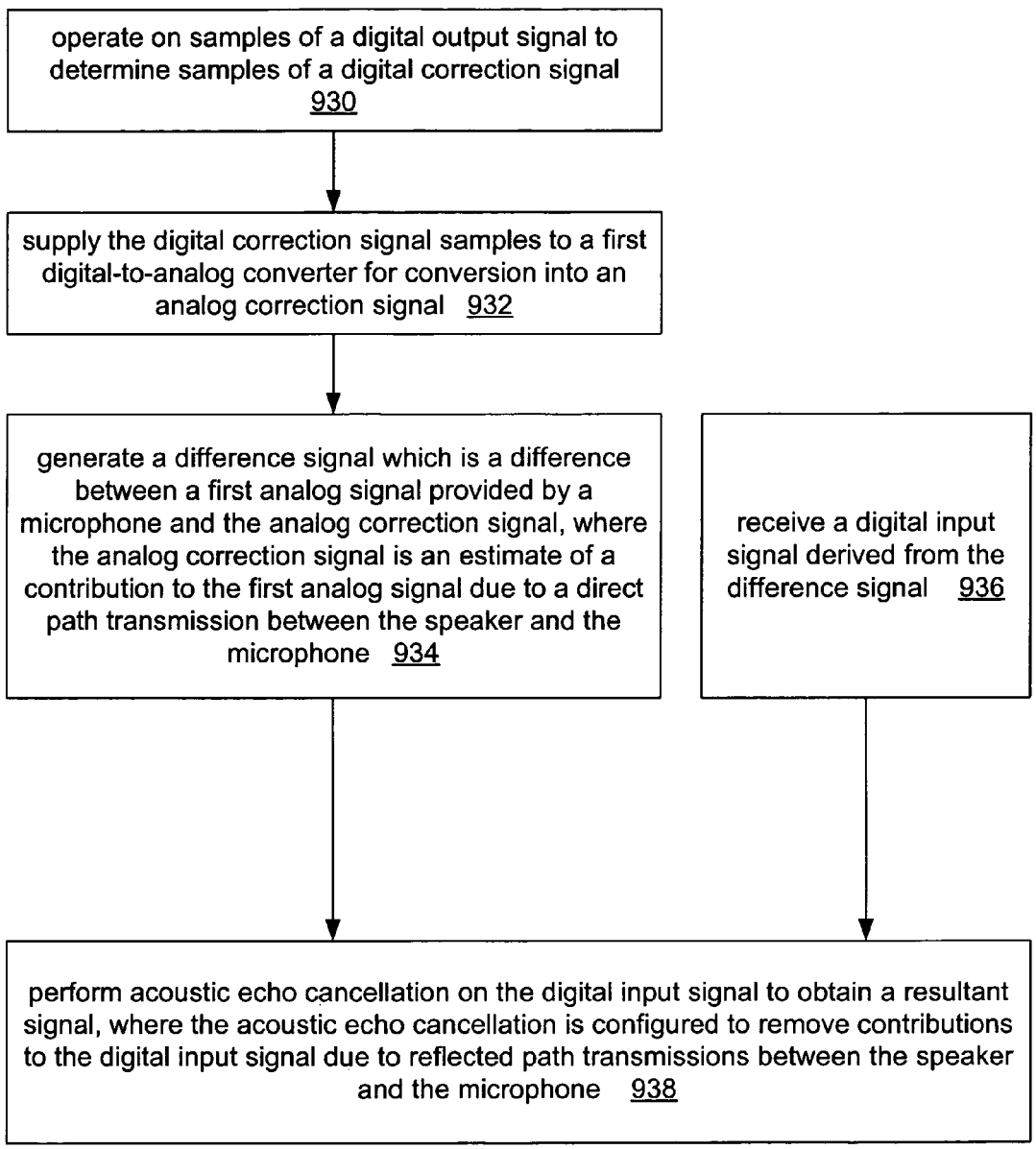
FIG. 9B illustrates one embodiment of a method for canceling speaker signal energy from a received microphone signal.

In some embodiments, a method for canceling speaker signal energy from a received microphone signal may be enacted as illustrated in FIG. 9B.

At 930, samples of a digital output signal may be operated on to determine samples of a digital correction signal. The output signal samples are samples that are (or have been) directed to an output channel for transmission from a speaker.

At 932, the digital correction signal samples may be supplied to a first digital-to-analog converter for conversion into an analog correction signal.

At 934, a difference signal which is a difference between a first analog signal provided by a microphone and the analog correction signal may be generated (e.g., by an analog subtraction circuit), where the analog correction signal is an estimate of a contribution to the first analog signal due to a direct path transmission between the speaker and the microphone.

At 936, a digital input signal derived from the difference signal may be received from an input channel.

At 938, acoustic echo cancellation may be performed on the digital input signal to obtain a resultant signal. The acoustic echo cancellation may be configured to remove contributions to the digital input signal due to reflected path transmissions between the speaker and the microphone.

Such a method may be especially useful for speakerphones and videoconferencing system where a speaker and a microphone may be located close to each other, e.g., on the housing of the speakerphone (or videoconferencing system).

Figure 10:
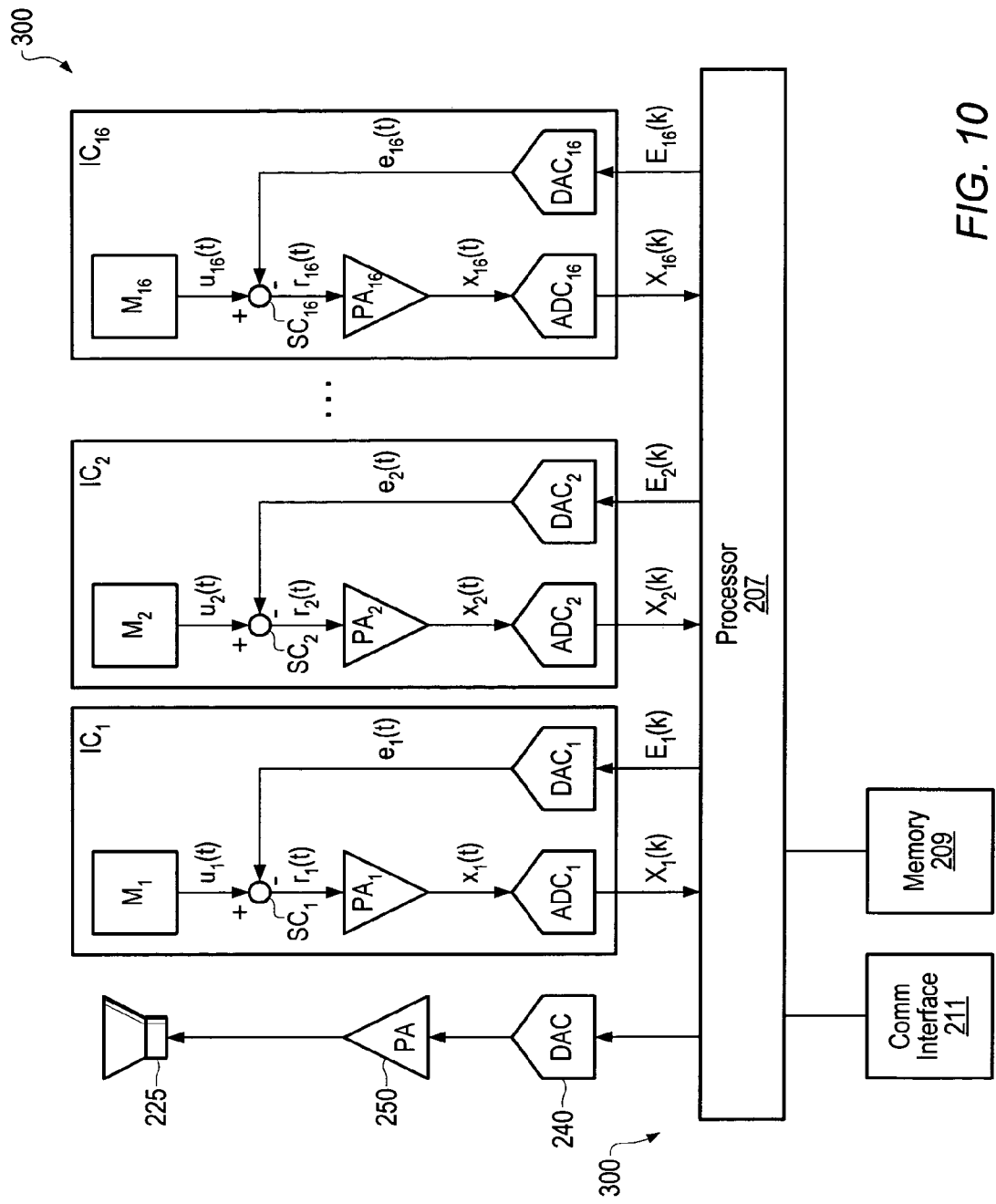
FIG. 10 illustrates one embodiment of speakerphone 300 configured to perform a separate direct path cancellation on each microphone input channel.

In one set of embodiments, the speakerphone 300 may include a set of $N_M$ input channels. Each input channel $IC_j$, j=1, 2, 3, ..., $N_M$, may include a microphone $M_j$, a subtraction circuit $SC_j$, a preamplifier $PA_j$, an A/D converter $ADC_j$, and a D/A converter $DAC_j$. The integer $N_M$ is greater than or equal to two. The description given above of canceling the direct path contribution prior to the preamplifier 203 for one microphone channel naturally extends to NM microphone channels. FIG. 10 illustrates speakerphone 300 in the case $N_M$=16.

Let $u_j(t)$ denote the analog electrical signal captured by microphone $M_j$. Subtraction circuit $SC_j$ receives electrical signal $u_j(t)$ and a corresponding correction signal $e_j(t)$ and generates a difference signal $r_j(t)=u_j(t)-e_j(t)$. Preamplifier $PA_j$ amplifies the difference signal $r_j(t)$ to obtain an amplified signal $x_j(t)$. A/D converter $ADC_j$ samples the amplified signal $x_j(t)$ in order to obtain a digital signal $X_j(k)$. The digital signals $X_j(k)$, j=1, 2, ..., $N_M$, are provided to processor 207.

Processor 207 generates the digital correction signals $E_j(k)$, j=1, 2, ..., $N_M$. D/A converter $DAC_j$ converts the digital correction signal $E_j(k)$ into the analog correction signal $e_j(t)$ which is supplied to the subtraction circuit $SC_j$. Thus, the processor 207 may generate an independent correction signal $E_j(k)$ for each input channel $IC_j$ as described in the embodiments above.

Figure 10B:
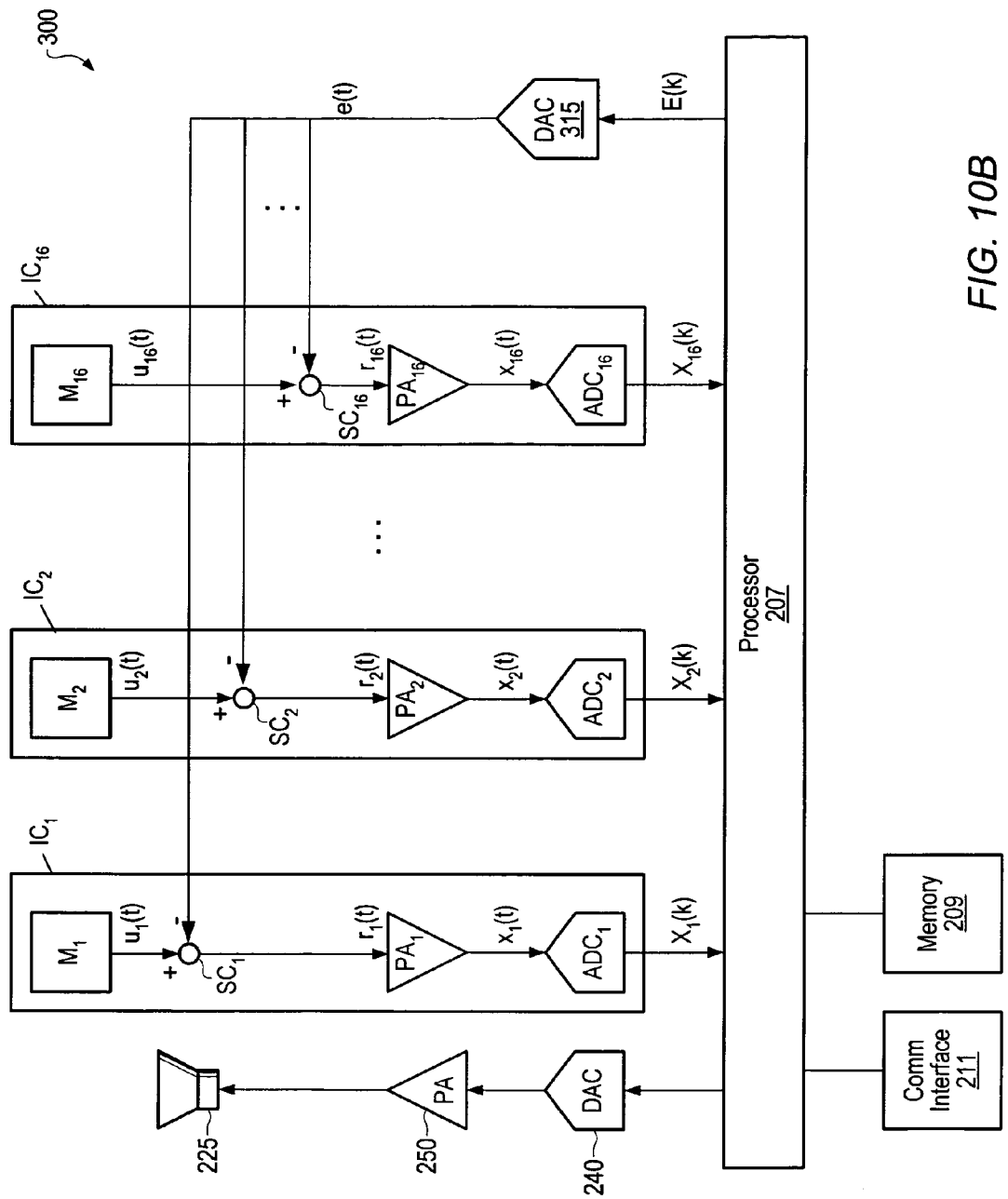
FIG. 10B illustrates one embodiment of speakerphone 300 configured to generate a single cancellation signal which is applied to all microphone input channels.

In one group of embodiments, the $N_M$ microphones may be arranged in a circular array with the speaker 225 situated at the center of the circle, e.g., as suggested in FIG. 7. Thus, the delay time $\tau_0$ of the direct path transmission between the speaker and each microphone is approximately the same for all microphones. Furthermore, the attenuation coefficient of the direct path transmission between the speaker and each microphone may be approximately the same for all microphones (since they all have approximately the same distance from the center). The microphones may be configured to satisfy the condition of having approximately equal microphone transfer functions. This condition may be easier to satisfy if the microphones are omnidirectional microphones. In some embodiments, the processor 207 may apply the same correction signal e(t) to each input channel, i.e., $r_j(t)=u_j(t)-e(t)$ for j=1, 2, 3, ..., $N_M$. (FIG. 10B illustrates the case $N_M=16$.) In these embodiments, the speakerphone 300 may have a D/A converter 315 which is shared among all input channels instead of $N_M$ digital-to-analog converters as described above. Thus, the processor 207 may generate a single digital correction signal E(k) and supply the single correction signal E(k) to the D/A converter 315. The D/A converter 315 converts the correction signal E(k) into the analog correction signal e(t) which is fed to all the subtractions units $SC_j$, j=1, 2, ..., $N_M$.

In one embodiment, $N_M$ equals 16. However, a wide variety of other values are contemplated for $N_M$.

In some embodiments, other microphone array configurations may be used (e.g., square, rectangular, elliptical, etc.).

In one set of embodiments, speakerphone 300 may be configured to generate a correction signal E(k) from the digital output signal Y(k) by:
  (a) multiplying the digital output signal Y(k) by the gain of the D/A converter 240 and the gain of the power amplifier 250 to obtain a digital representation v(k) of the speaker input signal;
  (b) applying a nonlinear speaker model to the digital representation v(k) to obtain a digital representation $R_{SP}(k)$ of the acoustic signal radiated by the speaker 225;
  (c) applying the transfer function $H_{dp}$ (of the direct path transmission from the speaker 225 to the microphone 201) to the digital representation $R_{SP}(k)$ to obtain a digital representation $A_{MIC}(k)$ of the acoustic signal received by the microphone;
  (d) applying the microphone transfer function to the digital representation $A_{MIC}(k)$ in order to obtain a digital representation u(k) of the microphone output signal;
  (e) multiplying the digital representation u(k) by the reciprocal of the gain of the D/A converter 315.

Applying the transfer function $H_{dp}$ to the digital representation $R_{SP}(k)$ may involve:
  delaying the digital representation $R_{SP}(k)$ by the time delay $\tau_0$ of the direct path transmission, and
  scaling by the attenuation coefficient of the direct path transmission.

The parameters of the nonlinear speaker model and the microphone transfer function may change over time. Thus, the processor 207 may repeatedly update the model parameters and the microphone transfer function in order to track the changes over time. Various embodiments for updating the speaker model parameters and the microphone transfer function are described above.

Similarly, the speaker 225 and/or the microphone 201 may move, and thus, the transfer function $H_{dp}$ may change over time. Thus, the processor 207 may repeatedly update the transfer function $H_{dp}$ as needed (e.g., periodically or intermittently). The time delay $\tau_0$ of the direct path transmission may be estimated based on a cross correlation between the output signal Y(k) and the input signal X(k). In one embodiment, the attenuation coefficient of the direct path transmission may be estimated based on a calibration experiment performed during a period of time when the speakerphone is not being used for communication and when the environment is relatively silent.

In one set of embodiments, the analog correction signal e(t) may be subtracted from raw signal u(t) coming from the microphone prior to the preamplifier 203. In another set of embodiments, the analog correction signal may be subtracted after the preamplifier and prior to the A/D converter 205. In one alternative embodiment, the digital correction signal E(k) may be subtracted (in the digital domain) after the A/D converter 205 (and never converted into an analog signal).

In yet another set of embodiments, the analog correction signal e(t) may be converted into an acoustic correction signal using a small acoustic transducer (e.g., speaker) situated close to the microphone 201. This acoustic cancellation methodology has the advantage of protecting the microphone itself from clipping due to high volume sounds from the speaker 225.

In some embodiments, the speakerphone 300 may have one or more microphones and one or more speakers arranged in a fixed configuration, e.g., mounted into the speakerphone housing. In other embodiments, the one or more microphones and one or more microphones may be movable, e.g., connected to the base unit by flexible wires and/or wireless connections. In yet other embodiments, some subset of the speakers and/or microphones may be fixed and another subset may be movable. The method embodiments described herein for canceling the direct path contribution to a microphone signal prior to preamplification (or prior to A/D conversion) may be applied to each microphone channel regardless of whether the corresponding microphone is fixed or movable.

Cancellation of the direct path contribution from the raw microphone signal u(t) may:
  allow the usable dynamic range of the signal x(t) is be increased by increasing the gain of the preamplifier 203;
  reduce the closed loop gain of speaker-to-mic system;
  improve echo canceller effectiveness by eliminating strong peaks in the speaker-to-mic transfer function;
  allow the speaker 225 to be driven at a louder volume and the sensitivity of the microphone 201 to be increased without clipping at the A/D converter 205, therefore allowing the speakerphone 300 to function in larger rooms with larger effective range because speaker 225 is louder and microphone 201 is more sensitive;
  allow use of omnidirectional microphones instead of directional microphones (such as cardioid or hypercardioid microphones).

Omnidirectional microphones are less expensive, more reliable and less sensitive to vibration than directional microphones. Use of directional microphones is complicated by the directional dependence of their frequency response. Omnidirectional microphones do not have this complication. Omnidirectional microphones do not experience the proximity effect (this helps with dynamic range). Omnidirectional microphones are smaller for the same sensitivity as directional microphones, therefore allowing a smaller housing than if directional microphones were used.

In one set of embodiments, the correction signal E(k) may be determined as follows. The processor 207 may measure the transfer function $H_{dp}$ of the direct path transmission between the speaker 225 and the microphone 201, e.g., by asserting a noise burst as the output signal Y(k) (for transmission from the speaker 225) and capturing the resulting signal X(k) from the A/D converter 205. If this measurement is being performed in an environment having nontrivial echoes, the processor 207 may reduce the duration of noise burst until the tail edge of the noise burst arrives at the microphone 201 prior to the leading edge of the first room reflection. The processor 207 may assert the same noise burst repeatedly in order to average out the effects of other random acoustic sources in the room and the effects of circuit noise in the input channel (e.g., in the summation circuit 310, the preamplifier 203 and the A/D converter 205).

The processor 207 may determine the minimum time interval between successive noise bursts based on the time it takes for the room reverberation due to a single noise burst to die down to an acceptably low level.

The processor 207 may perform a cross correlation between the noise stimulus Y(k) with measured response X(k) to determine the time delay $\tau_0$ between stimulus and response. In particular, the time delay $\tau_0$ may be determined by the delay value which maximizes the cross correlation function.

Figure 11:
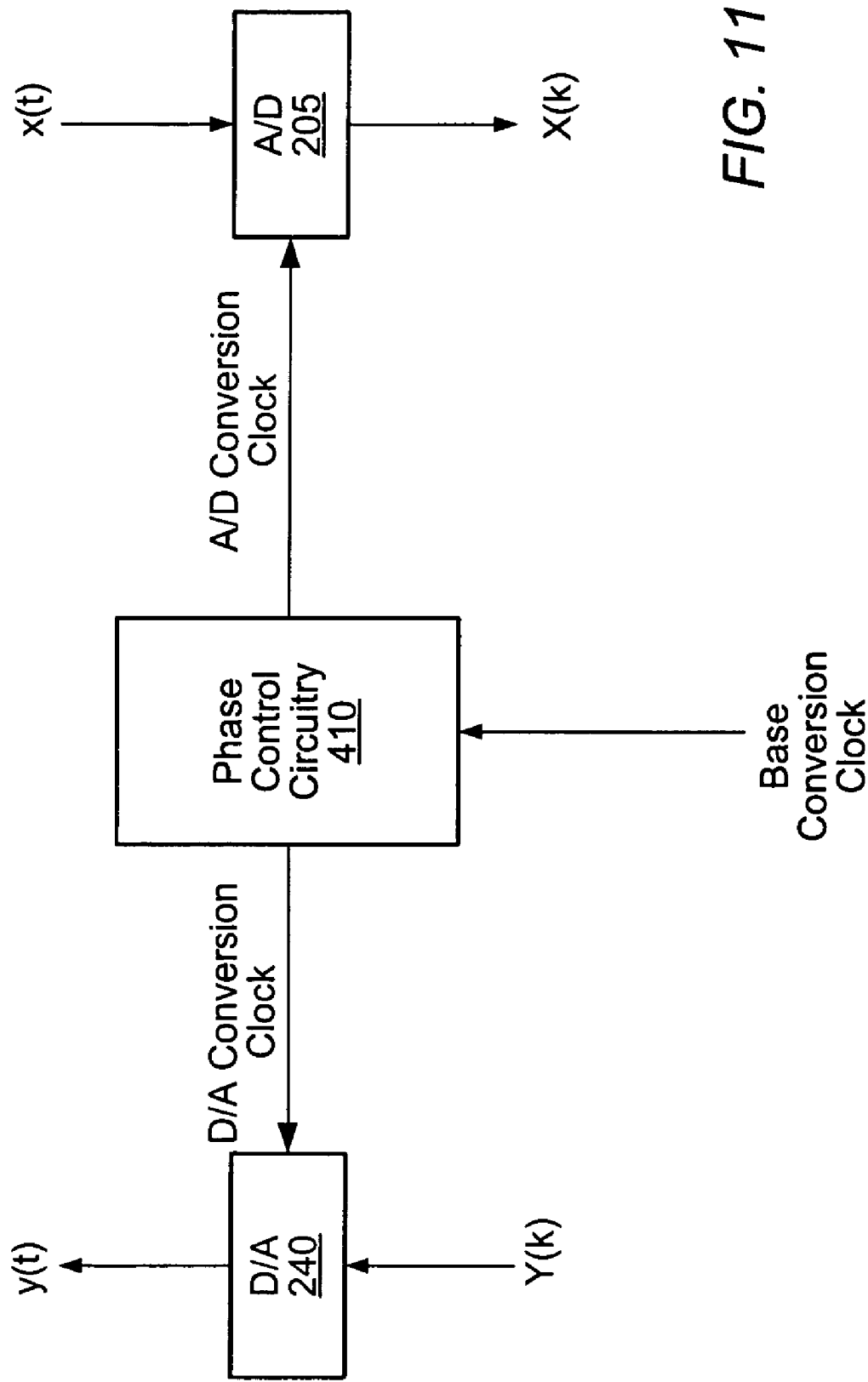
FIG. 11 illustrates circuitry to shift the phases of an A/D conversion clock and a D/A conversion clock relative to a base conversion clock.

In some embodiments, the precision of the measurement of time delay $\tau_0$ may be improved by adjusting the phase offset of the A/D converter 205 and/or the phase offset of the D/A converter 240 relative to a base conversion clock. The speakerphone 300 includes circuitry 410 to control the phase $\theta_{A/D}$ of the A/D conversion clock relative to the base conversion clock and the phase $\theta_{D/A}$ of the D/A conversion clock relative to the base conversion clock as suggested in FIG. 11. The A/D conversion clock is supplied to the A/D converter 205 and controls when sampling events occur. The D/A conversion clock is supplied to the D/A converter 240 and controls when D/A conversion events occur. The frequency $f_{conv}$ of the base conversion clock may be greater than or equal to the Nyquist rate for speech signals (or for audio signals in some embodiments). For example, in one embodiment the frequency $f_{conv}$ may equal 16 kHz.

After having located the integer sample index $k_{max}$ that maximizes the cross correlation, the processor 207 may:
(a) select a value of phase $\theta_{D/A}$;
(b) apply the selected phase value, e.g., by supplying the selected phase value to the phase control circuitry 410;
(c) transmit the noise burst as the output signal Y(k);
(d) capture the response signal X(k) from the D/A converter 205;
(e) compute the cross correlation value (between the noise burst and the response signal) corresponding to the integer sample index $k_{max}$;
(f) store the computed cross correlation value for further analysis.

The processor 207 may repeat (a) through (f) for successive values of phase $\theta_{D/A}$ spanning a range of angles, e.g., the range from −180 to 180 degrees. Furthermore, the processor may analyze the successive cross correlation values to determine the value $\theta_{max}$ of the phase $\theta_{D/A}$ that gives the maximum cross correlation value. The processor 207 may compute a refined estimate of the time delay $\tau_0$ using the integer sample index $k_{max}$ and the phase value $\theta_{max}$. For example, in one embodiment, the processor 207 may compute the refined estimate according to the expression:

$$\tau_0 = k_{max} + \theta_{max}/360.$$

In one set of embodiments, the processor 207 may increment the value of phase $\theta_{D/A}$ by the angle $(\frac{1}{2}^N)*360$ degrees, where N is a positive integer, in each iteration of (a). Thus, the processor 207 may explore the phase values $$\theta_{D/A} = -180 + k*(\frac{1}{2}^N)*360 \text{ degrees,}$$

k=0, 1, 2, . . . , 2N−1. In one group of embodiments, N may equal any integer value in the range [3,9]. However, values outside this range are contemplated as well.

In an alternative set of embodiments, the phase $\theta_{A/D}$ of the A/D converter 205 may be varied instead of the phase $\theta_{D/A}$ of the D/A converter 240.

In some embodiments, the processor 207 may compute:
a Fast Fourier Transform (FFT) of the noise burst that is transmitted as output Y(k);
an FFT of the response signal X(k) captured from the microphone input channel; and
a ratio $H_{linear} = X(\omega)/Y(\omega)$, where Y(ω) denotes the transform of Y(k), and X(ω) denotes the transform of X(k). The ratio $H_{linear} = X(\omega)/Y(\omega)$ represents the linear part of a model M describing the relationship between signals at the circuit node corresponding to Y and the circuit node corresponding to X. See FIG. 8.

In order to compute the parameters of the nonlinear part of the model M, the processor 207 may transmit sine wave tones (at two different non-harmonically related frequencies) as output Y(k), and, capture the response signal X(k) from the microphone input channel. The processor may compute the spectrum X(ω) of the response signal X(k) by performing an FFT, and equalize the spectrum X(ω) by multiplying the spectrum X(ω) by the inverse of the transfer function $H_{linear}$ measured above:

$$Y^{eq}(\omega) = X(\omega)/H_{linear}(\omega).$$

The processor 207 may adapt the parameters of the nonlinear portion until the output of the model M closely matches the measured data.

In one set of embodiments, the model M may be a Volterra model.

During operation of the speakerphone 300, the processor 207 may transmit the output signal Y(k) through the output channel (including D/A converter 240, power amplifier 250 and speaker 225) and capture the input signal X(k) from the microphone input channel. Now the signal X(k) and Y(k) are carrying the substance of a live conversation between local participants and remote participants. The processor 207 may generate the correction signal E(k) by applying the non-linear portion of the model M to the signal Y(k) in the time domain, and applying the linear portion of the model M to the spectrum Y(ω) in the frequency domain.

The parameters of the model M (including the linear portion and the nonlinear portion) may be recomputed periodically (or intermittently) in order to track changes in the characteristics of the speaker and microphone. See the various embodiments described above for estimating the parameters of the model M.

The linear calibration may be performed during the night when speakerphone is less likely to be used and when people are less likely to be in the room or near the room and when the air conditioning (or any other noise sources that would reduce the accuracy of the measurement) is less likely to be operating. For example, the processor may be programmed to perform the calibration at 2:00 AM if a call is not in progress and if the room is sufficiently quiet as determined by the signal coming from the microphone(s).

Hybrid Beamforming

As noted above, speakerphone 300 (or speakerphone 200) may include a set of microphones, e.g., as suggested in FIG. 7. In one set of embodiments, processor 207 may operate on the set of digital input signals $X_j(k)$, $j=1, 2, \ldots, N_M$, captured from the microphone input channels, to generate a resultant signal $D(k)$ that represents the output of a highly directional virtual microphone pointed in a target direction. The virtual microphone is configured to be much more sensitive in an angular neighborhood of the target direction than outside this angular neighborhood. The virtual microphone allows the speakerphone to "tune in" on any acoustic sources in the angular neighborhood and to "tune out" (or suppress) acoustic sources outside the angular neighborhood.

According to one methodology, the processor 207 may generate the resultant signal $D(k)$ by:

computing a Fourier transform of the digital input signals $X_j(k)$, $j=1, 2, \ldots, N_M$, to generate corresponding input spectra $X_j(f)$, $j=1, 2, \ldots, N_M$, where f denotes frequency; and operating on the input spectra $X_j(f)$, $j=1, 2, \ldots, N_M$ with virtual beams $B(1)$, $B(2)$, $B(N_B)$ to obtain respective beam formed spectra $V(1)$, $V(2)$, $\ldots$, $V(N_B)$, where $N_B$ is greater than or equal to two;

adding (perhaps with weighting) the spectra $V(1)$, $V(2)$, $\ldots$, $V(N_B)$ to obtain a resultant spectrum $D(f)$;

inverse transforming the resultant spectrum $D(f)$ to obtain the resultant signal $D(k)$.

Each of the virtual beams $B(i)$, $i=1, 2, \ldots, N_B$ has an associated frequency range $$R(i)=[c_i, d_i]$$

and operates on a corresponding subset $S_i$ of the input spectra $X_j(f)$, $j=1, 2, \ldots, N_M$. (To say that A is a subset of B does not exclude the possibility that subset A may equal set B.) The processor 207 may window each of the spectra of the subset $S_i$ with a window function $W_i$ corresponding to the frequency range $R(i)$ to obtain windowed spectra, and, operate on the windowed spectra with the beam $B(i)$ to obtain spectrum $V(i)$. The window function $W_i$ may equal one inside the range $R(i)$ and the value zero outside the range $R(i)$. Alternatively, the window function $W_i$ may smoothly transition to zero in neighborhoods of boundary frequencies $c_i$ and $d_i$.

The union of the ranges $R(1)$, $R(2)$, $\ldots$, $R(N_B)$ may cover the range of audio frequencies, or, at least the range of frequencies occurring in speech.

The ranges $R(1)$, $R(2)$, $\ldots$, $R(N_B)$ include a first subset of ranges that are above a certain frequency $f_{TR}$ and a second subset of ranges that are below the frequency $f_{TR}$. In one embodiment, the frequency $f_{TR}$ may be approximately 550 Hz.

Each of the virtual beams $B(i)$ that corresponds to a frequency range $R(i)$ below the frequency $f_{TR}$ may be a beam of order $L(i)$ formed from $L(i)+1$ of the input spectra $X_j(f)$, $j=1, 2, \ldots, N_M$, where $L(i)$ is an integer greater than or equal to one. The $L(i)+1$ spectra may correspond to $L(i)+1$ microphones of the circular array that are aligned (or approximately aligned) in the target direction.

Furthermore, each of the virtual beams $B(i)$ that corresponds to a frequency range $R(i)$ above the frequency $f_{TR}$ may have the form of a delay-and-sum beam. The delay-and-sum parameters of the virtual beam $B(i)$ may be designed by beam forming design software. The beam forming design software may be conventional software known to those skilled in the art of beam forming. For example, the beam forming design software may be software that is available as part of MATLAB®.

Figure 12:
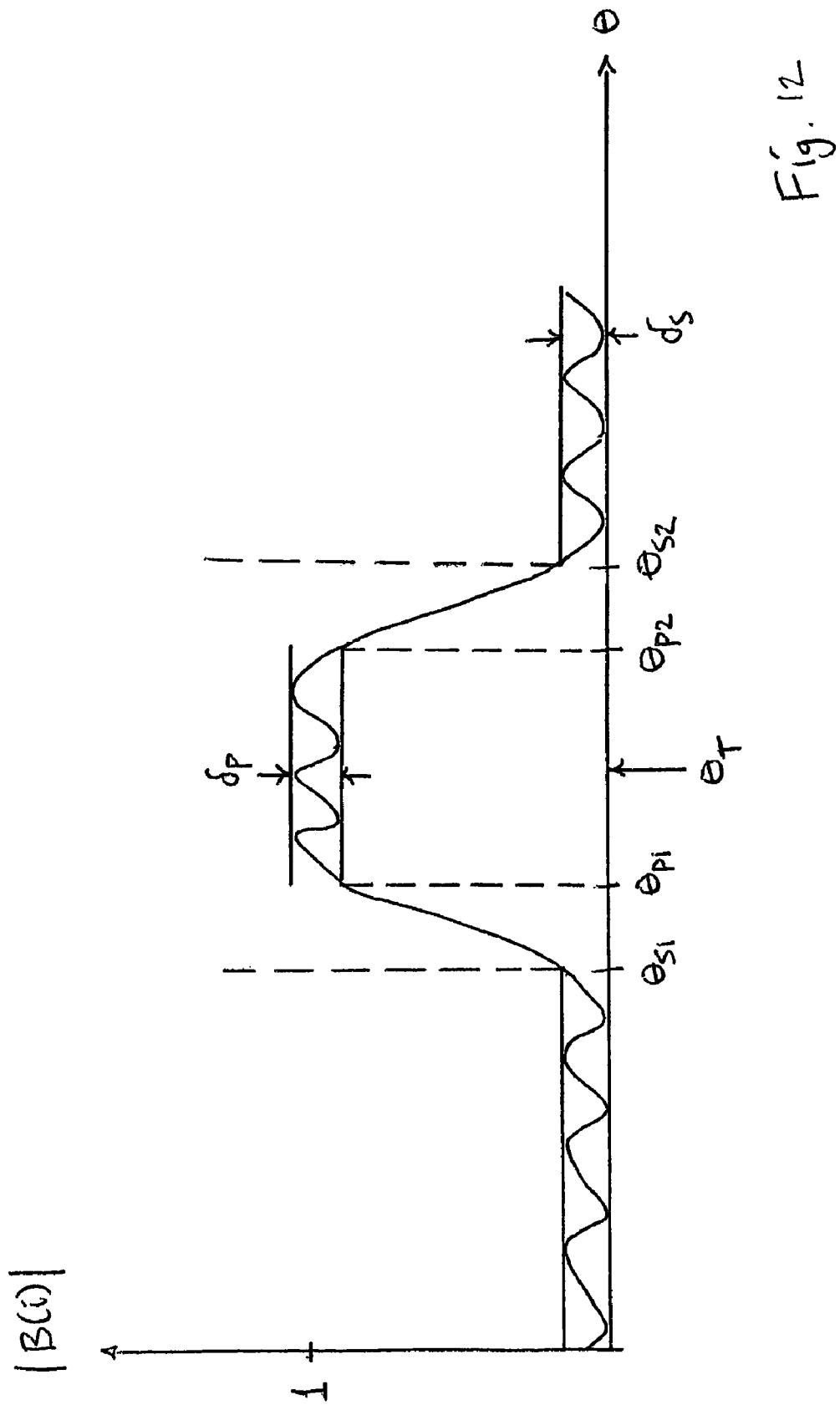
FIG. 12 illustrates an example of design parameters associated with the design of a beam B(i).

The beam forming design software may be directed to design an optimal delay-and-sum beam for beam $B(i)$ at some frequency (e.g., the midpoint frequency) in the frequency range $R(i)$ given the geometry of the circular array and beam constraints such as passband ripple $\delta_P$, stopband ripple $\delta_S$, passband edges $\theta_{P1}$ and $\theta_{P2}$, first stopband edge $\theta_{S1}$, and second stopband edge $\theta_{S2}$ as suggested by FIG. 12.

The beams corresponding to frequency ranges above the frequency $f_{TR}$ are referred to herein as "high end" beams. The beams corresponding to frequency ranges below the frequency $f_{TR}$ are referred to herein as "low end" beams. The virtual beams $B(1)$, $B(2)$, $\ldots$, $B(N_B)$ may include one or more low end beams and one or more high end beams.

In some embodiments, the beam constraints may be the same for all high end beams $B(i)$. The passband edges $\theta_{P1}$, and $\theta_{P2}$ may be selected so as to define an angular sector of size $360/N_M$ degrees (or approximately this size). The passband may be centered on the target direction $\theta_T$.

The delay-and-sum parameters for each high end beam and the parameters for each low end beam may be designed at a laboratory facility and stored into memory 209 prior to operation of the speakerphone.

Since the microphone array is symmetric with respect to rotation through any multiple of $360/N_M$ degrees, in one set of embodiments, the set of parameters designed for one target direction may be used for any of the $N_M$ target directions given by $k(360/N_{-M})$, $k=0, 1, 2, \ldots, N_M-1$, by applying an appropriate circular shift when accessing the parameters from memory.

In one embodiment, the frequency $f_{TR}$ is 550 Hz, $R(1)=R(2)=[0,550 \text{ Hz}]$, $L(1)=L(2)=2$, and low end beam $B(1)$ operates on three of the spectra $X_j(f)$, $j=1, 2, \ldots, N_M$, and low end beam $B(2)$ operates on a different three of the spectra $X_j(f)$, $j=1, 2, \ldots, N_M$;

frequency ranges $R(3)$, $R(4)$, $\ldots$, $R(N_B)$ are an ordered succession of ranges covering the frequencies from $f_{TR}$ up to a certain maximum frequency (e.g., the upper limit of audio frequencies, or, the upper limit of voice frequencies);

beams $B(3)$, $B(4)$, $\ldots$, $B(N_M)$ are high end beams designed as described above.

Figure 13:
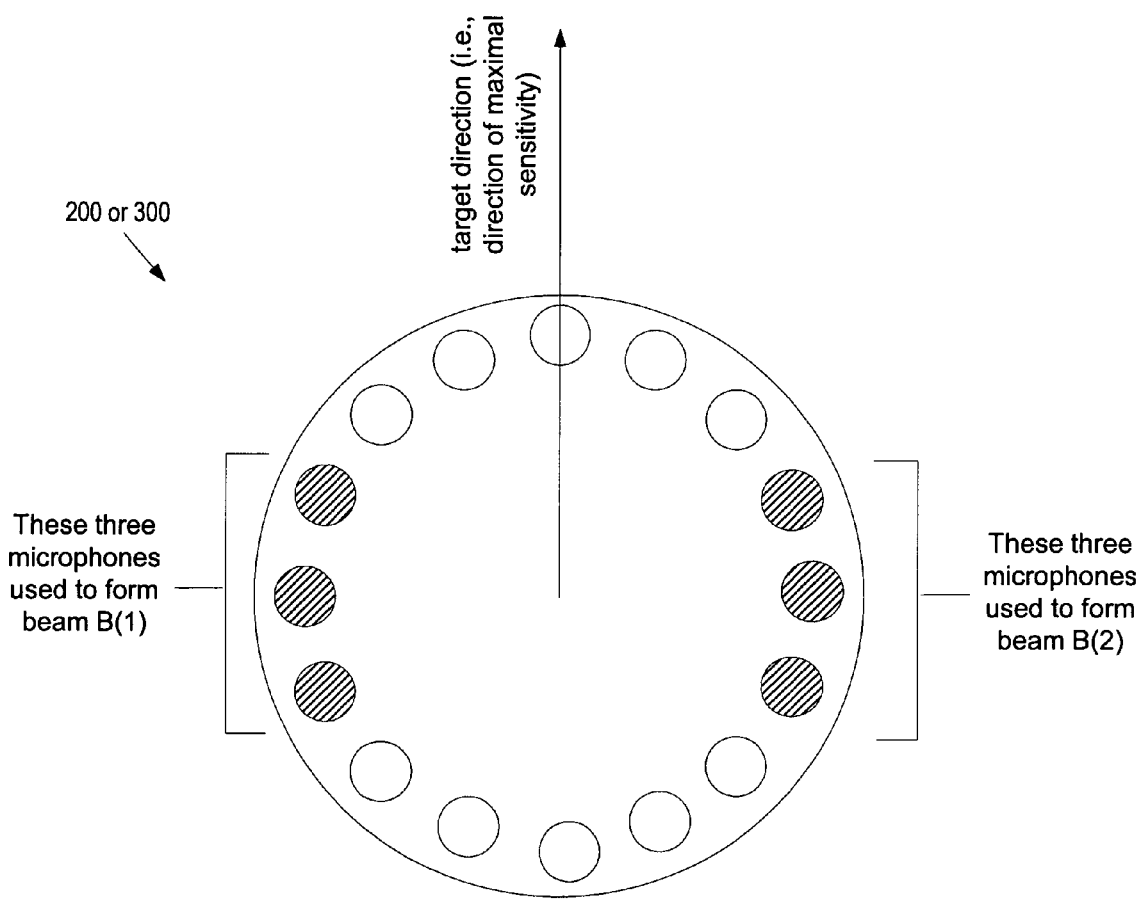
FIG. 13 illustrates two sets of three microphones aligned approximately in a target direction, each set being used to form a virtual beam.

FIG. 13 illustrates the three microphones (and thus, the three spectra) used by each of beams $B(1)$ and $B(2)$, relative to the target direction.

Figure 14:
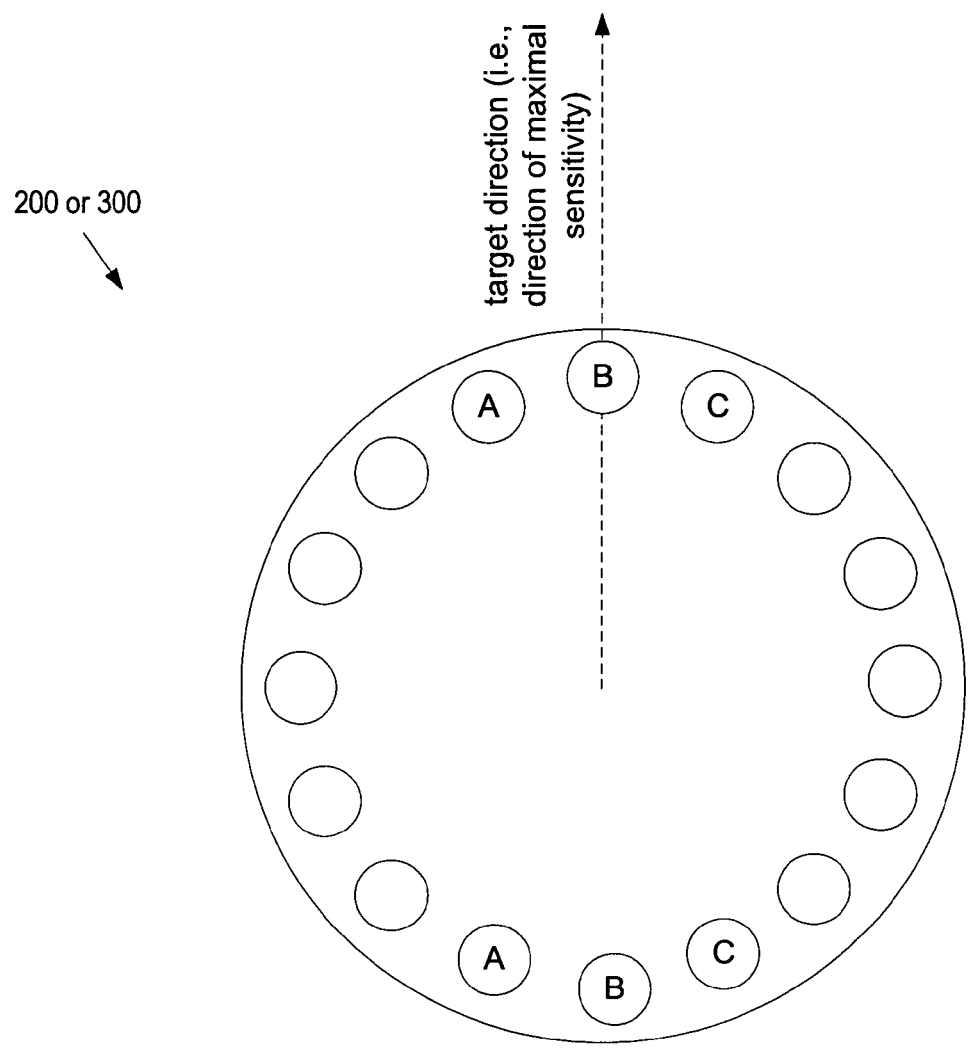
FIG. 14 illustrates three sets of two microphones aligned in a target direction, each set being used to form a virtual beam.

In another embodiment, the virtual beams $B(1)$, $B(2)$, $\ldots$, $B(N_B)$ may include a set of low end beams of first order. FIG. 14 illustrates an example of three low end beams of first order. Each of the three low end beams may be formed using a pair of the input spectra $X_j(f)$, $j=1, 2, \ldots, N_M$. For example, beam $B(1)$ may be formed from the input spectra corresponding to the two "A" microphones. Beam $B(2)$ may be formed form the input spectra corresponding to the two "B" microphones. Beam $B(3)$ may be formed form the input spectra corresponding to the two "C" microphones.

Figure 15:
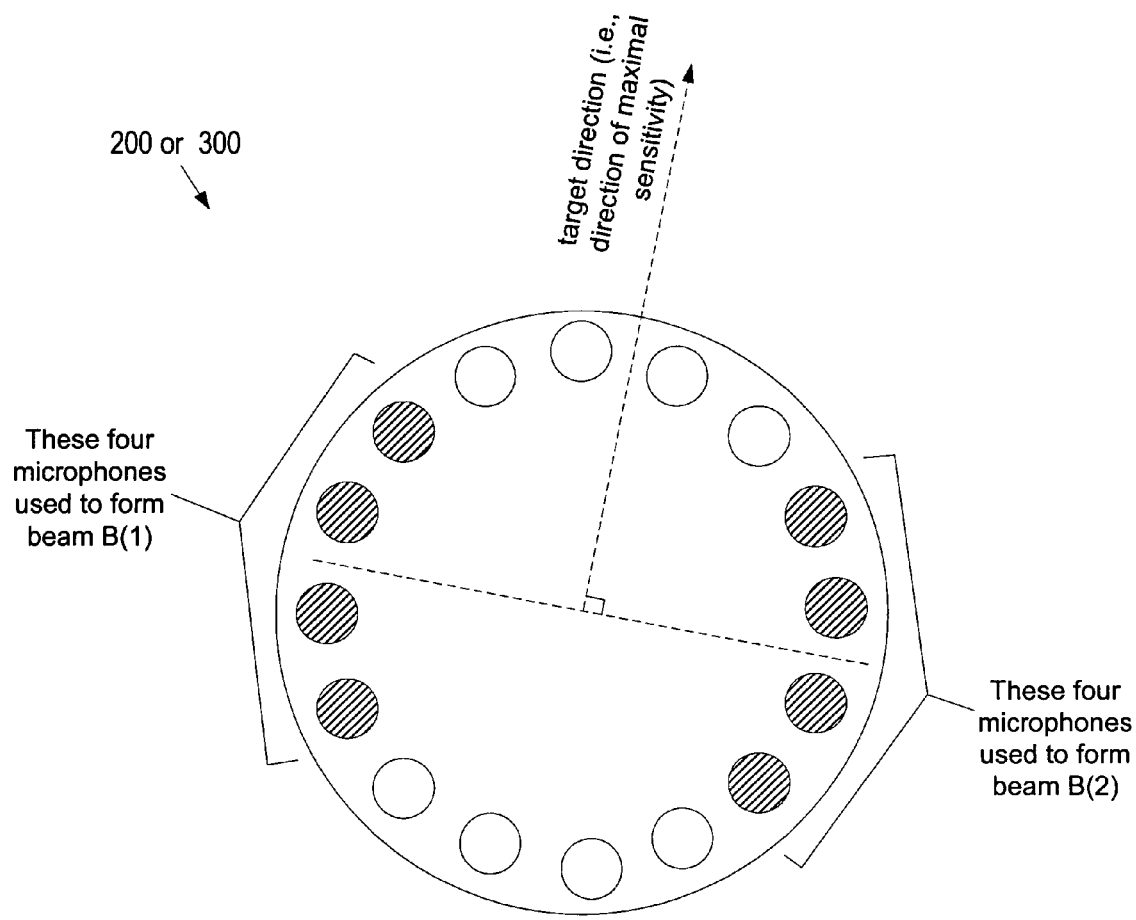
FIG. 15 illustrates two sets of four microphones aligned in a target direction, each set being used to form a virtual beam.

In yet another embodiment, the virtual beams $B(1)$, $B(2)$, $\ldots$, $B(N_B)$ may include a set of low end beams of third order. FIG. 15 illustrates an example of two low end beams of third order. Each of the two low end beams may be formed using a set of four input spectra corresponding to four consecutive microphone channels that are approximately aligned in the target direction.

In one embodiment, the low order beams may include: second order beams (e.g., a pair of second order beams as suggested in FIG. 13), each second order beam being associated with the range of frequencies less than $f_1$, where $f_1$ is less than $f_{TR}$; and third order beams (e.g., a pair of third order beams as suggested in FIG. 15), each third order beam being associated with the range of frequencies from $f_1$ to $f_{TR}$. For example, $f_1$ may equal approximately 250 Hz.

In some embodiments, a system (e.g., a speakerphone or a videoconferencing system) may include a set of microphones, memory and a processor, e.g., as suggested in FIGS. 1B, 7 and 8. The memory is configured to store program instructions and data. The processor is configured to read and execute the program instructions from the memory. The program instructions are executable by the processor to:

(a) receive an input signal corresponding to each of the microphones;

(b) transform the input signals into the frequency domain to obtain respective input spectra;

(c) operate on the input spectra with a set of virtual beams to obtain respective beam-formed spectra, wherein each of the virtual beams is associated with a corresponding frequency range and a corresponding subset of the input spectra, wherein each of the virtual beams operates on portions of the input spectra of the corresponding subset which have been band limited to the corresponding frequency range, wherein the virtual beams include one or more low end beams and one or more high end beams, wherein each of the low end beams is a beam of a corresponding integer order, wherein each of the high end beams is a delay-and-sum beam;

(d) compute a linear combination (e.g., a sum or a weighted sum) of the beam-formed spectra to obtain a resultant spectrum; and (e) inverse transform the resultant spectrum to obtain a resultant signal.

The program instructions are also executable by the processor to provide the resultant signal to a communication interface for transmission. The set of microphones may be arranged in a circular array. However, other microphone array configurations are contemplated. For example, the microphone array may be elliptical, square, rectangular, etc.

Figure 16:
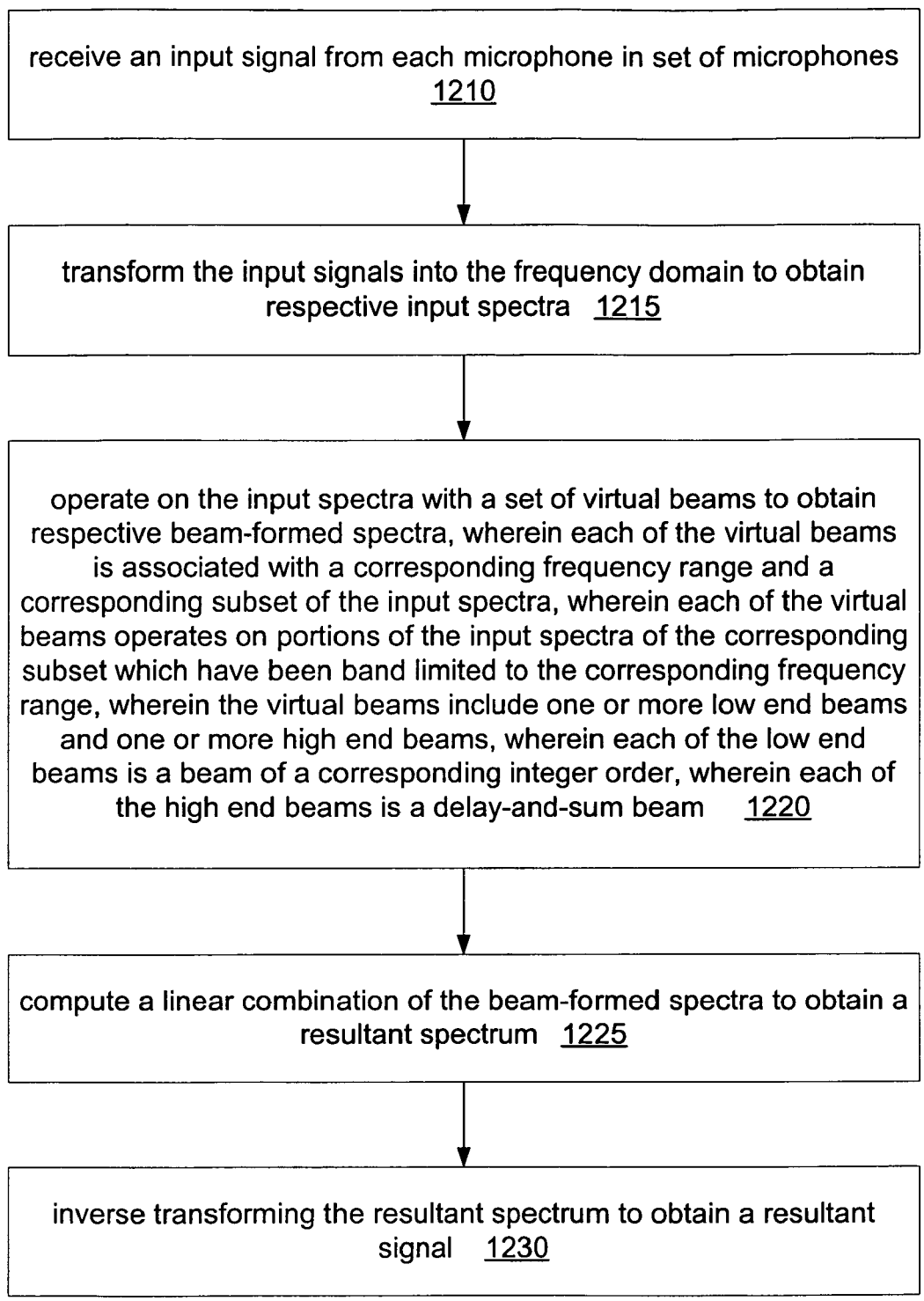
FIG. 16 illustrates one set of embodiments of a method for forming a hybrid beam.

In another set of embodiments, as illustrated in FIG. 16, a method for beam forming may involve:

(a) receiving an input signal from each microphone in a set of microphones (as indicated at step 1210);

(b) transforming the input signals into the frequency domain to obtain respective input spectra (as indicated at step 1215);

(c) operating on the input spectra with a set of virtual beams to obtain respective beam-formed spectra, wherein each of the virtual beams is associated with a corresponding frequency range and a corresponding subset of the input spectra, wherein each of the virtual beams operates on portions of the input spectra of the corresponding subset which have been band limited to the corresponding frequency range, wherein the virtual beams include one or more low end beams and one or more high end beams, wherein each of the low end beams is a beam of a corresponding integer order, wherein each of the high end beams is a delay-and-sum beam (as indicated at step 1220);

(d) computing a linear combination (e.g., a sum or a weighted sum) of the beam-formed spectra to obtain a resultant spectrum (as indicated at step 1225); and (e) inverse transforming the resultant spectrum to obtain a resultant signal (as indicated at step 1230).

The resultant signal may be provided to a communication interface for transmission (e.g., to a remote speakerphone). The set of microphones may be arranged in a circular array. However, other microphone array configurations are contemplated. For example, the microphone array may be elliptical, square, rectangular, etc.

The high end beams may be designed using beam forming design software. Each of the high end beams may be designed subject to the same (or similar) beam constraints. For example, each of the high end beams may be constrained to have the same pass band width (i.e., main lobe width).

In yet another set of embodiments, a system may include a set of microphones, memory and a processor, e.g., as suggested in FIGS. 1B, 7 and 8. The memory is configured to store program instructions and data. The processor is configured to read and execute the program instructions from the memory. The program instructions are executable by the processor to:

(a) receive an input signal from each of the microphones;

(b) operate on the input signals with a set of virtual beams to obtain respective beam-formed signals, wherein each of the virtual beams is associated with a corresponding frequency range and a corresponding subset of the input signals, wherein each of the virtual beams operates on versions of the input signals of the corresponding subset which have been band limited to the corresponding frequency range, wherein the virtual beams include one or more low end beams and one or more high end beams, wherein each of the low end beams is a beam of a corresponding integer order, wherein each of the high end beams is a delay-and-sum beam; and (c) compute a linear combination (e.g., a sum or a weighted sum) of the beam-formed signals to obtain a resultant signal.

The program instructions are executable by the processor to provide the resultant signal to a communication interface for transmission. The set of microphones may be arranged in a circular array. However, other microphone array configurations are contemplated. For example, the microphone array may be elliptical, square, rectangular, etc.

Figure 17:
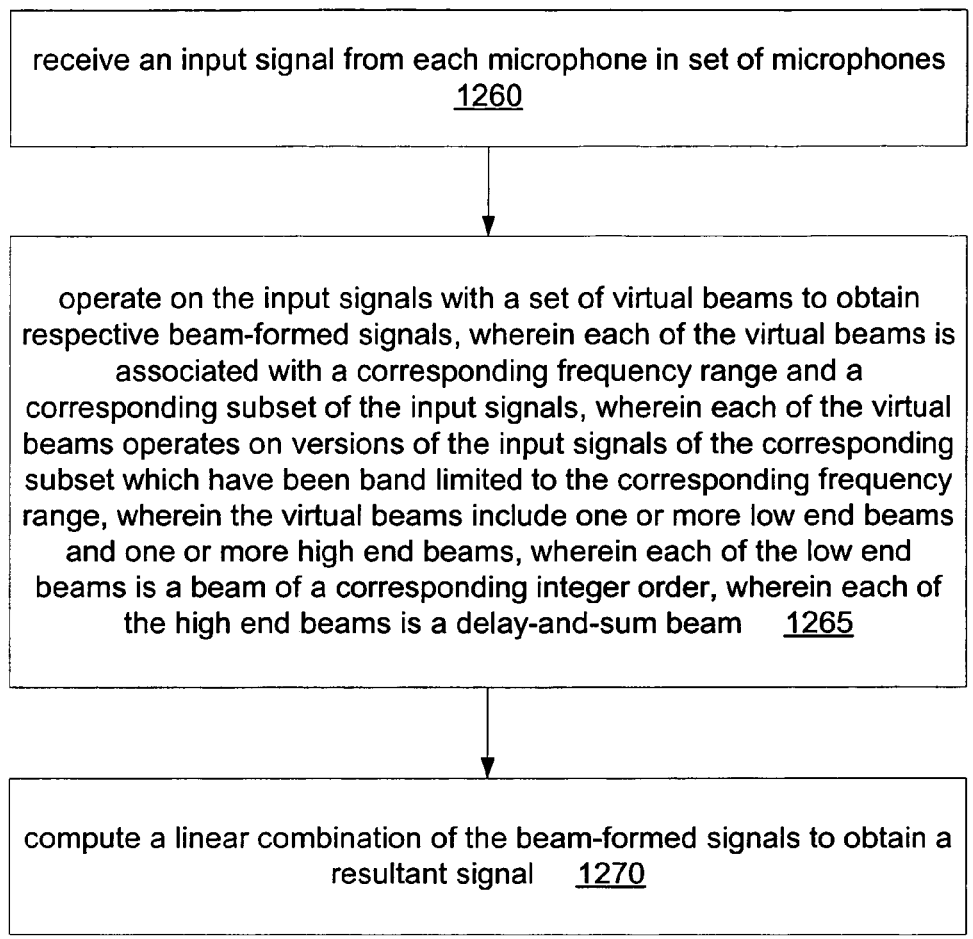
FIG. 17 illustrates another set of embodiments of a method for forming a hybrid beam.

In yet another set of embodiments, as illustrated in FIG. 17, a method for beam forming may involve:

(a) receiving an input signal from each microphone in a set of microphones;

(b) operating on the input signals with a set of virtual beams to obtain respective beam-formed signals, wherein each of the virtual beams is associated with a corresponding frequency range and a corresponding subset of the input signals, wherein each of the virtual beams operates on versions of the input signals of the corresponding subset which have been band limited to the corresponding frequency range, wherein the virtual beams include one or more low end beams and one or more high end beams, wherein each of the low end beams is a beam of a corresponding integer order, wherein each of the high end beams is a delay-and-sum beam; and (c) computing a linear combination (e.g., a sum or a weighted sum) of the beam-formed signals to obtain a resultant signal.

The resultant signal may be provided to a communication interface for transmission (e.g., to a remote speakerphone). The set of microphones are arranged in a circular array. However, other microphone array configurations are contemplated. For example, the microphone array may be elliptical, square, rectangular, etc.

The high end beams may be designed using beam forming design software. Each of the high end beams may be designed subject to the same (or similar) beam constraints. For example, each of the high end beams may be constrained to have the same pass band width (i.e., main lobe width).

One measure of the quality of a virtual beam formed from a microphone array is directivity index (DI). Directivity index indicates the amount of rejection of signal off axis from the desired signal. Virtual beams formed from endfire microphone arrays ("endfire beams") have an advantage over beams formed from broadside arrays ("broadside beams") in that the endfire beams have constant DI over all frequencies as long as the wavelength is greater than the microphone array spacing. (Broadside beams have increasingly lower DI at lower frequencies.) For endfire arrays, however, as the frequency goes down the signal level goes down by (6 dB per octave)×(endfire beam order) and therefore the gain required to maintain a flat response goes up, requiring higher signal-to-noise ratio to obtain a usable result.

A high DI at low frequencies is important because room reverberations, which people hear as that "hollow" sound, are predominantly at low frequencies. The higher the "order" of an endfire microphone array the higher the potential DI value.

Calibration to Correct for Acoustic Shadowing in a Continuously Calibrated System The performance of a speakerphone (such as speakerphone 200 or speakerphone 300) using an array of microphones may be constrained by:
 (1) the accuracy of knowledge of the 3 dimensional position of each microphone in the array;
 (2) the accuracy of knowledge of the magnitude and phase response of each microphone;
 (3) the signal-to-noise ratio (S/N) of the signal arriving at each microphone; and
 (4) the minimum acceptable signal-to-noise (S/N) ratio (as a function of frequency) determined by the human auditory system.

(1) Prior to use of the speakerphone (e.g., during the manufacturing process), the position of each microphone in the speakerphone may be measured by placing the speakerphone in a test chamber. The test chamber includes a set of speakers at known positions. The 3D position of each microphone in the speakerphone may be determined by:
 asserting a known signal from each speaker;
 capturing the response from the microphone;
 performing cross-correlations to determine the propagation time of the known signal from each speaker to the microphone;
 computing the propagation distance between each speaker and the microphone from the corresponding propagation times;
 computing the 3D position of the microphone from the propagation distances and the known positions of the speakers.

It is noted that the phase of the A/D clock and/or the phase of D/A clock may be adjusted as described above to obtain more accurate estimates of the propagation times. The microphone position data may be stored in non-volatile memory in each speakerphone.

(2) There are two parts to having an accurate knowledge of the response of the microphones in the array. The first part is an accurate measurement of the baseline response of each microphone in the array during manufacture (or prior to distribution to customer). The first part is discussed below. The second part is adjusting the response of each microphone for variations that may occur over time as the product is used. The second part is discussed in detail above.

Especially at higher frequencies each microphone will have a different transfer function due to asymmetries in the speakerphone structure or in the microphone pod. The response of each microphone in the speakerphone may be measured as follows. The speakerphone is placed in a test chamber at a base position with a predetermined orientation. The test chamber includes a movable speaker (or set of speakers at fixed positions). The speaker is placed at a first position in the test chamber. A test controller asserts a noise burst through the speaker. The test controller read and stores the signal X(k) captured by the microphone $M_j$, $j=1, 2, \ldots, N_M$, in the speakerphone in response to the noise burst. The speaker is moved to a new position, and the noise broadcast and data capture is repeated. The noise broadcast and data capture are repeated for a set of speaker positions. For example, in one embodiment, the set of speaker positions may explore the circle in space given by:
 radius equal to 5 feet relative to an origin at the center of the microphone array;
 azimuth angle in the range from zero to 360 degrees;
 elevation angle equal to 15 degrees above the plane of the microphone array.

In another embodiment, the set of speaker positions may explore a region in space given by:
 radius in the range form 1.5 feet to 20 feet.
 azimuth angle in the range from zero to 360 degrees;
 elevation angle in the range from zero to 90 degrees.

A wide variety of embodiments are contemplated for the region of space sampled by the set of speaker positions.

A second speakerphone, having the same physical structure as the first speakerphone, is placed in the test chamber at the base position with the predetermined orientation. The second speakerphone has ideal microphones $G_j$, $j=1, 2, \ldots, N_M$, mounted in the slots where the first speakerphone has less than ideal microphones $M_j$. The ideal microphone are "golden" microphones having flat frequency response. The same series of speaker positions are explored as with the first speakerphone. At each speaker position the same noise burst is asserted and the response $X^G(k)$ from each of the golden microphones of the second speakerphone is captured and stored.

For each microphone channel j and each speaker position, the test controller may compute an estimate for the transfer function of the microphone $M_j$, $j=1, 2, \ldots, N_M$, according to the expression:

$$H_j(\omega) = X(\omega)/X^G(\omega).$$

The division by spectrum $X^G(\omega)$ cancels the acoustic effects due to the test chamber and the speakerphone structure. These microphone transfer functions are stored into non-volatile memory of the first speakerphone, e.g., in memory 209.

In practice, it may be more efficient to gather the golden microphone data from the second speakerphone first, and then, gather data from the first speakerphone, so that the microphone transfer functions $H_j(\omega)$ for each microphone channel and each speaker position may be immediately loaded into the first speakerphone before detaching the first speakerphone from the test controller.

In one embodiments, the first speakerphone may itself include software to compute the microphone transfer functions $H_j(\omega)$ for each microphone and each speaker position. In this case, the test controller may download the golden response data to the first speakerphone so that the processor 207 of the speakerphone may compute the microphone transfer functions.

In some embodiments, the test chamber may include a platform that can be rotated in the horizontal plane. The speakerphone may be placed on the platform with the center of the microphone array coinciding with the axis of the rotation of the platform. The platform may be rotated instead of attempting to change the azimuth angle of the speaker. Thus, the speaker may only require freedom of motion within a single plane passing through the axis of rotation of the platform.

When the speakerphone is being used to conduct a live conversation, the processor 207 may capture signals $X_j(k)$ from the microphone input channels, $j=1, 2, \ldots, N_M$, and operate on the signals $X_j(k)$ with one or more virtual beams as described above. The virtual beams are pointed in a target direction (or at a target position in space), e.g., at an acoustic source such as a current talker. The virtual beams may be designed under the assumption that the microphones are ideal omnidirectional microphones having flat spectral response. In order to compensate for the fact that the microphones $M_j$, $j=1, 2, \ldots, N_M$, are not ideal omnidirectional microphones, the processor 207 may access the microphone transfer functions $H_j$ corresponding to the target direction (or the target position in space) and multiply the spectra $X_j(\omega)$ of the received signals by the inverses $1/H_j(\omega)$ of the microphone transfer functions respectively:

$$X^{adj}(\omega) = X_j(\omega)/H_j(\omega).$$

The adjusted spectra $X^{adj}(\omega)$ may then be supplied to the virtual beam algorithms.

At high frequencies, effects such as acoustic shadowing being to show up, in part due to the asymmetries in the speakerphone surface structure. For example, since the keypad is on one side of the speakerphone's top surface, microphones near the keypad will experience a different shadowing pattern than microphones more distant from the keypad. In order to allow for the compensation of such effects, the following calibration process may be performed. A golden microphone may be positioned in the test chamber at a position and orientation that would be occupied by the microphone $M_1$ if the first speakerphone had been placed in the test chamber. The golden microphone is positioned and oriented without being part of a speakerphone (because the intent is to capture the acoustic response of just the test chamber.) The speaker of the test chamber is positioned at the first of the set of speaker positions (i.e., the same set of positions used above to calibrate the microphone transfer functions). The test controller asserts the noise burst, reads the signal $X_1^C(k)$ captured from microphone $M_1$ in response to the noise burst, and stores the signal $X_1^C(k)$. The noise burst and data capture is repeated for the golden microphone in each of the positions that would have been occupied if the first speakerphone had been placed in the test chamber. Next, the speaker is moved to a second of the set of speaker positions and the sequence of noise-burst-and-data-gathering over all microphone positions is performed. The sequence of noise-burst-and-data-gathering over all microphone positions is performed for each of the speaker positions. After having explored all speaker positions, the test controller may compute a shadowing transfer function $H_j^{SH}(\omega)$ for each microphone channel $j=1, 2, \ldots, N_M$, and for each speaker position, according to the expression:

$$H_j^{SH}(\omega) = X_j^G(\omega)/X_j^C(\omega).$$

When the speakerphone is being used to conduct a live conversation, the processor 207 may capture signals $X_j(k)$ from the microphone input channels, $j=1, 2, \ldots, N_M$, and operate on the signals $X_j(k)$ with one or more high-end virtual beams pointed in a target direction (or at a target position) as described above. Each of the high-end beams $B(i)$ has an associated frequency range $R_i=[c_i, d_i]$ and may be designed to compensate for the acoustic shadowing effect as follows. First, an ideal high-end virtual beam $B^{Id}(i)$ corresponding to frequency range $R_i$ may be designed using the beam forming design software. The software may assume that: (a) the microphones are ideal omnidirectional microphones and (b) there is no acoustic shadowing. The ideal beam $B^{Id}(i)$ may be given by the expression:

$$IdealBeamOutput_i(\omega) = \sum_{j=1}^{N_B} C_j W_i(\omega) X_j(\omega) \exp(-1\omega d_j),$$

where the attenuation coefficients $C_j$ and the time delay values $d_j$ are real values given by the beam design software, and $W_i$ is the spectral window function corresponding to frequency range $R_i$. The failure of assumption (a) may be compensated for by the speakerphone in real time operation as described above by applying the inverse spectra $1/H_j(\omega)$, $j=1, 2, \ldots, N_M$, corresponding to the target direction (or target position). The failure of the assumption (b) may be corrected by dividing each windowed spectrum in the ideal expression above by the corresponding shadowing transfer function for the target direction. Thus, the corrected beam $B(i)$, to be used by the speakerphone in real time, may conform to the expression:

$$CorrectedBeamOutput_i(\omega) = \sum_{j=1}^{N_B} C_j W_i(\omega) X_j(\omega) \exp(-i\omega d_j)/H_j^{SH}(\omega).$$

In one embodiment, the complex value $z_i$ of the shadowing transfer function $H_j^{SH}(\omega)$ at the center frequency of the range $R_i$ may be used to simplify the above expression to:

$$CorrectedBeamOutput_i(\omega) = \sum_{j=1}^{N_B} C_j W_i(\omega) X_j(\omega) \exp(-i\omega d_j)/z_i.$$

In one set of embodiments, a failure in a microphone may be declared when there is a discontinuity in the microphone transfer function as determined by a microphone calibration and a comparison to past history information for the microphone. Similarly, a failure in a speaker may be declared when there is a discontinuity in one or more parameters of the speaker input-output model as determined by a speaker calibration and a comparison to past history information for the speaker. Similarly, a failure in any of the circuitry interfacing to the microphone or speaker may be detected.

At design time an analysis may be performed in order to predict the highest order end-fire array achievable independent of S/N issues based on the tolerances of the measured positions and microphone responses. As the order of an end-fire array is increased, its actual performance requires higher and higher precision of microphone position and microphone response. By having very high precision measurements of these factors it is possible to use higher order arrays with higher DI than previously achievable.

With a given maximum order array determined by tolerances, the required S/N of the system is considered, as that may also limit the maximum order and therefore maximum usable DI at each frequency.

The S/N requirements at each frequency may be optimized relative to the human auditory system.

An optimized beam forming solution that gives maximum DI at each frequency subject to the S/N requirements and array tolerance of the system may be implemented. For example, consider an nht array with the following formula:

$$X = g1*mic1(t-d1) - g2*mic2(t-d2) - \ldots gn*micn(t-dn).$$

Various mathematical solving techniques such an iterative solution or a Kalman filter may be used to determine the required delays and gains needed to produce a solution optimized for S/N, response, tolerance, DI and the application.

For example, an array used to measure direction of arrival may need much less S/N allowing higher DI than an application used in voice communications. There may be different S/N requirements depending on the type of communication channel or compression algorithm applied to the data.

Continuous Calibration Method

Figure 18:
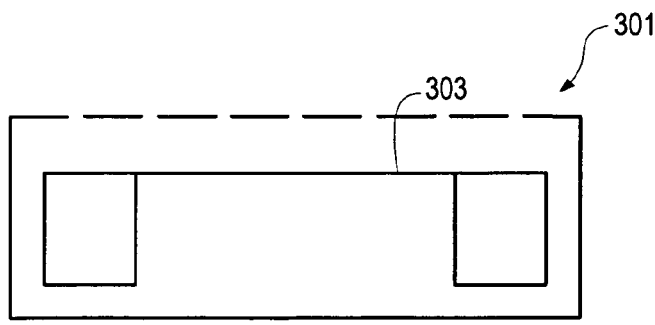
FIG. 18 illustrates one embodiment of a microphone having a diaphragm 303.

As seen in FIG. 18, a microphone 301 may have a diaphragm 303 (e.g., a Mylar® diaphragm) in the form of a non-conductive membrane. One side of the membrane may be coated with a conductive coating. The other side of the membrane may be charged with a large positive charge at the time of manufacture. The charge may, however, slowly dissipate over the lifetime of the microphone causing the microphone's response (i.e., transfer function) to drift. Other microphone constructions are also contemplated. For example, in some embodiments, continuous calibration methods may be independent of the microphone construction and therefore work for microphones such as nanotype microphones, integrated circuit microphones, etc.

In some embodiments, a speakerphone may measure and compensate for drift (e.g., the speakerphone may measure changes in gain, phase, and frequency response of microphones and correct for the drift). For example, a measurement of the signal from the microphone 301 (which typically includes a mixture of a dominant signal from a speaker and less dominant signals from other sources such as the voices of participants in the room) may be stored. An average of the measurements may be taken over time. In some embodiments, the less dominant sources may be insignificant in the time average compared to the dominant speaker source. The time average may be compared to the speaker output and the difference between the two may be used to offset the drift by adjusting the transfer function described above.

The amount of time used in the time average may depend on both the usage scenario and the microphone drift. In the case where there is a lot of constant background noise, the time averaging may be adjusted to be longer than in the case where the unit is in a quiet room. The drift will vary between different microphones (even from the same manufacturing lot) and will also vary depending on the environmental conditions. For example, if the environment is constantly humid, the electret element charge will dissipate more rapidly than in a dry environment. Average temperature will also affect the drift.

Various types of filters may be used. In some embodiments, the filter employs a log type average (with the majority weighting on the "older" data). The transfer function may be calculated in real time and then stored for "offline" processing along with a number of previously stored data points. There may be a separate "microphone calibration" routine which is run when there are no other (more real-time) demands on the processor.

Figure 19:
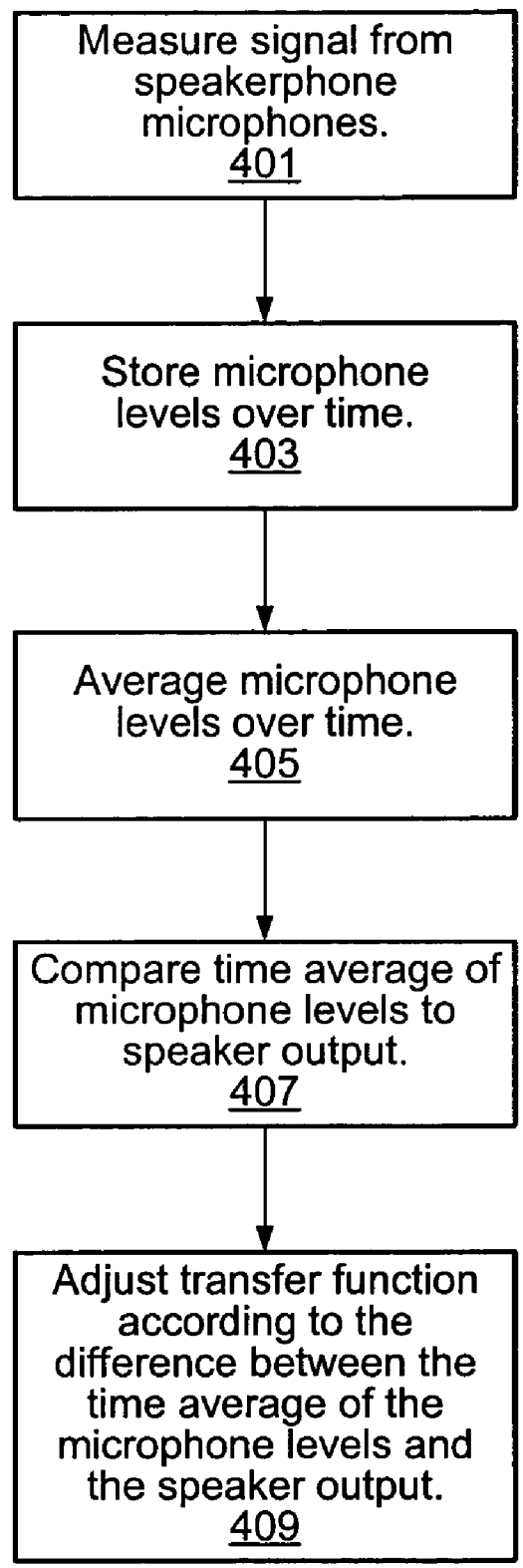
FIG. 19 illustrates one set of embodiments of a method for offsetting microphone drift.

FIG. 19 illustrates a method for offsetting microphone drift, according to some embodiments. It should be noted that in various embodiments of the methods described below, one or more of the steps described may be performed concurrently, in a different order than shown, or may be omitted entirely. Other additional steps may also be performed as desired.

At 401, a signal from the speakerphone microphones may be measured. In some embodiments, signals from each of the microphones may be measured.

At 403, microphone levels may be stored over time. In some embodiments, microphone levels from each microphone may be stored separately. In some embodiments, the microphone levels from each microphone may be added together and the sum may be stored.

At 405, microphone levels may be averaged over time. In some embodiments, the microphone levels may be averaged after a predetermined interval of time. In some embodiments, the microphone levels may be continuously averaged over time.

At 407, the time average of the microphone levels may be compared to a speaker output level. For example, the speaker output may be subtracted from the microphone level time average for each microphone. If the time average is for all of the microphone levels added together, the time average may be divided by the number of speakers before the speaker output is subtracted out.

At 409, the transfer function discussed above with respect to the speaker signal subtraction may be adjusted according to the difference between the time average of the microphone levels and the speaker output. For example, if there is a positive difference when the speaker output is subtracted from the time average, the positive difference may be effectively subtracted from the microphone's response.

In addition to the frequency-domain transfer function discussed above, the center speaker signal (i.e., the signal generated by the center speaker of speakerphone systems such as speakerphone 200 in FIG. 7) may be used in order to perform time-domain measurements. Such measurements may include tracking the variation of the total harmonic distortion of the speaker as a function of both input level and the average power level. In this latter case, many speakers can exhibit short-term variations in their output as a function of the temperature of the voice coil. This phenomenon is not easily modeled as a linear system transfer function and is typically referred to as "thermal compression". These effects may greatly influence the speaker output (and thus, the speaker-to-microphone transfer function). Fortunately, they are relatively easy to measure and do not typically change greatly over time. However, if the speaker driver is damaged for some reason (if, for example the unit is dropped from a large height onto a hard surface), then this damage might be easily detected, since the speaker-to-microphone transfer function will thus change dramatically in a short period of time.

In various embodiments, another time-domain related measurement that can be obtained from the system involves the exact relative positions of the speaker and the microphone(s). This distance can be determined by examining the acoustic delay between the speaker input signal and the microphone output signal(s). Using a simple cross-correlation function, this delay can be calculated with reasonable accuracy—typically within one audio sample time, assuming that the acoustic path between the speaker and the microphone(s) is not obstructed by some external interference. However, the reliability of such a cross-correlation measurement might be greatly increased if the speaker-to-microphone transfer function is incorporated into the calculation. In addition, the temporal resolution of such a cross-correlation measurement need not be limited to a single sample period. In order to increase the resolution of such a calculation, the cross correlation can be conducted at a much higher effective sampling rate by constructing an interpolated data stream for both the speaker input and the microphone output signals. This interpolation prior to the cross-correlation measurement may be effective in increasing the precision of the temporal delay result obtained from the cross-correlation calculation. In the construction of a virtual beam-formed output from the multiple real microphone outputs, this more exact knowledge of the true spatial locations of the microphone array elements may provide a better result than a system that does not take this information into account.

In various embodiments, two sets of variables may be maintained in the measurement system; the microphone location(s) and the speaker location. The measurement may correct for relative movement between the speaker and microphone(s). However, if the speaker is oriented such that that the axis of its major motion is perpendicular to the direction of the calibration measurement, the speaker may be much less likely to move in the measured direction. The fact that the speaker is typically many times more massive than the microphone(s) and is also typically solidly affixed to a relatively inflexible structure (the speaker enclosure) also makes it much less likely to move than the relatively small and light microphone(s). Thus, when calculating the relative positions of the microphone(s) and the speaker, the movement of the microphone(s) will typically dominate by an order of magnitude or more. In some embodiments, position estimation based on time-delay measurement may be performed, and thus, the virtual beam-formed output may be adjusted to increase its effectiveness. In some embodiments, the time-delay measurement may be made on a continuous or periodic basis. In order to create the "baseline" measurement for the system, a calibration sequence can be conducted with an external speaker and microphone system that is located in a known location in relation to the unit that is being calibrated. This absolute reference calibration may only need to be performed once (at the time of manufacture) or it may also be performed in the case where the unit in question may be required to be serviced. In various embodiments, other methods of calibrating microphones may be used with the microphones in the speakerphone. In some embodiments, the methods may be used, for example, as a result of subtracting the speaker output and/or the difference between the speaker output and the time average of the microphones.

In some embodiments, the system may self diagnose problems with various speakerphone components using drift calculations. For example, if the drift is significant (e.g., greater than a pre-defined threshold), the system may determine that one or more speakerphone components are malfunctioning. For example, the system may determine that the speaker or one or more microphones is damaged. The system may also determine whether there is a problem with a component of the speakerphone circuitry (e.g., a malfunctioning power amplifier). In some embodiments, the speakerphone may communicate the problem to a local user (e.g., by displaying or verbalizing an appropriate message). In some embodiments, the speakerphone may alert a user (or another individual or system) that there is a problem. For example, the speakerphone may send a message over IP (e.g., using traps, email, SMS message, etc.).

Generalized Beam Forming

Figure 20:
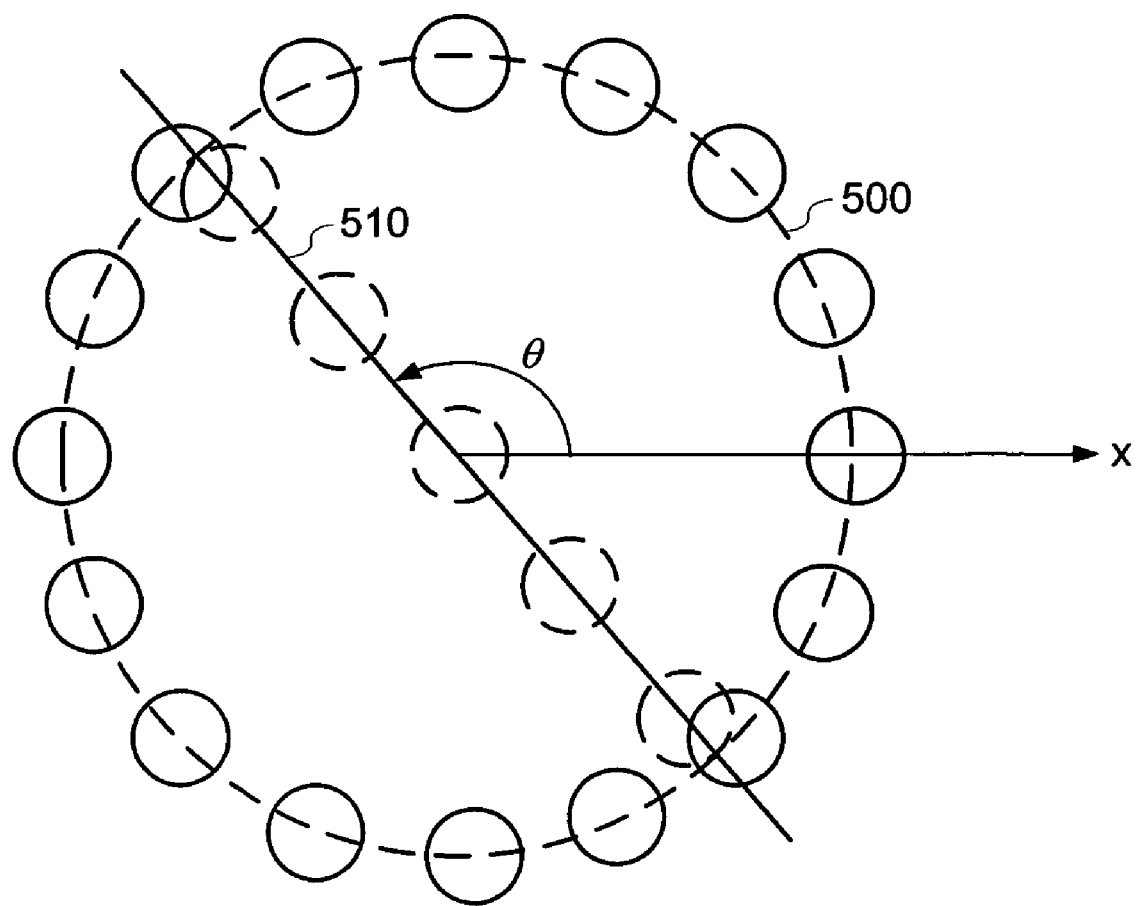
FIG. 20 illustrates a virtual linear array derived from a physical circular array of microphones.

In various embodiments, given a uniform circular array 500 of physical microphones as suggested by FIG. 20 and an arbitrary angle θ, any of various transformations such as the Davies Transformation may be applied to map the uniform circular array to a linear array 510 of virtual microphones oriented at angle θ with respect to a fixed ray which one can think of as the positive x axis. The virtual microphones are illustrated as dashed circles.

Figure 21A:
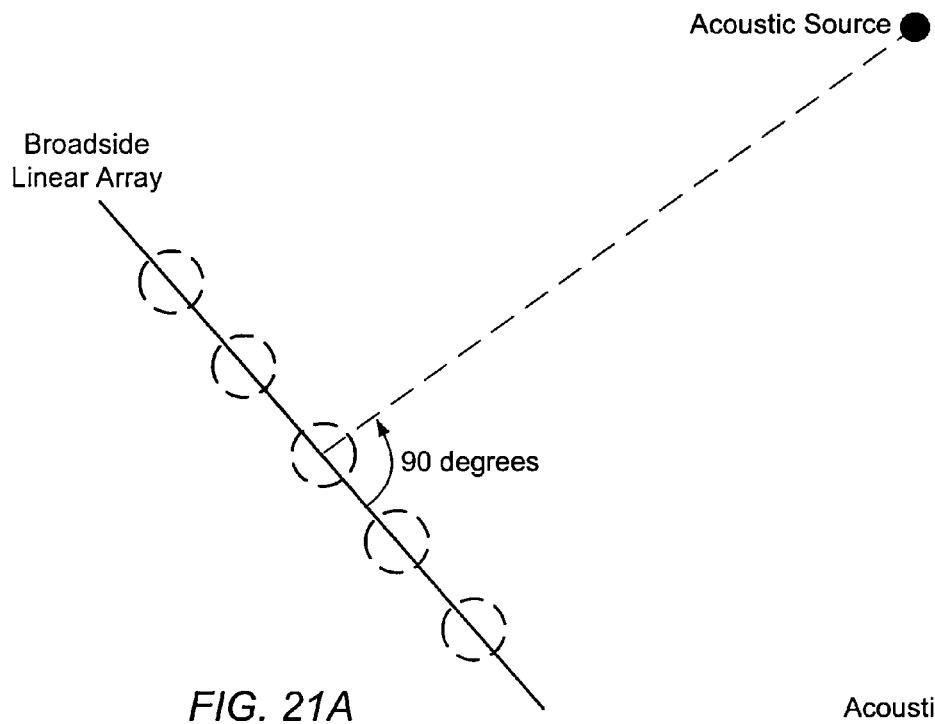
FIG. 21A illustrates a broadside linear array.

The virtual linear array 510 may be used to estimate the direction of arrival (DOA) of an acoustic signal generated by an acoustic source (e.g., a person's voice). It is a mathematical fact that the angular resolution of the DOA estimate from a linear array (physical or virtual) is highest when the DOA is normal to the axis of the linear array as suggested in FIG. 21A. (The axis of the linear array is the line along which the microphones are placed.) A linear array that is oriented so that the direction of arrival is normal to the array axis is said to be broadside to the source.

There exist a number of well-known computational methods that iteratively converge on a high-resolution DOA estimate by one or more applications of the Davies Transform (or some similar spatial frequency warping method) to generate virtual linear arrays from a physical uniform circular array. For example, these methods may involve starting with a initial set of virtual linear arrays oriented at directions spanning the circle, and then, iteratively converging on a linear array that is very close to being a broadside array.

Figure 21B:
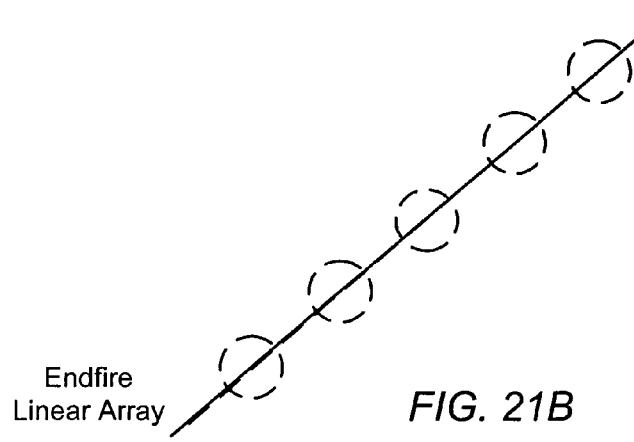
FIG. 21B illustrates an endfire linear array.
Figure 21C:
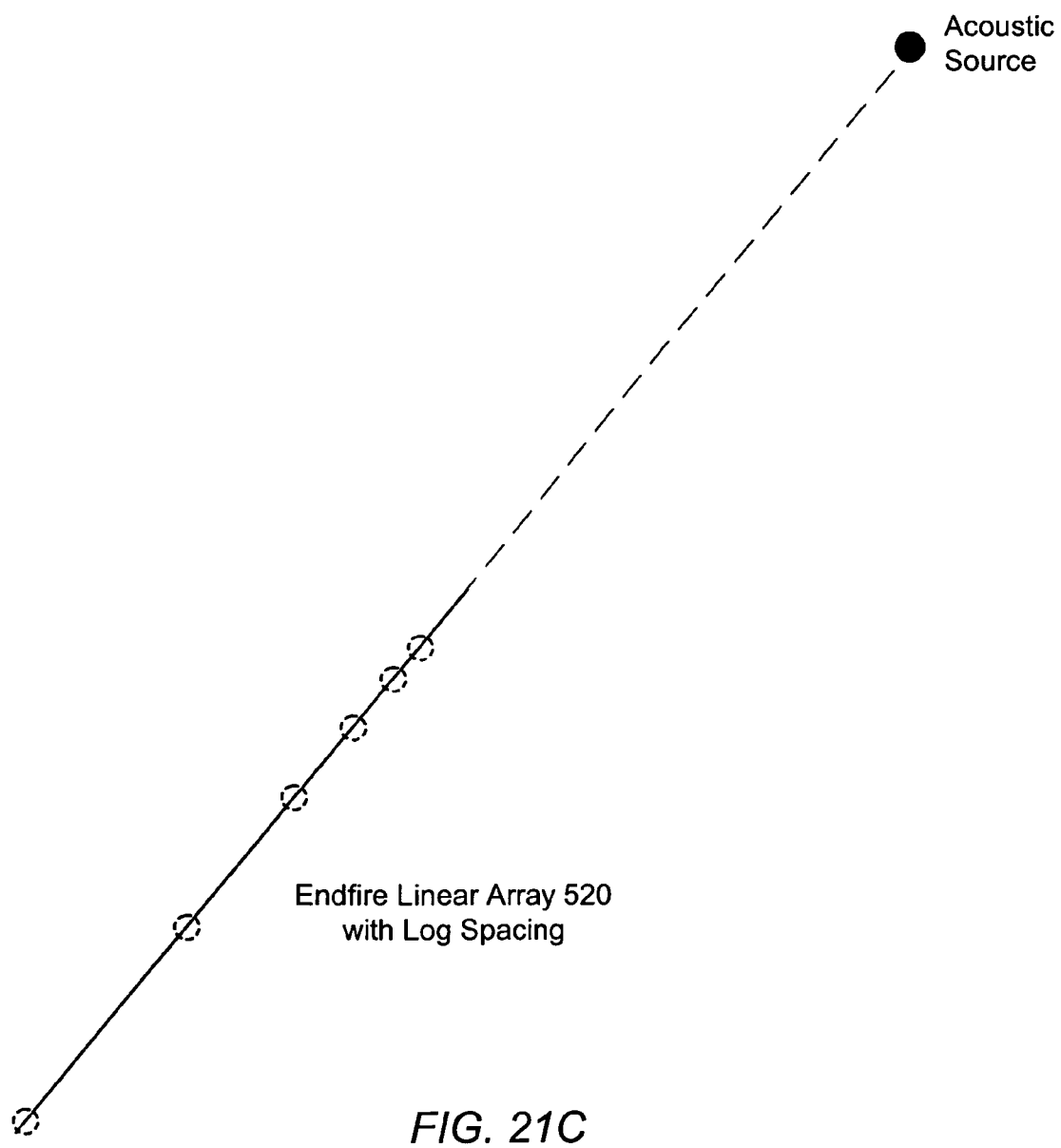
FIG. 21C illustrates a non-uniformly space endfire array.

In some embodiments, once a high resolution DOA estimate has been computed, the high-resolution DOA estimate may be used to construct an endfire array of virtual microphones (again using the Davies Transform). An endfire array is an array whose axis coincides with the direction of arrival as suggested by FIG. 21B. The virtual endfire array may be used to compute an estimate for the range (distance) of the acoustic source. Furthermore, the high resolution DOA estimate and the range estimate may be used to construct an endfire array 520 of virtual microphones having non-uniform spacing (e.g., logarithmic spacing) from the uniform circular array 500 as suggested in FIG. 21C. The range estimate may be used to optimally select the positions of the array elements.

Figure 21D:
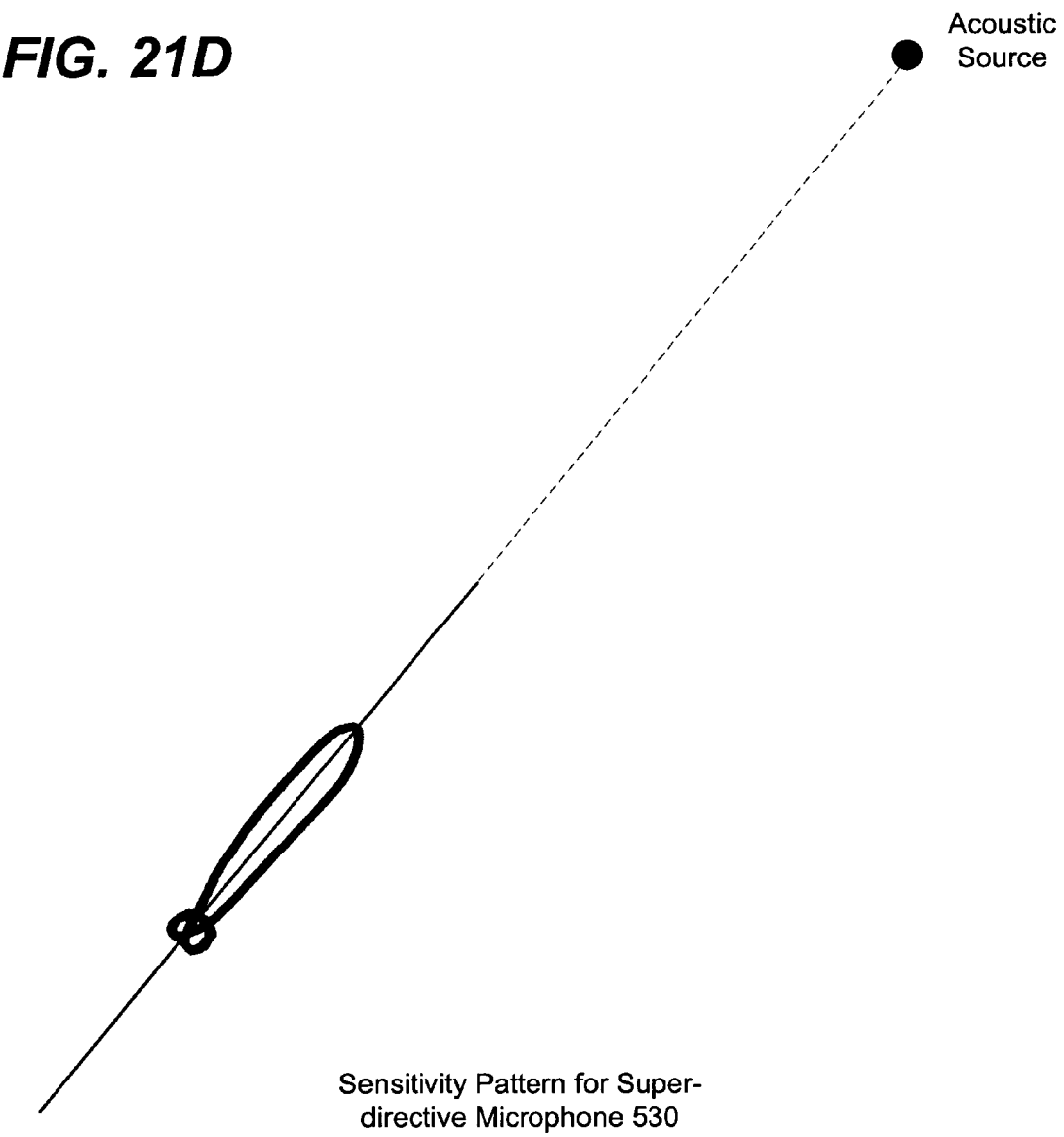
FIG. 21D illustrates the sensitivity pattern of a highly directed virtual microphone.

A single super-directive virtual microphone 530 may be constructed from the logarithmic endfire array 520. The super-directive virtual microphone 530 has a sensitivity pattern which is highly directed toward the acoustic source as suggested by FIG. 21D.

Figure 21E:
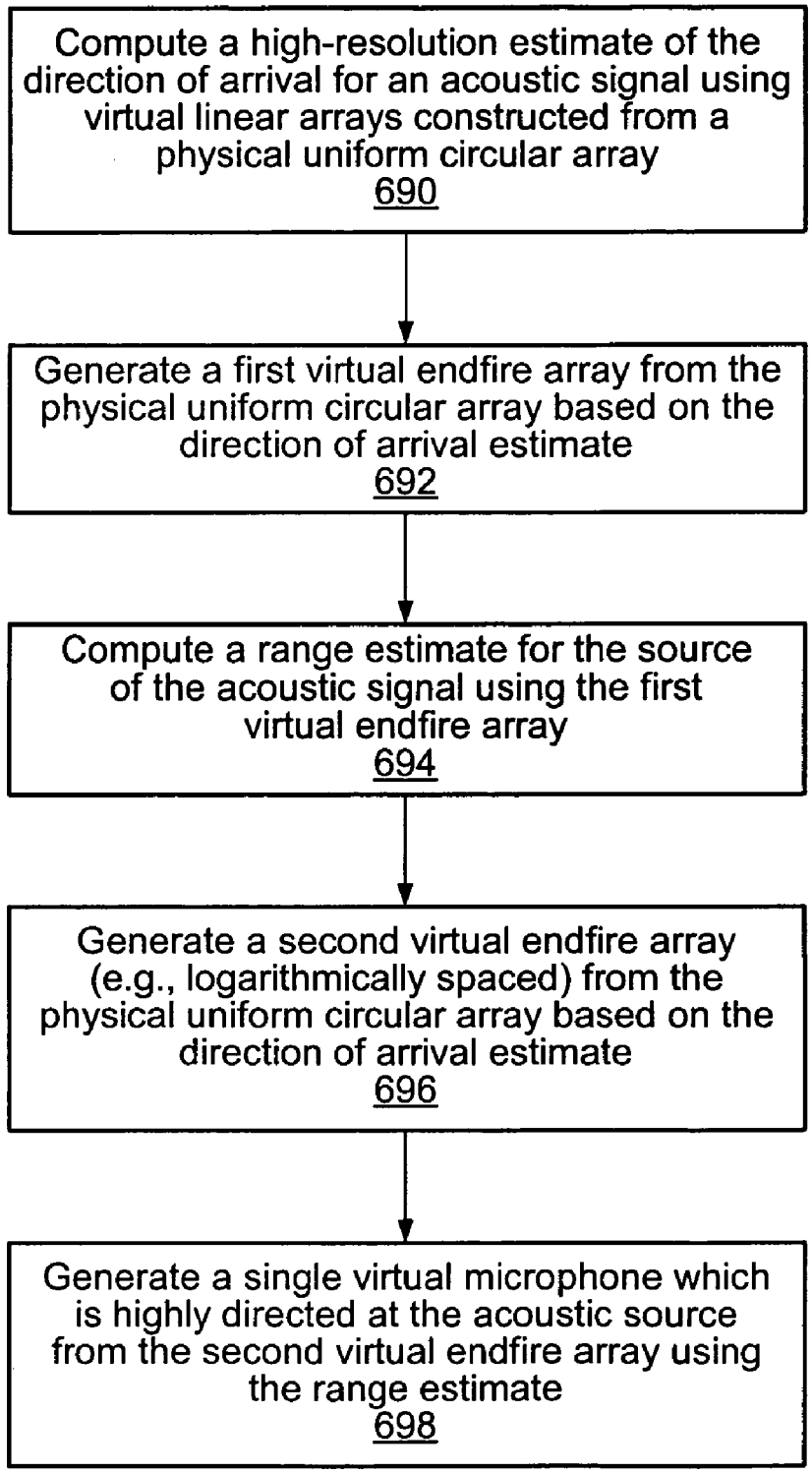
FIG. 21E illustrates one set of embodiments of a method for generating a highly directed virtual microphone pointed at an acoustic source using a uniform circular array of physical microphones.

FIG. 21E illustrates a method for generating a highly directed virtual microphone pointed at an acoustic source using a uniform circular array of physical microphones. This method may be employed in a speakerphone, or, in any device having a uniform circular array of physical microphones. In the case of a speakerphone, it may be used to generate a virtual microphone which is highly directed towards a current talker.

At 690, a processor (operating under the direction of program instructions accessed from a storage medium) may compute a high-resolution estimate of the direction of arrival for an acoustic signal using virtual linear arrays constructed from a physical uniform circular array. In one embodiment, one or more known algorithms may be employed to perform this computation of the high-resolution DOA estimate. (The virtual linear arrays may be uniformly spaced arrays, i.e., arrays having uniform spacing between successive microphone elements.)

At 692, the processor may generate a first virtual endfire array from the physical uniform circular array based on the direction of arrival estimate. The first virtual endfire array may be a uniformly spaced array.

At 694, the processor may compute a range estimate for the source of the acoustic signal using the first virtual endfire array.

At 696, the processor may generate a second virtual endfire array with non-uniform spacing (e.g., with logarithmic spacing) from the physical uniform circular array based on the direction of arrival estimate and the range estimate.

At 698, the processor may generate a single virtual microphone which is highly directed at the acoustic source from the second virtual endfire array using the range estimate.

This method may be repeated (e.g., on a periodic basis) to track a moving source. It is noted that once a source is initially located, successive repetitions of 690 may be performed much more quickly than the initial DOA estimate since the DOA algorithm can immediately start with a virtual linear array that is close to being broadside to the source (under the assumption that the source typically has changed much in angle in the time between repetitions).

High Resolution Distance Estimation for an Unknown Source

In some embodiments, when calculating a value for the range of an arbitrary source (i.e., the distance from an unknown source to the receiving microphone array), we use the fact that the Direction of Arrival (DOA) of a signal that is propagating in a substantially similar direction as the major axis of the endfire array can be determined with some accuracy. If we combine the DOA estimates for two such arrays that are aligned in slightly different directions, then we can use the intersection of these two DOA estimates to determine the distance of the source from the receiving array with reasonably good accuracy. If we combine a single, highly accurate DOA estimation (such as that which we could get from a broadside array) with a slightly less accurate DOA estimation (such as that which we could obtain from an endfire array which is nearly in line with the source), then we can get a highly accurate estimate of the distance from the source to the two arrays. If, however, the source is in the nearfield for some frequencies and in the far field for other frequencies, then we can use this information to get an accurate estimate for the range of the target at different frequencies and thus, the accuracy of the distance of the source is very highly accurate, since the equations for DOA estimation for the nearfield and the farfield case are different.

Reducing the Extent of a Linear Microphone Array

In various embodiments, a video camera 710 may include a linear array 715 of physical microphones. The linear array 715 may be arranged on a front-facing surface of the video camera as suggested by FIG. 22A. Furthermore, the linear array 715 may be located in a plane that is parallel to the imaging plane (e.g., the CCD array) of the video camera.

In various embodiments, the linear array 715 may be used to determine the direction of arrival (DOA) of talkers in the visual field of the video camera. Given a linear array of N microphones with inter-microphone spacing D (i.e., distance D between successive microphones), the angular resolution of a DOA estimate derived from the linear array is limited at low frequencies by the length L of the array. The length L determines the lowest frequency $f_A$ for which the DOA estimate can achieve angular uncertainty Δ or less. The frequency $f_A$ decreases as L increases. Note that the length L=(N−1)D.

At high frequencies, spatial aliasing becomes a problem. The spacing D determines the highest frequency $f_A$ for which the DOA estimate is unambiguous. Above that frequency the DOA estimate can be resolved only to a set of two or more possible angles. Frequency $f_A$ increases as D decreases. Thus, in order to obtain DOA estimates that are both high-resolution and non-aliased over a broad range of frequencies (e.g., the whole range of audio frequencies or of voice frequencies) would require large L and small D, and therefore, a large value of N. The large L constraint may be difficult to meet for a linear array destined for incorporation as part of a video camera. The large N constraint may involve significant expense to satisfy and implies a large signal processing load.

In some embodiments, the video camera may be used with a speakerphone as part of a video conferencing system. The video camera and the speakerphone may couple to a video-conferencing unit. A processor (or set of processors) in the videoconferencing unit may generate a set of $N_V$ directed virtual microphones from the linear array 715 as suggested in FIG. 22B. While the special case N=4 and $N_V$=4 is shown in the figure, the values of N and $N_V$ may be arbitrarily chosen subject to fundamental limitations such as cost and computational bandwidth. The $N_V$ virtual microphones may have beams that are pointed in different directions so that altogether they cover the field of view of the video camera (or, more generally, some sector of space in front of the camera).

In some embodiments, the processor may receive an audio signal from each microphone of the $N_V$ virtual microphones. Let $X_n$ denote the audio signal received from the $n^{th}$ virtual microphone, n=1, 2, 3, . . . , $N_V$. The speakerphone may have a uniform circular array of physical microphones, e.g., as illustrated in FIG. 7. As described above, the speakerphone may employ a computational method to generate a virtual microphone that is highly directed towards the current talker. The audio signal $X_Q$ generated by the virtual microphone is a high-quality representation of the talker's voice signal. The speakerphone may transmit the audio signal $X_Q$ to the video conferencing unit. In some embodiments, other microphone array shapes may be used. In some embodiments, different D/A converters may be used for each channel if the microphones have a non-uniform spacing. In some embodiments, D/A and A/D converters may not be used. For example, a purely analog circuit may be used or one D/A converter may be used along with other circuitry to modify delay lines to compensate for the microphone distances.

In some embodiments, the processor may use the audio signal $X_Q$ and the $N_V$ audio signals $X_1$, $X_2$, . . . , $X_{N_V}$ to compute an estimate of the direction of arrival of the talker's voice signal relative to the linear array 715. The processor may employ the method illustrated in FIG. 22C.

At 730, the processor may band pass filter the audio signal $X_Q$ to obtain a filtered signal $Y_Q$.

At 735, the processor may band pass filter the audio signals $X_1, X_2, \ldots, X_{N_V}$, to obtain corresponding filtered signals $Y_1$, $Y_2, \ldots, Y_{N_V}$.

At 740, the processor may perform an cross-correlation of the filtered signal $Y_Q$ with each of the filtered signals $Y_n$, n=1, 2, . . . , $N_V$.

At 745, the processor may analyze the cross-correlation results to determine which of $N_V$ virtual microphones contains the talker's audio signal with the largest amplitude. The index n of the virtual microphone that contains the talker's audio signal with largest amplitude is an indication of the direction of arrival.

As described above, the processor operates on band-pass filtered signals. Let the interval $[f_1, f_2]$ represent the pass-band of the filters. The lower cutoff frequency $f_1$ may be sufficiently large to guarantee a decent angular resolution even through the array length of the linear array 715 is small (i.e., small enough to fit on a video camera). The upper cutoff frequency $f_2$ may be sufficiently small to guarantee non-aliased DOA estimates for the spacing value D that holds in linear array 715.

In various embodiments, the band pass filtering allows the processor to use linear microphone arrays with smaller values of array length L and larger values of array spacing D, and thus, smaller values of N (the number of microphone elements). Note that $N=(L/D)+1$. The videoconferencing unit may send the camera's video signal to a second videoconferencing unit at a remote site through any of various communication mechanisms. For example, in some embodiments, the communication mechanism is the Internet. The second videoconferencing unit provides the camera's video signal to a display.

In addition, the second videoconferencing unit may drive two or more speakers. For example, the videoconferencing unit may drive two speakers, one situated left of the display and the other situated right of the display. In some embodiments, the first videoconferencing unit may send the quality audio signal $X_Q$ along with an indication of the direction of arrival of the current talker's voice relative to the linear array 715. The second videoconferencing unit may receive the audio signal $X_Q$ and the direction indication to generate signals for the two or more speakers so that the apparent location of the audio to observers at the remote site approximately agrees with the position of the talker as seen on the display at the remote site. For example, the second videoconferencing unit may generate left and right audio signals (in the two speaker case) according to the relations:

$$L = \text{alpha} * X_Q$$

$$R = (1-\text{alpha}) * X_Q$$

where the value of alpha is controlled by the DOA indication.

In some embodiments, the first video conferencing unit may be configured to generate mid/side (M/S) stereo using the quality audio signal $X_Q$ and an indication of the DOA of the current talker's voice relative to the linear array 715. The mid/side stereo may be generated according to the relations:

$$L = \text{alpha} * X_Q$$

$$R = (1-\text{alpha}) * X_Q$$

$$M = (L+R)/2 = X_Q/2$$

$$S = (L-R)/2,$$

where alpha is controlled by the DOA indication. The first video conferencing unit may transmit the M and S signals to the second video conferencing unit. The second videoconferencing unit may receive the M and S signals and recover the L and R channels to drive the left and right speakers.

Figure 22A:
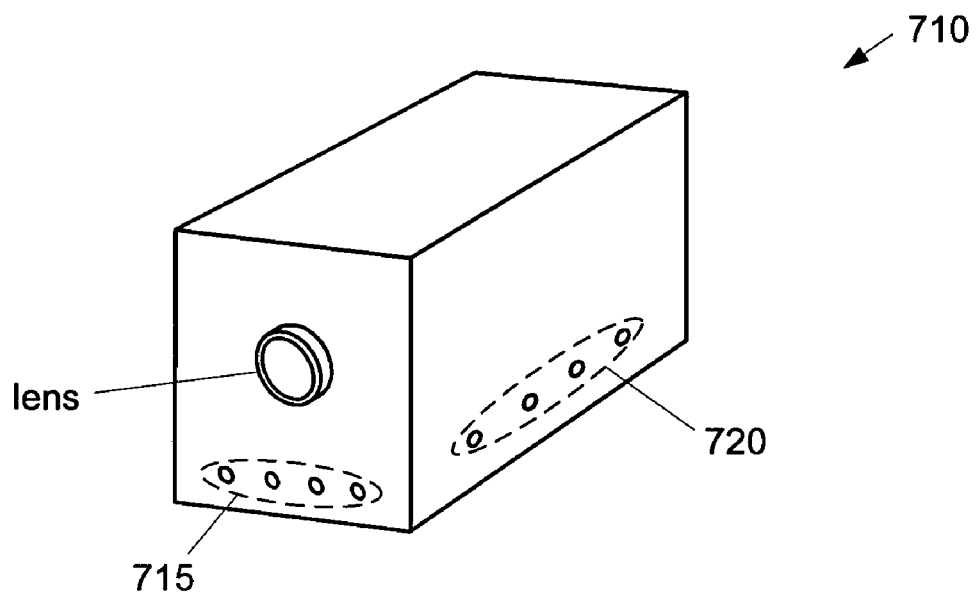
FIG. 22A illustrates a video camera having a front-facing linear array of microphones and a side linear array of microphones.
Figure 22B:
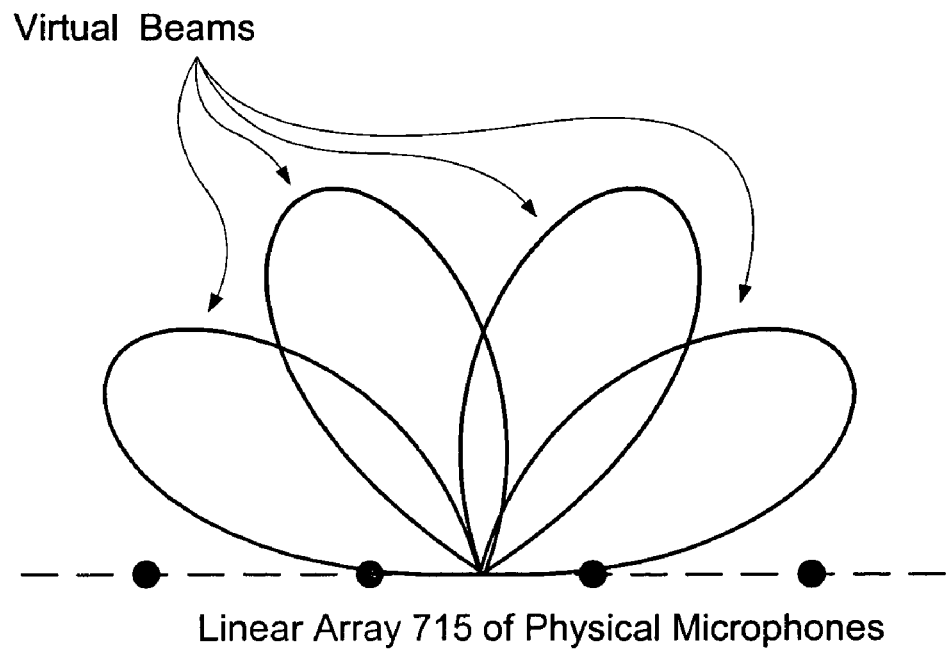
FIG. 22B illustrates a set of directed virtual microphone beams derived from a linear array of microphones.
Figure 22C:
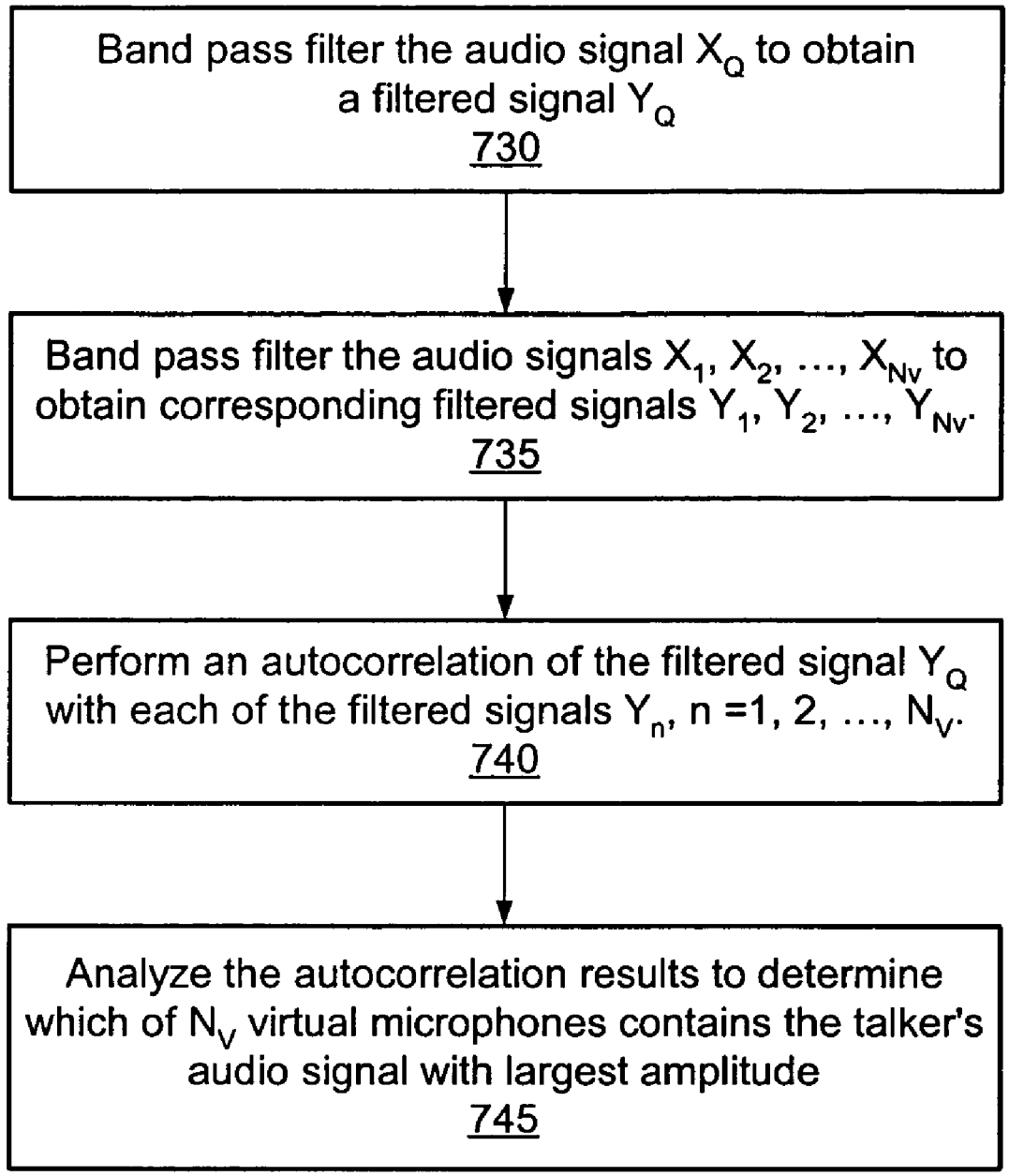
FIG. 22C illustrates one embodiment of a method for determining the direction of arrival of a known acoustic signal.

In addition to the linear array 715, the video camera 710 may include linear arrays of physical microphones on its left side and right side. In FIG. 22A, a linear array 720 is shown on the left side of the video camera. A similar array on the right side of the video camera may be imagined. Such linear arrays on the side of the video camera are referred to herein as side linear arrays.

In some embodiments, a side linear array may be used to estimate the range of the current talker. The processor may receive an audio signal from each of the $N_S$ microphone elements of the side linear array. Let $U_n$ denote the audio signal received from the $n^{th}$ microphone element, $n=1, 2, \ldots, N_S$.

In various embodiments, the processor may: (a) generate a candidate value for the range to the talker, (b) generate time shifted copies of the audio signals $U_1, U_2, \ldots, U_{N_S}$ based on the candidate range value, and (c) add the time shifted copies to generate a candidate signal. Furthermore, the processor may repeat (a), (b) and (c) to generate candidate signals $V_1, V_2, \ldots, V_L$ for corresponding candidate ranges $R_1, R_2, \ldots, R_L$. The processor may band pass filter each of the candidate signals $V_k$ to obtain a corresponding filtered signal $W_k$, $k=1, 2, \ldots, L$. The processor may also perform a cross-correlation of each filtered signal $W_k$ with the filtered signal $Y_Q$ defined above.

In some embodiments, the processor may analyze the cross-correlation results to determine which signal $W_k$ contains the signal $Y_Q$ with the largest amplitude. The corresponding range $R_k$ may be a range estimate for the current talker. By band-pass filtering the signals in the range estimation computation, the processor may use linear arrays with smaller length and larger spacing than would be allowable if the signals were unfiltered. Thus, the processor may reasonably use a linear microphone array situated on the side of a video camera to perform range estimation.

In some embodiments, the range estimate and the DOA estimate (obtained as described above) may be used by the video camera to control camera functions such as auto-focus and zoom. In some embodiments, the DOA estimation and range estimation described above may be performed by a processor in the video camera instead of a processor in a video conferencing unit.

In some embodiments, the "focus" of the direction of arrival (DOA) estimation may be narrowed using knowledge of the signal that is being located. For example, a high quality signal (a beam-formed approximation of a close-talking microphone for each of the signals of interest) may be used to increase the effectiveness of a DOA estimation algorithm in a separate broadside microphone array. In some embodiments, this additional information may help to produce better angular resolution from smaller broadside microphone arrays with larger inter-element spacing. This is due to the fact that the DOA estimator may have a priori knowledge of the desired signal. Thus, the DOA estimator may be concerned with matching this desired signal against the signals arriving at the input directions that the broadside microphone array is capable of resolving. For example, even a small broadside array with large inter-element spacing will have some frequency ranges where its angular resolution is relatively high. Thus, if the signal from the reduced-size broadside array is not required to be a broadband signal (e.g., if the signal is to be used for DOA estimation and not for signal acquisition and transmission purposes), then the beam-formed output and the broadside array output may be band-limited. This has the advantage that the broadside array dimensions may be much smaller than similarly functioning arrays where a high angular resolution must be maintained over a larger operational frequency range.

In some embodiments, a cross-correlation may be performed between the signal that is being located and the output of the broadside array at a number of angles. In some embodiments, the cross-correlation may be performed simultaneously for a number of angles. In some embodiments, the angle with the highest cross correlation and the shortest phase delay may be the best estimate of the DOA.

High Resolution Distance Estimation when the Source is Known

In various embodiments, when the source is known by some other means, the system may use this a priori knowledge to calculate the distance from the source to the receiving array to a great degree of accuracy. If the system uses a known source signal and performs a cross-correlation between that signal and the (discrete time) signals which are picked up by the receiving array, then the distance between the two can be estimated to within a small number of samples. If the system needs to obtain a more accurate estimate of the distance between the two, then the system may have the option of sampling the receiving signal at a higher sample rate in order to create a higher resolution estimate for the time delay between the two signals.

In various embodiments, there are a couple of different methods for creating this higher resolution signal. For example, the receiver may be sampled at a higher rate. However, this may require an A/D converter that is capable of performing the sampling at the higher rate. A second option is to interpolate the lower-sampling rate signal in software in order to generate an estimate of this higher resolution signal. The fact that the signal is band-limited is not important, since the system is looking for increased phase resolution (which is still present in the interpolated signal). However, this signal may be an estimate of the real higher resolution signal.

In some embodiments, the higher resolution phase estimate may be generated by repeating the output stimulus signal and then sampling the same signal from the same receiver, but with slightly different (sub-sample) delays for each of the separate transmissions. This may be accomplished by slightly delaying the time skew between the output sample clock and the input sample clock (assuming that both are known). With this mechanism, the system may get sub-sample accuracy in the delay estimation, even if the actual sample rates are relatively low. For example, the system may sample the input and output signals at 32 kHz, but by varying the input phase lag by one bit time (in a 16-bit system), the system may generate a signal which has a phase accuracy equivalent to a similar system where the input sample rate is 16×32 kHz (or 500 kHz).

Wide Dispersion Speaker

Many speakerphones use a single upward facing speaker because this gives a symmetrical sound field for listeners around the table (or surface) supporting the speakerphone. However, the upward facing angle has the best dispersion and ideal listening point directly above the speaker instead of at the typical listening position of approximately 60 degrees from the zenith (i.e., 30 degrees elevation angle).

In one set of embodiments, a smaller diameter and larger travel speaker may be used in a speakerphone (such as speakerphone 200 or speakerphone 300) to provide an adequate sound level at lower frequencies (e.g., at frequencies lower than approximately 100 Hz) and good angular dispersion at a higher frequency than competing systems.

In some embodiments, the speaker also employs a stiffer cone (e.g., a cone made of titanium, reinforced fiberglass, carbon fiber, Kevlar, etc.) that is less susceptible to breakup which effectively reduces dispersion.

Also, the speaker may be designed so that is driven on its edges instead of at its center. Driving the speaker at its edges may result in less deformation of the cone and therefore less distortion and better dispersion.

Furthermore, in some embodiments, the speaker may include a phase plug to increase dispersion at high frequencies.

In some embodiments the speaker may be non-circular, for example oval, in cross section.

Figure 23A:
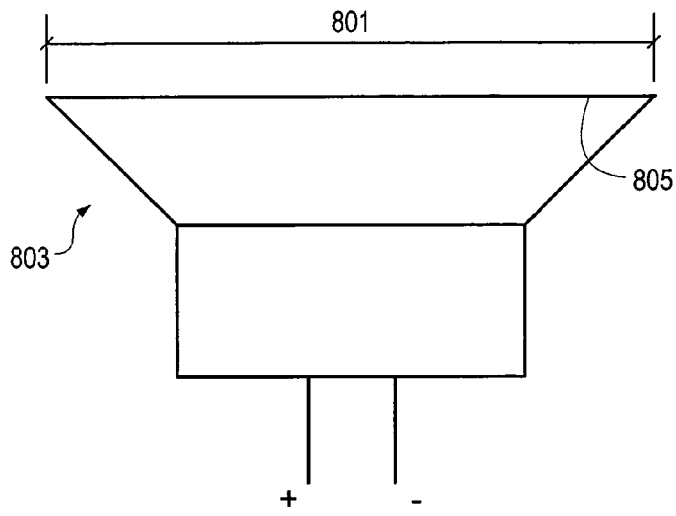
FIG. 23A illustrates one embodiment of a speaker.

Speakers may generate acoustic signals by displacing air using a diaphragm in response to a received electrical signal. One such speaker, i.e., speaker 803 is illustrated in FIG. 23A. The speaker 803 has an aperture (typically circular) and a diaphragm 805 stretched across the aperture. The diameter 801 of the aperture is a contributing factor to the amount air displacement achieved by the speaker 803. A larger diameter implies a larger amount of air displacement (all other factors being equal). A larger diameter also implies higher directionality to the speaker's transmission pattern at any given frequency. However, for a speaker to be used as part of a speakerphone it may be more desirable to have less directionality (so that all participants situated in the ambient space can hear the transmitted signal with sufficient amplitude).

Figure 23B:
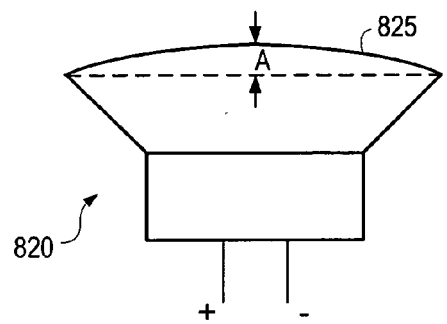
FIG. 23B illustrates one embodiment of a speaker having a smaller diameter and a larger diaphragm excursion.

In some embodiments, a speaker 820 may be designed as suggested in FIG. 23B with a smaller aperture diameter (than certain currently existing speakers) but without reducing the total amount of air displacement by designing the speaker in such a way that the diaphragm 825 has a larger excursion (i.e., travels farther) than the excursion of the currently existing speakers. The diaphragm 825 is illustrated in a state of excursion. The larger excursion of speaker 820 allows the speaker 820 to move more air per unit diaphragm surface area while the smaller aperture diameter may make the speaker less directional (more dispersive).

Figure 23C:
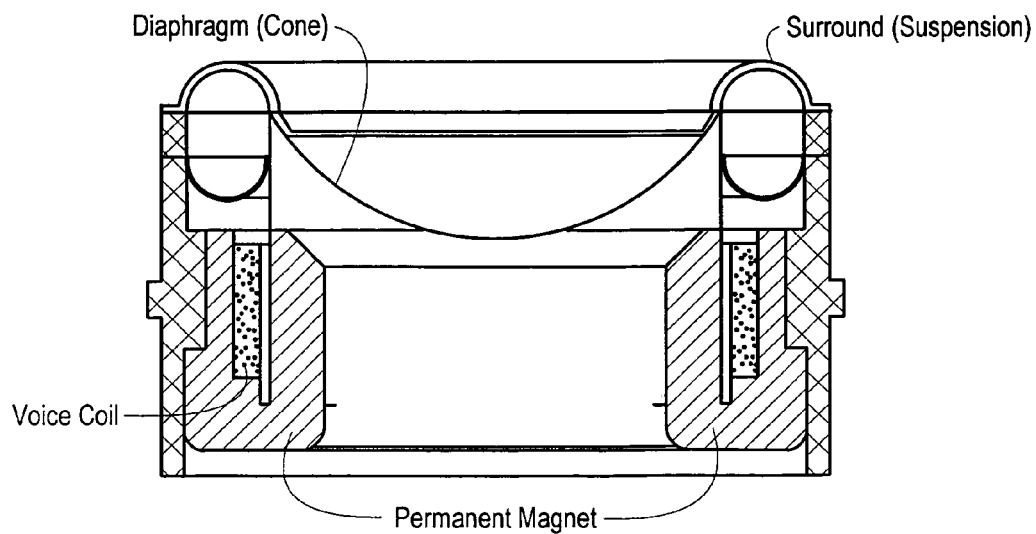
FIG. 23C illustrates one embodiment of a speaker having a smaller diameter and a long-throw transducer.

In some embodiments, a speaker may be configured as illustrated in FIG. 23C. The speaker may achieve a larger excursion by using a long-throw transducer. The diaphragm may be a curved surface (such as a portion of a paraboloid, or, a portion of a sphere or oblate sphere, a truncated cone, etc.). The speaker may be driven from its perimeter instead from its base. The speaker may be a 2" diameter speaker. Because of the larger excursion, the speaker may achieve air displacement equivalent to much larger diameter speakers (such as speakers with diameter in the range of 3" to 3.5"). Furthermore, because the speaker has a smaller diameter, the radiation pattern of the speaker may be broader than the larger diameter speakers. This broader radiation pattern may be due to a couple of factors:

1) the speaker aperture may be smaller, and
2) the diaphragm may be less likely to "break up" (i.e., move in higher-order vibrational modes) because it may be "stiffer" than a diaphragm of larger diameter speakers.

These higher-order vibrational modes may create standing waves along the surface of the diaphragm, which can act to increase distortion and also to increase the directionality (i.e., to make it more directional), because of the frequency-dependent nulls in the radiation pattern that are created as one part of the diaphragm vibrates in a different manner than other parts of the same diaphragm.

Figure 23D:
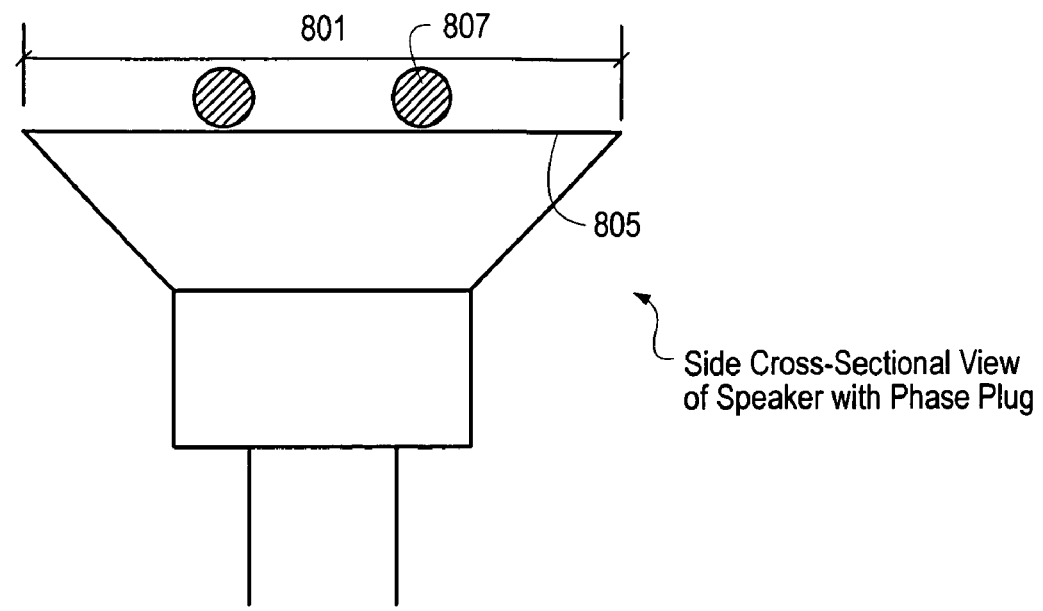
FIGS. 23D and 23E illustrates one embodiment of a speaker having a phase plug to disperse acoustic energy, especially at high frequencies.
Figure 23E:
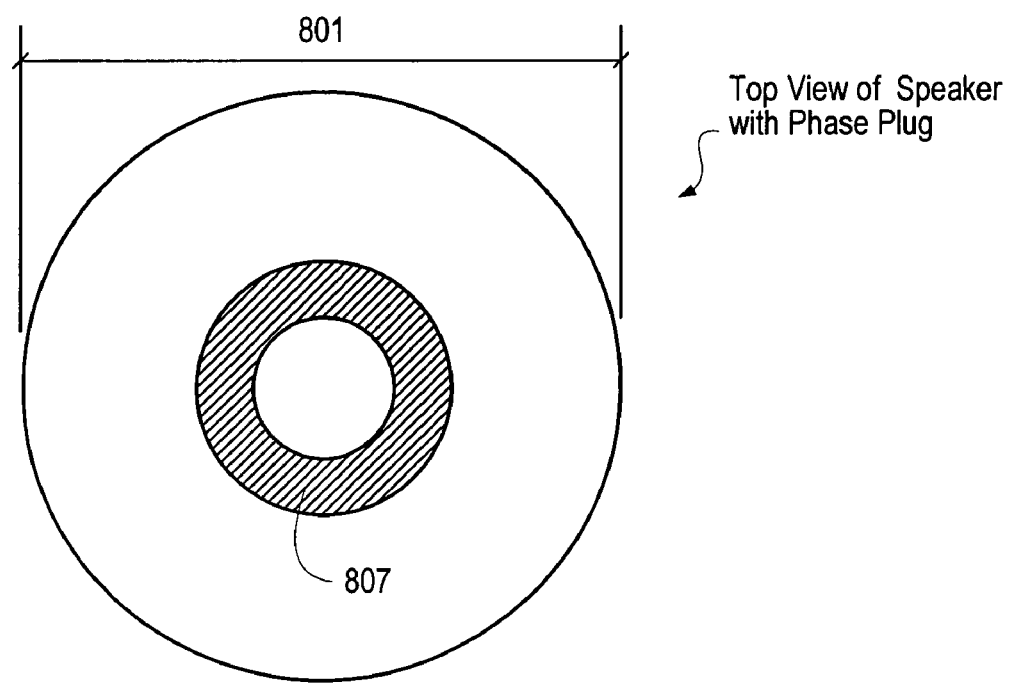

In some embodiments, a speaker may be configured with a phase plug 607 as suggested in FIG. 23D and FIG. 23E. The phase plug may be shaped like a circular ring. The phase plug may be suspended above the diaphragm of the speaker at a distance sufficient to ensure that the diaphragm does not contact the phase plug even at maximum excursion. The phase plug serves to diffract sound coming out of the speaker. For example, the phase plug may diffract high frequencies at acute angles (i.e., at angles less than 90 degrees) relative to the central axis of the speaker.

In various embodiments, the diffraction of the high frequencies induced by the phase plug may make the speaker's transmission pattern less narrowly focused at high frequencies. The phase plug is illustrated as being circular in the side cross-section of FIG. 23D. However, the phase plug may have other non-circular cross-sections. For example, in some embodiments, the phase plug may have a rectangular cross-section. In some embodiments, the speaker may be configured with a smaller diameter, a larger excursion, and a phase plug by combining the teachings of the above described embodiments.

One or more speakers conforming to any or all of the speaker embodiments described above may be incorporated into a speakerphone or videoconferencing system.

Method for Battery-Operated Speakerphone

Figure 24A:
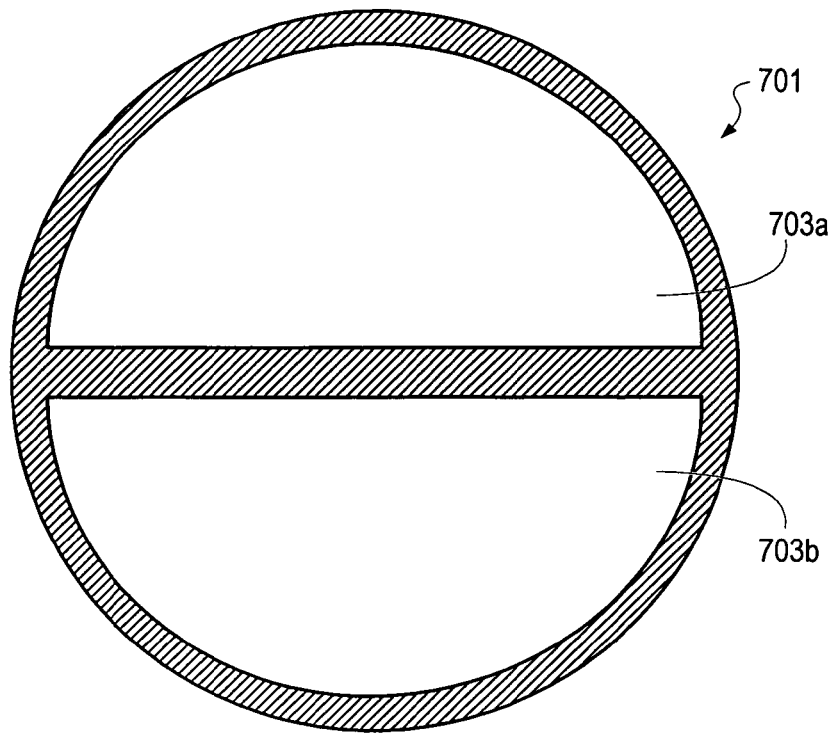
FIGS. 24A and 24B illustrate a bottom view of a speakerphone 701, according to some embodiments, without and with a battery inserted.
Figure 24B:
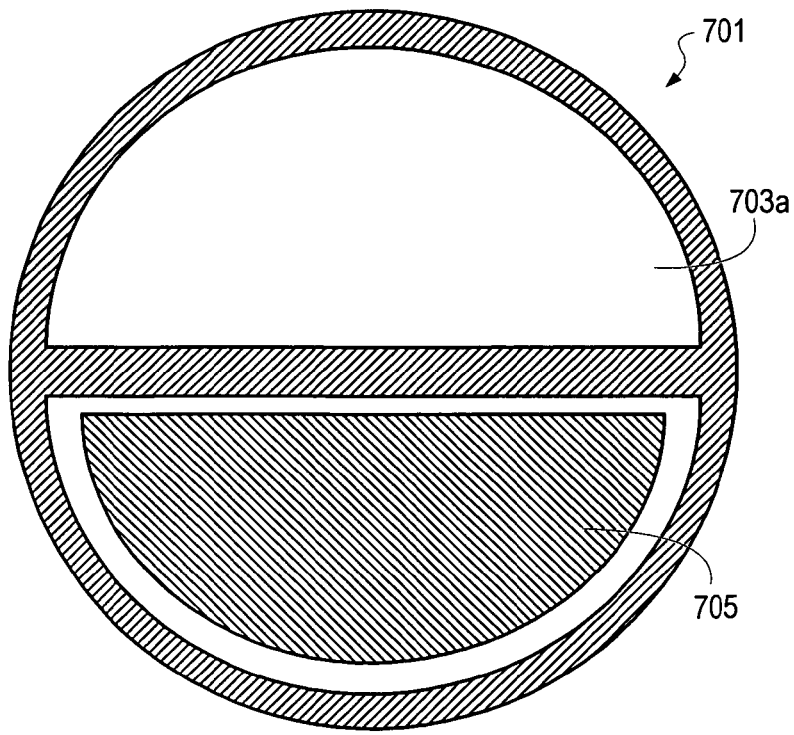

FIGS. 24A and 24B illustrate a bottom view of a speakerphone 701, according to some embodiments. To avoid having to plug the speakerphone 701 into an electrical outlet, the speakerphone 701 may be powered using a battery 705. The speakerphone 701 may be configured for quick exchange of batteries.

In some embodiments, the speakerphone 701 may be configured to exchange batteries with a charging stand. In some embodiments, a depleted battery may be disengaged from the speakerphone 701. The depleted battery may engage the charging stand while a charged battery disengages from the charging stand and engages the speakerphone 701.

In some embodiments, speakerphone 701 may have two battery compartments denoted 703a and 703b. (The two battery compartments are collectively referred to as compartments 703.) During the exchange operation one of the compartments may receive the charged battery while the other compartment releases the depleted battery.

In some embodiments, the compartments 703 may be configured to hold batteries that are shaped like a half-disk (or approximately like a half-disk). Other shapes are also contemplated. For example, the compartments 703 may be configured to hold batteries that are shaped like rectangular parallelepipeds. In some embodiments, the compartments 703 may be configured to hold batteries that are disk shaped. A wide variety of embodiments are contemplated for the compartments 703 based on variation of the battery shape. FIG. 24A illustrates the speakerphone without any batteries inserted into compartments 703. FIG. 24B illustrates the speakerphone with a battery 705 inserted into compartment 703b.

Figure 25A:
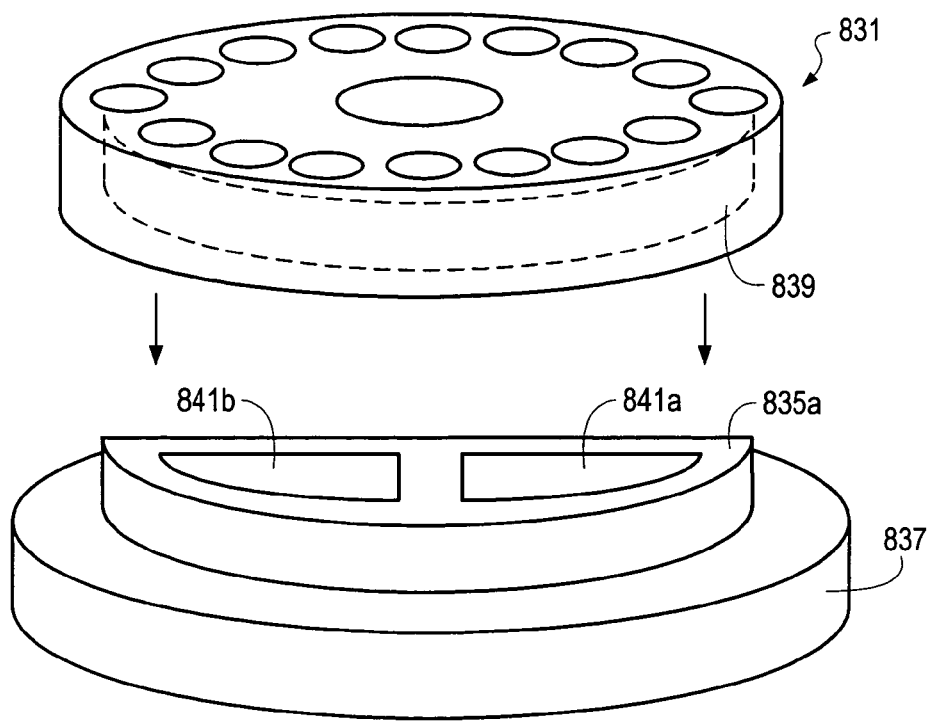
FIGS. 25A and 25B illustrate one set of embodiments of a system including a speakerphone and a charging stand.
Figure 25B:
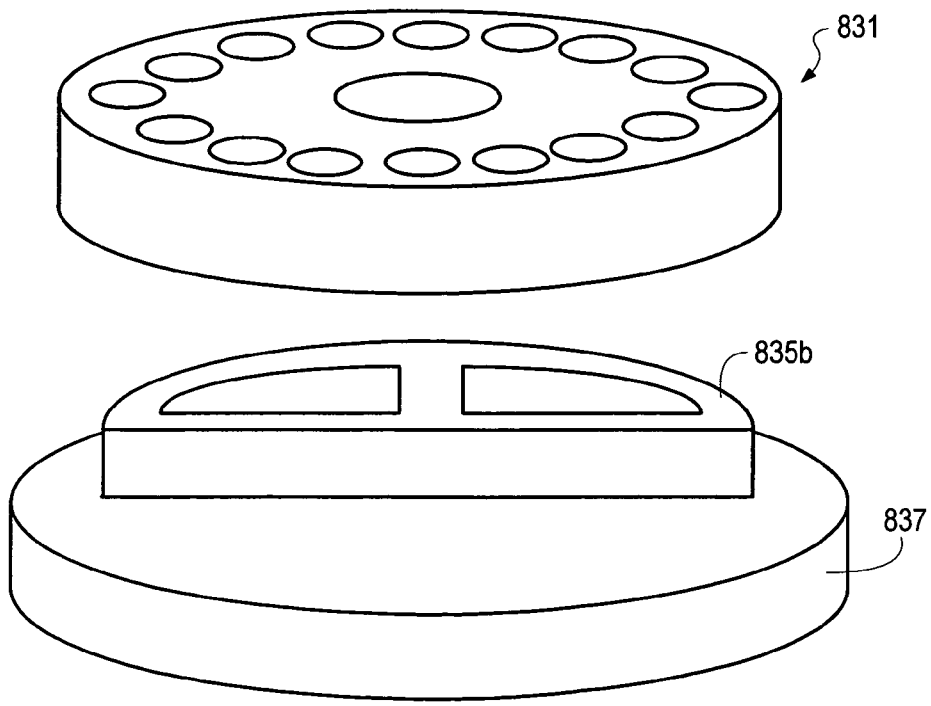

FIGS. 25A and 25B illustrate various embodiments of a system including a speakerphone 831 and a charging stand 837. A battery 835a may charge on charging stand 837. In various embodiments, as the speakerphone 831 is lowered onto the battery 835a, a set of one or more electromagnets in the speakerphone 831 (or alternatively, in the battery 835a) may be turned on. The magnetic field generated by the electromagnets may attract one or more metal structures on the battery 835a (or alternatively, on the speakerphone 831). The metal structures may be plates as suggested by plates 841a and 841b in FIG. 25A. The metal plates 841a and 841b may be the electrical terminals of the battery 835a.

In some embodiments, the electromagnets may stay on to keep the battery 835a coupled to the speakerphone 831. In some embodiments, a second coupling mechanism (e.g., a latch or a permanent magnet) may engage the battery as the electromagnets pull the battery 835a toward the speakerphone 831. After the second coupling mechanism has engaged the battery 835a, the electromagnets may be turned off. In some embodiments, the same set of electromagnets (or alternatively, a different set of electromagnets) may be used to repel the battery 835a to disengage the battery 835a from the second coupling mechanism when desired, e.g., when the battery 835a has depleted after having been used in the speakerphone 831 for a period of time.

In some embodiments, as the battery 835a is coupled to the speakerphone 831, a battery 835b may be decoupled from the speakerphone 831 and mounted onto the charging stand 837. The battery 835b may align with the charging stand 837 as the speakerphone 831 is aligned with the battery 835a. A second set of one or more electromagnets on the speakerphone 831 may be used to disengage or repel the battery 835b onto the charging stand 837.

In some embodiments, the charging stand 837 may have a set of electromagnets to repel or attract batteries toward or away from the speakerphone 831. As mentioned above, the metal plates 841a and 841b may be the electrical terminals of the battery 835a. In some embodiments, as the speakerphone 831 is lowered onto the battery 835a (e.g., in its state of being seated on the charging stand 837), electrical terminals 841a and 841b may come into physical contact with electrical terminals of the speakerphone 831, and thus, current flow between battery 835a and speakerphone 831 may be induced. At least a portion of this current flow may be directed to the electromagnets to create a force of attraction between battery 835a and speakerphone 831. The force of attraction may be sufficient to maintain the physical contact between the electrical terminals, and thus, the flow of current. Therefore, a continuous force of attraction which maintains the physical contact is established in response to the initial physical contact.

In some embodiments, the continuous force of attraction may be sufficient to support the weight of the battery 835a, and thus, to maintain the physical (and electrical) contact of the battery 835a and speakerphone 831 even when the speakerphone is lifted away from the charging stand 837. In some embodiments, the electromagnets may be used to establish a coupling between the battery 835 and the speakerphone 831 for a short period of time until a second coupling mechanism (e.g., a latch or a permanent magnet) has been engaged. The current to the electromagnets may be shut off after the second coupling mechanism has engaged.

Figure 26A:
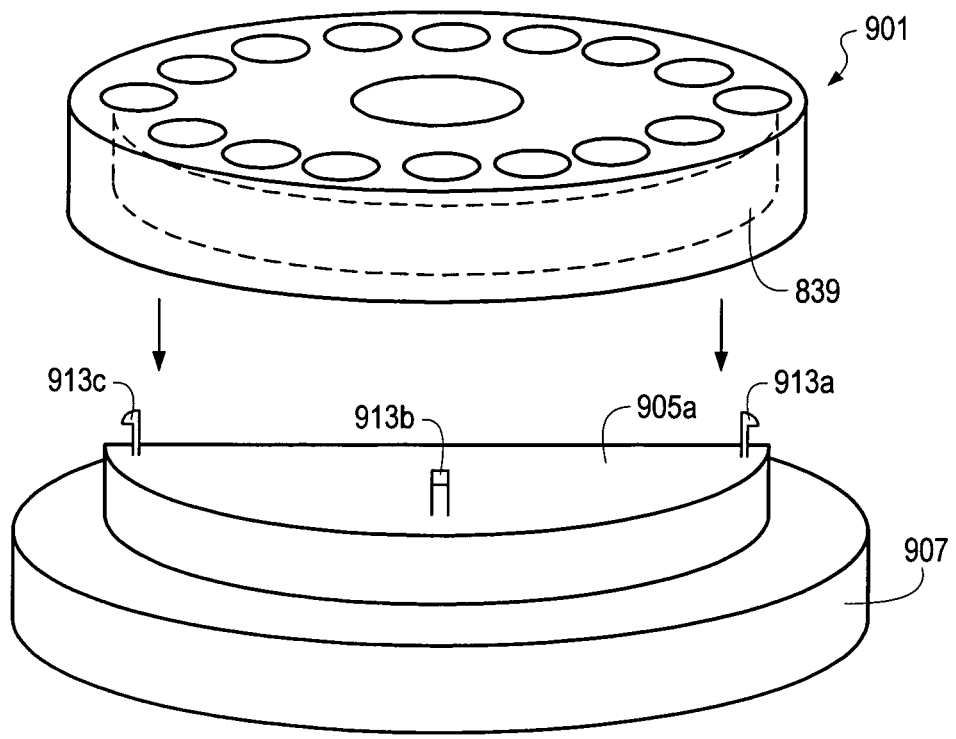
FIGS. 26A and 26B illustrate another set of embodiments of a system including a speakerphone and a charging stand.
Figure 26B:
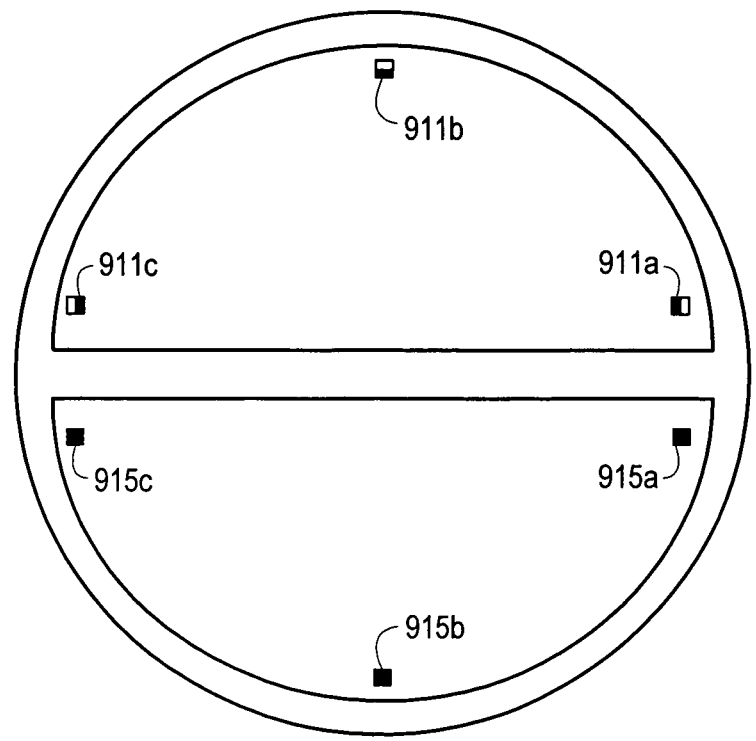

FIGS. 26A and 26B illustrate various embodiments of a system including a speakerphone 901 and a charging stand 907. A battery 905a may charge on the charging stand 907. The battery 905a may have hooked stems 913. Speakerphone 901 may have latches. The speakerphone 901 may control the latches to engage or disengage the hooked stems. FIG. 26B illustrates a bottom view of the speakerphone 901. The latches 911 for a first battery compartment are illustrated in the closed state. The latches 915 for a second battery compartment are illustrated in an open state.

In some embodiments, as the speakerphone 901 is lowered onto the battery 905a, the latches of the corresponding battery compartment may transition from the open state to the closed state in order to secure connection with the battery 905a. In some embodiments, the speakerphone 901 may also release a second battery (e.g., a depleted battery) onto the charging stand by opening the latches of the battery compartment that has held the second battery.

In some embodiments, the latches and hooked stems may be reversed (i.e., the hooked stems may be configured on the speakerphone 901 and the latches configured on the batteries).

In some embodiments, the latches may be fixed, and the hooked stems may move back and forth to engage or disengage the latches.

Figure 27A:
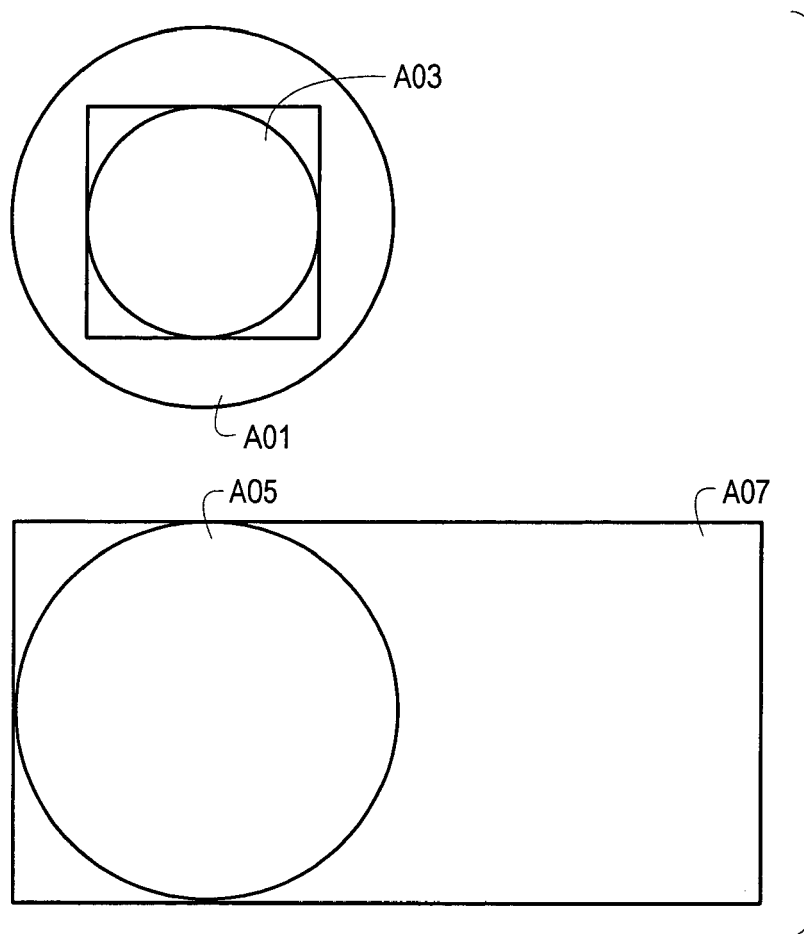
FIGS. 27A and 27B illustrate yet another set of embodiments of a system including a speakerphone and a charging stand.
Figure 27B:
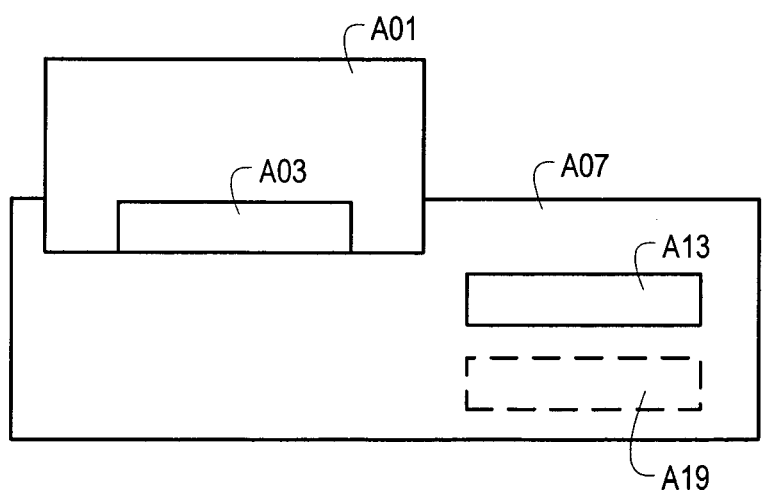

As seen in FIGS. 27A and 27B, in some embodiments, a speakerphone A01 with internal battery A03 may be placed into a speakerphone slot A05 of charging stand A07. In some embodiments, the internal battery A03 may be round to eliminate rotational alignment issues when inserting the speakerphone A01 into the charging stand A07. Other battery shapes are also contemplated (e.g., square).

As seen in the side view (FIG. 27B), internal battery A03 may be exchanged with a battery already present in the charging stand A07 using various internal guides and motors. When the speakerphone A01 is placed in the speakerphone slot A05, the internal battery A03 may be automatically removed from the speakerphone A01 and moved to an empty holding position (such as holding position A19) to be recharged.

In some embodiments, a charged internal battery A13 may be automatically moved into the speakerphone A01. In some embodiments, the process may take less than five seconds. In some embodiments, the speakerphone A01 may continue to operate while the batteries are being exchanged to minimize disruptions to a conference call.

In some embodiments, the speakerphone A01 may indicate when remaining battery life is less than a designated amount (e.g., with an indicator on screen or by a flashing light) so the user may quickly swap batteries before or during a call. In some embodiments, the battery in the charging stand A07 may automatically charge to insure a charged battery is ready for exchange when needed.

Hardware Diagrams

Figure 28A:
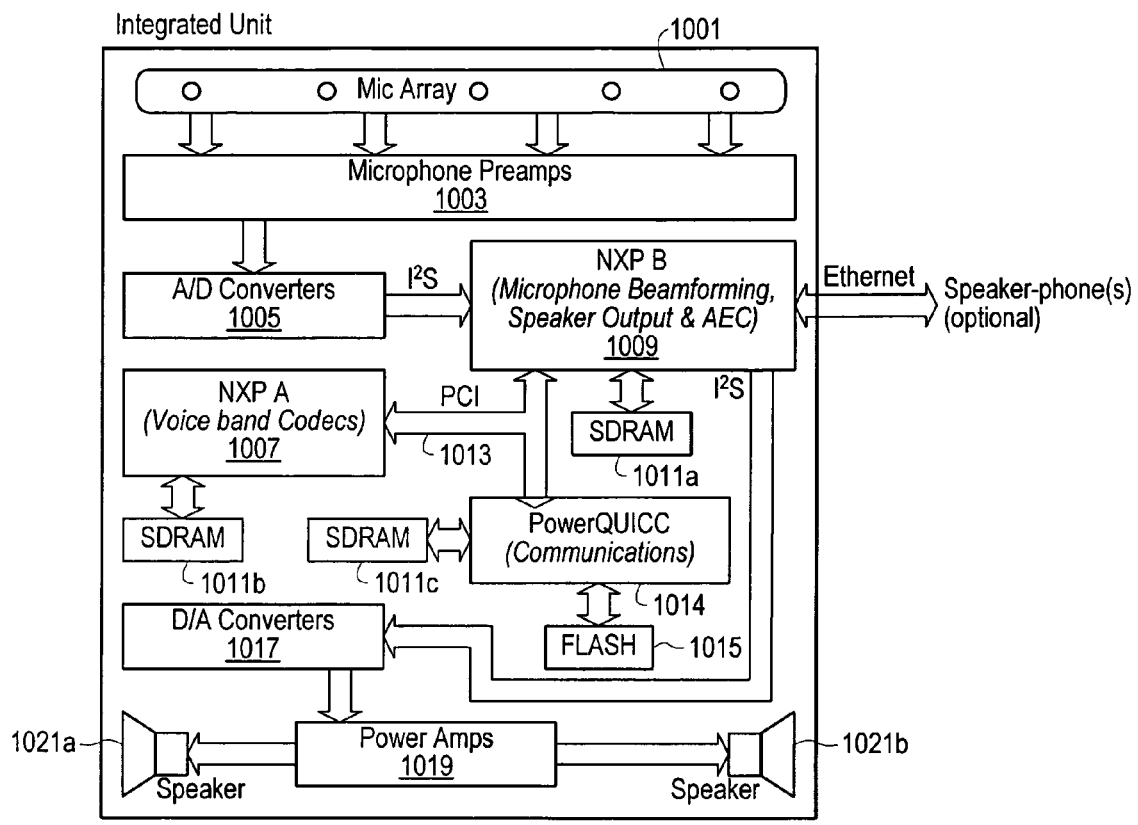
FIG. 28A illustrates an integrated unit, according to some embodiments.
Figure 28B:
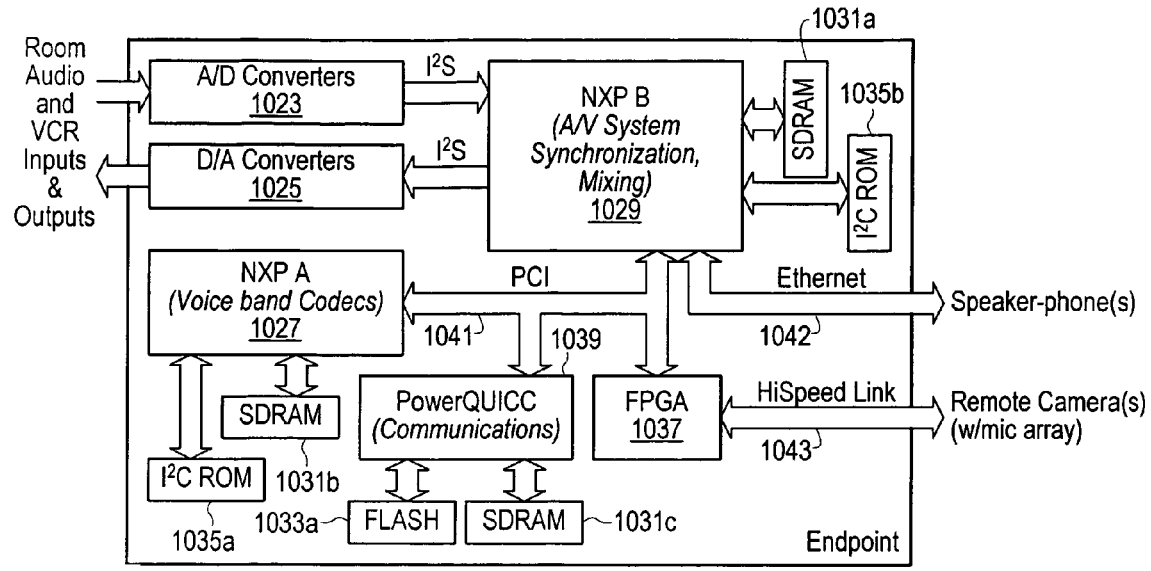
FIG. 28B illustrates an endpoint, according to some embodiments.
Figure 28C:
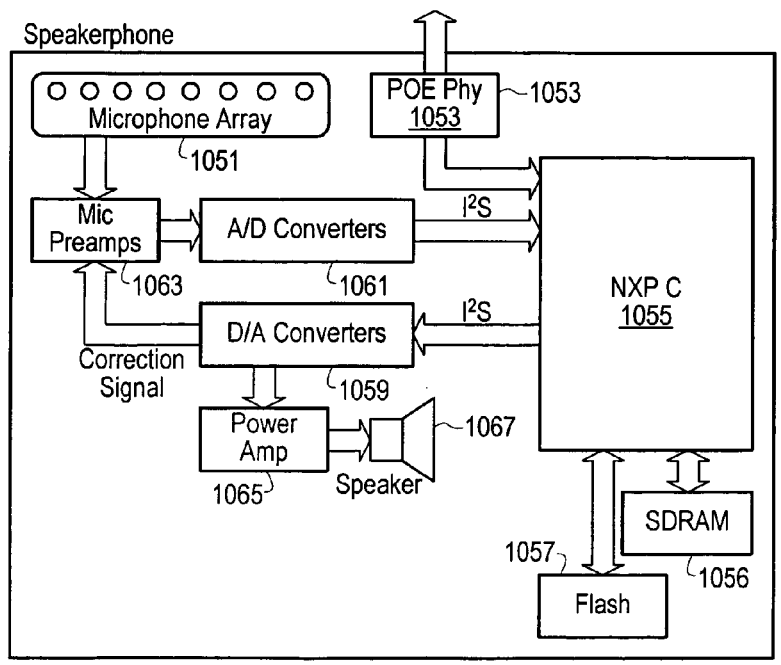
FIG. 28C illustrates a speakerphone, according to some embodiments.

FIGS. 28A-C illustrate various embodiments for an integrated unit, an endpoint, and a speakerphone. FIG. 28A illustrates an integrated unit, according to some embodiments. Signals from a microphone array 1001 may enter microphone preamps 1003 and then A/D converters 1005. A processor 1009 may perform beamforming and acoustic echo cancellation (AEC) and manage speaker output. A PCI bus 1013 may connect various processors (e.g., processor 1009 and 1007). The processors may use various types of memories. For example, the processor may use synchronous dynamic random access memories (SDRAMs) 1011, flash memories 1015, and I²C read only memories (ROM). Signals from processor 1009 may be converted by D/A converter 1017 and amplified by power amplifiers 1019 before entering speakers 1021. In some embodiments, a communications processor 1014 (e.g., a PowerQUICC communications processor) may manage communications processing. In some embodiments, I²C and I²S busses may be used between various components.

FIG. 28B illustrates an endpoint, according to some embodiments. Signals entering the endpoint (e.g., from room audio and a videocassette recorder) may be converted by an A/D converter 1023. Processors 1027 and 1029 may handle audio/video synchronization, mixing, and voice band codecs, among other things. A PCI bus 1041 may connect various processors such as processors 1027 and 1029, field programmable gate arrays (FPGA) 1037, and PowerQUICC 1039. Various memories (e.g., SDRAMs 1031 and Flash 1033) may also be used. Outputs from the system may be converted by D/A converters (e.g., D/A converter 1025) and may be output through links such as Ethernet 1042 and Hispeed link 1043.

FIG. 28C illustrates a speakerphone, according to some embodiments. As discussed above, signals from the microphone array 1051 may be combined with a correction signal in analog signal summing devices (not shown) and sent through microphone preamps 1063. Signals from the microphone preamps 1063 may be converted by A/D converters 1061 before being processed in processor 1055.

In some embodiments, the processor 1055 may also use memories 1056 and 1057. Signals from the processor 1055 may be converted by D/A converter 1059 and amplified by power amplifier 1065 before being sent to the speaker 1067.

Furthermore, a digital correction signal from processor 1055 may be converted by D/A converter 1059 to obtain the analog correction signal that is sent to the microphone preamps 1063 to be combined with the raw microphone signals.

Figure 29:
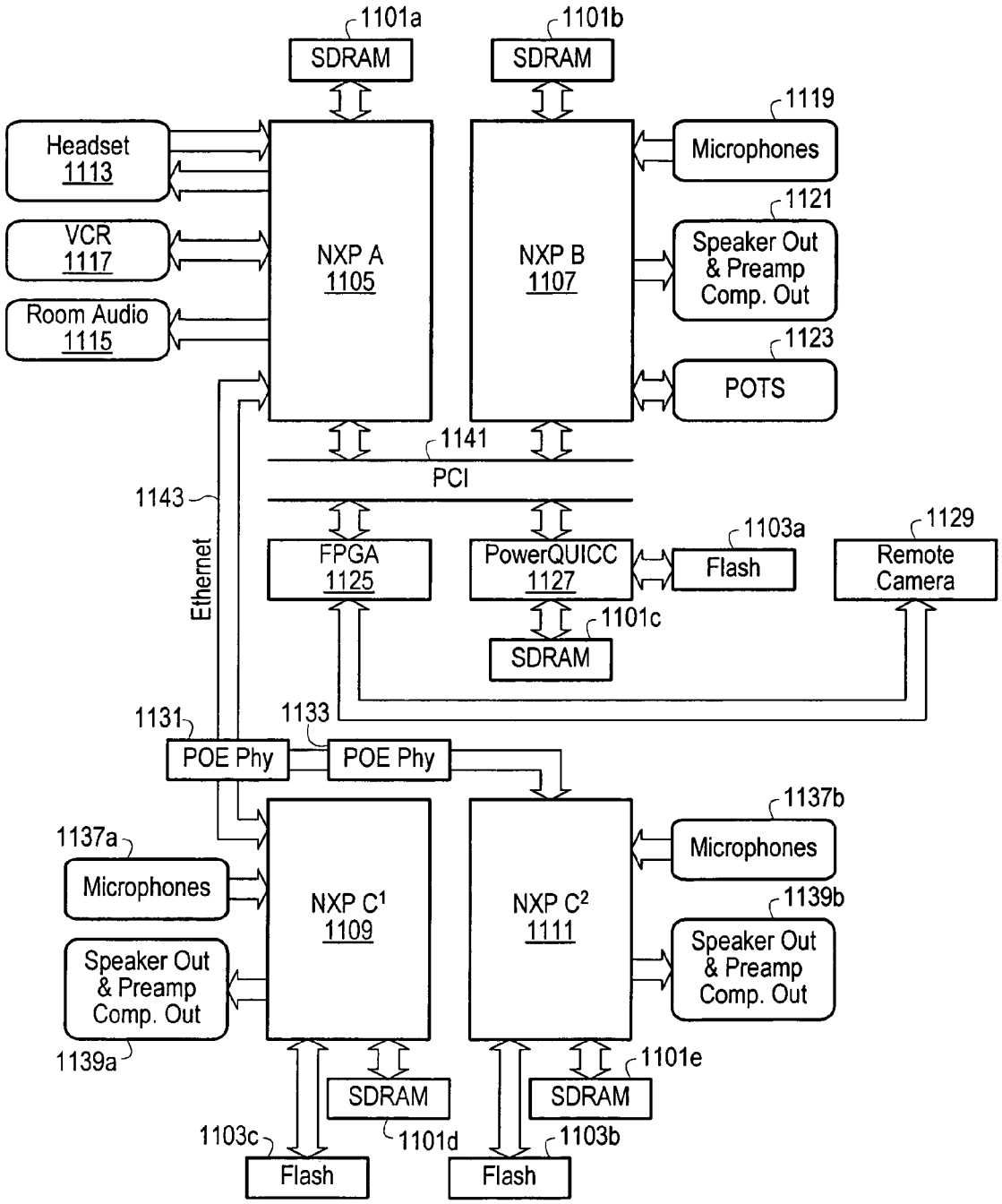
FIG. 29 illustrates an audio system block diagram, according to some embodiments.

FIG. 29 illustrates an audio system block diagram, according to some embodiments. In some embodiments, signals from various components such as headsets 1113, VCR 1117, microphones 1119, and a Plain Old Telephone Service (POTS) line may be received by various processors (e.g., processors 1105 and 1107). Output from the system may include signals sent to the headset 1113, VCR 1117, room audio 1115, speaker 1121, and POTS 1123. The processors and other components of the audio system may use memories 1101 and 1103. Various components may also communicate over a PCI bus 1141 (e.g., the processors 1105 and 1107 with the FPGA 1125 and the PowerQUICC 1127). Signals from the FPGA 1125 may control and receive input from a remote camera 1129.

In some embodiments, signals from the processors (e.g., processor 1143) may be transmitted over a network (such as Ethernet 1143) to additional processors such as processors 1109 and 1111. Processors 1109 and 1111 may receive signals from microphones 1137 and transmit signals to speakers 1139.

Figure 30:
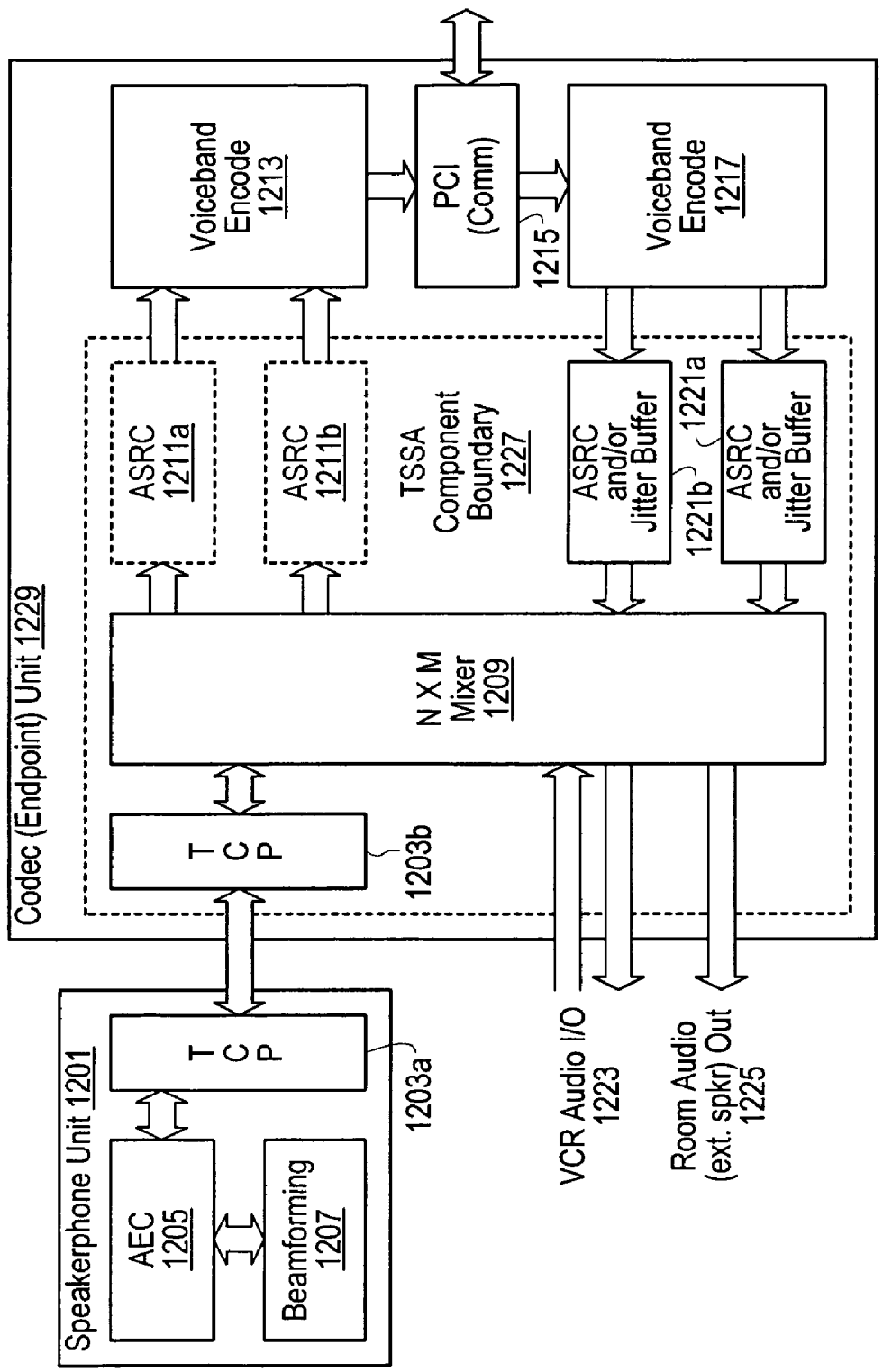
FIG. 30 illustrates a software block diagram, according to some embodiments.

FIG. 30 illustrates a software block diagram, according to some embodiments. In some embodiments, a speakerphone unit 1201 may include software for AEC 1205 and beamforming 1207, among others. A transfer control protocol (TCP) module 1203 may convert data for transfer between the speakerphone unit and the codec (endpoint) unit 1229. As part of TriMedia Software Streaming Architecture (TSSA), an N×M mixer 1209, automated storage and retrieval system (ASRC) 1211, and jitter buffers 1221 may manage signals into and out of the TSSA component boundary 1227. Other components in the codec 1229 may include a voiceband encode 1213, a peripheral component interconnect 1215, and a voiceband decode 1217. Input and output signals may include VCR input/outputs 1223 and room audio 1225.

Various embodiments described herein may be enhanced by the addition of another speakerphone. In some embodiments, two or more daisychained speakerphones may work together. For example, the processors on the two or more speakerphones may use both speakerphone microphone arrays for beamforming and echo canceling. The location of each speakerphone relative to each other may be determined (e.g., by using a sound pulse from one of the speakerphones). The two speakerphone microphone arrays may then be used as one larger array when beam forming acoustic responses.

In some embodiments, a method for determining the relative distance between a speaker and a microphone may involve: (a) transmitting a noise burst from the speaker; (b) capturing second samples of the digital input signal in response to the noise burst; and (c) performing a cross correlation between the noise burst and the second samples to determine a time delay of the direct path transmission between the speaker and the microphone. Furthermore, the calibration procedure may also include repeating (a), (b) and (c) using different phases of a D/A conversion clock (of an A/D conversion clock) relative to base conversion clock in order to obtain a refined estimate of the time delay.

In some embodiments, a method for determining parameters of model may involve: (a) transmitting a noise burst through a speaker, (b) capturing a first signal from a microphone in response to the noise burst, (c) computing a linear portion of the model from a spectrum of the noise burst and a spectrum of the first response signal, (d) transmitting two non-harmonically related sinusoidal tones, (e) capturing a second signal from the microphone in response to the tone transmissions, (f) adapting parameters of a nonlinear portion of the model until the output of the model agrees sufficiently with the second signal.

In some embodiments, a method for correcting for imperfections in microphones of a microphone array in a device such as a speakerphone (or videoconferencing unit) may involve: (a) measuring responses of array microphones to a noise burst for different speaker positions; (b) measuring responses of embedded golden microphones to the noise burst for the same speaker positions, where the embedded golden microphones are embedded in a second speakerphone; (c) computing microphone transfer functions for each speaker position from the responses measured in (a) and (b); storing the microphone transfer functions in memory of the device for later use to correct received signals from the microphone array.

In some embodiments, a method for correcting for acoustic shadowing of microphones in a microphone array in a device such as a speakerphone (or videoconferencing unit) may involve: (a) measuring responses of golden microphones to a noise burst for different speaker positions, where the golden microphones are embedded in a speakerphone; (b) measuring responses of free golden microphones to the noise burst for the same speaker positions; computing shadowing transfer functions for each speaker position from the responses measured in (a) and (b); adjusting the parameters of a virtual beam corresponding to a first frequency range and a first target direction using a values of the shadowing transfer function corresponding to the first frequency range and the first target direction.

In some embodiments, a method for tracking the drift in the response of a microphone in a speakerphone may involve: (a) measuring a signal from the microphone; (b) storing a plurality of signal measurements from the microphone; (b) averaging at least a portion of the stored plurality of signal measurements over time; (c) subtracting a speaker output from the averaged signal measurement; and (d) adjusting a transfer function (e.g., a transfer function of the microphone) using the difference between the speaker output and the averaged signal measurement.

In some embodiments, a method of forming a highly directive virtual microphone from a circular array of microphones in a device (such as a speakerphone or a videoconferencing unit) may involve: determining a direction of arrival of a source signal from analysis of signals gathered from the microphones of the circular array; generating a first virtual endfire array pointed at the acoustic source using the direction of arrival; estimating distance to the source from signals provided by the first virtual endfire array; generating a second virtual endfire array that is nonuniformly spaced and pointed at the acoustic source using the range estimate and the direction of arrival; combining signals from the second virtual endfire array to obtain a resultant signal corresponding to a highly directive virtual microphone.

In some embodiments, a method for locating an acoustic source may involve: computing a first direction of arrival from a first microphone array that is approximately endfire with respect to an acoustic source; computing a second direction of arrival from a second microphone array that is also approximately endfire with respect to the acoustic source; computing the location of the acoustic source from the first and second directions of arrival values (and the known locations of the first and second microphone arrays).

In some embodiments, a method for locating an acoustic source may involve: computing a first direction of arrival from a first microphone array that is approximately endfire with respect to an acoustic source; computing a second direction of arrival from a second microphone array that is approximately broadside with respect to the acoustic source; computing the location of the acoustic source from the first and second directions of arrival values (and the known locations of the first and second microphone arrays).

In some embodiments, a method for determining direction of arrival of an acoustic signal using a microphone array when a version of the acoustic signal is known may involve: (a) operating on signals from a microphone array to determine a number of signals corresponding to virtual microphones pointed in a set of directions; (b) band pass filtering the virtual microphone signals to a first band; (c) band pass filtering the acoustic signal version to the first band; (d) performing cross correlation of the filtered virtual microphone signals with the filtered acoustic signal version; (e) determining the direction arrival from the filtered virtual microphone signal that gives a maximum cross correlation value. The microphone array may be roughly broadside with respect to the acoustic source.

In some embodiments, a method for determining a range to an acoustic source using a microphone array when a version of the acoustic signal generated by the acoustic source is known may involve: (a) operating on signals from a microphone array to determine a number of candidate signals corresponding to different hypotheses for the range; (b) band pass filtering the candidate signals to a first band; (c) band pass filtering the acoustic signal version to the first band; (d) performing cross correlation of the filtered candidate signals with the filtered acoustic signal version; (e) determining an estimate for the range from the filtered candidate signal that gives a maximum cross correlation value. The microphone array may be roughly endfire with respect to the acoustic source.

In some embodiments, a speakerphone includes a speaker with a long throw transducer and a diameter less than or equal to R1. In one embodiment, R1 equals 2.9 inches. In another embodiment, R1 equals 2.5 inches. In yet another embodiment, R1 equals 2.25 inches. In yet another embodiment, R1 equals 2 inches. Furthermore, the speaker may have one or more of the following properties:

the speaker cone may be made of a stiff material (such as titanium, reinforced fiberglass, carbon fiber, Kevlar, etc);
  the speaker may include a phase plug to diffract acoustic energy (especially at high frequencies) at acute angles with respect to a central axis of the speaker; and
  the drive mechanism of the speaker may be configured to drive the cone at its edges.

Incorporation of such as speaker in a speakerphone may provide for better dispersion of sound, especially at high frequencies. The speaker may be embedded in the speakerphone housing so that the central axis of the speaker is pointed upward toward the ceiling.

In some embodiments, an apparatus may include: a speakerphone; and a first battery coupled to the speakerphone, where the first battery may be exchanged for a second battery coupled to a charging stand by placing the speakerphone with the first battery onto the charging stand, disengaging the first battery, and engaging the second battery to the speakerphone such that when the speakerphone is lifted from the charging stand, the speakerphone is coupled to the second battery.

Any or all of the method embodiments described herein may be implemented in terms of program instructions (executable by one or more processors) and stored on a memory medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a carrier medium may be used. A carrier medium may include a memory medium as described above, as well as signals such as electrical, electromagnetic, or digital signals, conveyed via a communication medium such as a bus, network and/or a wireless link.

The memory medium may comprise an electrically erasable programmable read-only memory (EEPROM), various types of flash memory, etc. which store software programs (e.g., firmware) that are executable to perform the methods described herein. In some embodiments, field programmable gate arrays may be used. Various embodiments further include receiving or storing instructions and/or data implemented in accordance with the foregoing description upon a carrier medium.

CONCLUSION

Various embodiments may further include receiving, sending or storing program instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
    a memory that stores program instructions; and
    a processor configured to read and execute the program instructions from the memory, wherein the program instructions are configured to direct the processor to:
        operate on samples of a digital output signal to determine samples of a digital correction signal, wherein the output signal samples are directed to an output channel for transmission from a speaker; and
        supply the digital correction signal samples to a first digital-to-analog converter for conversion into an analog correction signal;
    a subtraction circuit configured to generate a difference signal which is a difference between a first analog signal provided by a microphone and the analog correction signal, wherein the analog correction signal is an estimate of a contribution to the first analog signal due to a direct path transmission between the speaker and the microphone;
    wherein the program instructions are further configured to direct the processor to:
        receive a digital input signal derived from the difference signal; and
        perform acoustic echo cancellation on the digital input signal to obtain a resultant signal, wherein the acoustic echo cancellation is configured to remove contributions to the digital input signal due to reflected path transmissions between the speaker and the microphone.

2. The system of claim 1 further comprising:
    a preamplifier configured to amplify the difference signal to generate an amplified signal, wherein the digital input signal is derived from the amplified signal.

3. The system of claim 2 further comprising:
    an analog-to-digital converter configured to digitize the amplified signal in order to generate the digital input signal.

4. The system of claim 1 further comprising said microphone.

5. The system of claim 1, wherein said microphone is an omnidirectional microphone.

6. The system of claim 1 wherein said operating on the digital output signal samples to determine the digital correction signal samples comprises:
    applying a speaker input-output model to the digital output signal samples in the time domain to determine a digital representation $R_{SP}$ of the speaker output.

7. The system of claim 6, wherein the speaker input-output model is a nonlinear model.

8. The system of claim 6, where said operating on the digital output signal samples to determine the digital correction signal samples further comprises:
    applying a first transfer function, corresponding to the direct path transmission from the speaker to the microphone, to the digital representation $R_{SP}$ to obtain a digital representation $A_{MIC}$ of the microphone's acoustic input.

9. The system of claim 8, where said operating on the digital output signal samples to determine the digital correction signal samples further comprises:
    applying a transfer function of the microphone to the digital representation $A_{MIC}$ to determine a digital representation of the analog correction signal.

10. The system of claim 1, wherein the program instructions are configured to direct the processor to perform a calibration procedure in order to estimate the first transfer function.

11. The system of claim 10, wherein the calibration procedure comprises:
    (a) transmitting a noise burst from the speaker;
    (b) capturing second samples of the digital input signal in response to the noise burst;
    (c) performing a cross correlation between the noise burst and the second samples to determine a time delay of the direct path transmission between the speaker and the microphone.

12. The system of claim 11, wherein the calibration procedure further comprises:
repeating (a), (b) and (c) using different phases of a D/A conversion clock relative to base conversion clock in order to obtain a refined estimate of the time delay.

13. The system of claim 11, wherein the calibration procedure further comprises repeating (a), (b) and (c) using different phases of an A/D conversion clock relative to base conversion clock in order to obtain a refined estimate of the time delay.

14. The system of claim 1, wherein the program instructions are further configured to direct the processor to:
generate a plurality of correction signals for a plurality of microphones respectively, wherein each of correction signals is an estimate of a direct path contribution to the signal captured by a corresponding one of the microphones.

15. The system of claim 1, wherein the program instructions are further configured to direct the processor to:
generate a plurality of corrections signals for a plurality of microphones respectively, wherein each of correction signals is an estimate of a direct path contribution to the signal captured by a corresponding one of the microphones.

16. A method comprising:
operating on samples of a digital output signal to determine samples of a digital correction signal, wherein the output signal samples are directed to an output channel for transmission from a speaker;
supplying the digital correction signal samples to a first digital-to-analog converter for conversion into an analog correction signal;
generating a difference signal which is a difference between a first analog signal provided by a microphone and the analog correction signal, wherein the analog correction signal is an estimate of a contribution to the first analog signal due to a direct path transmission between the speaker and the microphone;
receiving a digital input signal derived from the difference signal; and
performing acoustic echo cancellation on the digital input signal to obtain a resultant signal, wherein the acoustic echo cancellation is configured to remove contributions to the digital input signal due to reflected path transmissions between the speaker and the microphone.

17. The method of claim 16, where said operating on the digital output signal samples to determine the digital correction signal samples comprises:
applying a speaker input-output model to the digital output signal samples in the time domain to determine a digital representation $R_{SP}$ of the speaker output.

18. The method of claim 17, where said operating on the digital output signal samples to determine the digital correction signal samples further comprises:
applying a first transfer function, corresponding to the direct path transmission from the speaker to the microphone, to the digital representation $R_{SP}$ to obtain a digital representation $A_{MIC}$ of the microphone's acoustic input.

19. The method of claim 18, where said operating on the digital output signal samples to determine the digital correction signal samples further comprises:
applying a transfer function of the microphone to the digital representation $A_{MIC}$ to determine a digital representation of the analog correction signal.

20. A computer-readable memory medium that stores program instructions, wherein the program instructions are executable to implement:
operating on samples of a digital output signal to determine samples of a digital correction signal, wherein the output signal samples are directed to an output channel for transmission from a speaker;
supplying the digital correction signal samples to a first digital-to-analog converter for conversion into an analog correction signal;
generating a difference signal which is a difference between a first analog signal provided by a microphone and the analog correction signal, wherein the analog correction signal is an estimate of a contribution to the first analog signal due to a direct path transmission between the speaker and the microphone;
receiving a digital input signal derived from the difference signal; and
performing acoustic echo cancellation on the digital input signal to obtain a resultant signal, wherein the acoustic echo cancellation is configured to remove contributions to the digital input signal due to reflected path transmissions between the speaker and the microphone.

* * * * *